(12) United States Patent
Ilbery

(10) Patent No.: US 7,057,773 B2
(45) Date of Patent: Jun. 6, 2006

(54) ERROR DIFFUSION USING NEXT SCANLINE ERROR IMPULSE RESPONSE

(75) Inventor: Peter William Mitchell Ilbery, Dundas (AU)

(73) Assignee: Canon Kabushiki Kaisha, Tokyo (JP)

( * ) Notice: Subject to any disclaimer, the term of this patent is extended or adjusted under 35 U.S.C. 154(b) by 1021 days.

(21) Appl. No.: 10/029,267

(22) Filed: Dec. 28, 2001

(65) Prior Publication Data

US 2002/0122210 A1   Sep. 5, 2002

(30) Foreign Application Priority Data

Dec. 29, 2000   (AU) .................................... PR2347

(51) Int. Cl.
*H04N 1/405* (2006.01)
*H04N 1/409* (2006.01)
*G06T 5/00* (2006.01)

(52) U.S. Cl. .................... 358/3.05; 358/3.26; 382/252; 382/275

(58) Field of Classification Search ................. 358/1.9, 358/3.03, 3.04, 3.05, 3.26; 382/252, 275

See application file for complete search history.

(56) References Cited

U.S. PATENT DOCUMENTS

| 4,955,065 A | 9/1990 | Ulichney |
| 5,353,127 A | 10/1994 | Shiau et al. |
| 5,521,989 A * | 5/1996 | Fan ............................. 382/252 |
| 5,535,019 A | 7/1996 | Eschbach |
| 5,835,687 A | 11/1998 | Brown et al. |
| 6,130,661 A | 10/2000 | Ilbery |

FOREIGN PATENT DOCUMENTS

| AU | 744936 | 6/2001 |
| WO | 99/22510 | 5/1999 |

OTHER PUBLICATIONS

G. Marcu, "Error diffusion algorithm with output position constraints for homogeneous highlight and shadow dot distribution", Journal of Electric Imaging, Jan. 2000, vol. 9(1), pp. 46-51.

(Continued)

*Primary Examiner*—Scott A. Rogers
(74) *Attorney, Agent, or Firm*—Fitzpatrick, Cella, Harper & Scinto

(57) ABSTRACT

An apparatus (1100) for halftoning an image is disclosed. The apparatus comprises means for determining an output value of a current pixel on a current scanline using a sum of an input value (1102) for the current pixel and a neighborhood error value (1150) at the current pixel, means (1124) for determining an error at the current pixel as the difference between (i) the sum of the input value (1102) for the current pixel and the neighborhood error value (1150) at the current pixel, and (ii) the output value (1120) of the current pixel; and means (1140) for adding a proportion of the error at the current pixel to neighborhood error values at as yet unprocessed pixels of a subsequent scanline in accordance with a next scanline error impulse response; wherein said next scanline error impulse response approximates a function which spreads with self-convolution in proportion to a degree of self-convolution.

21 Claims, 37 Drawing Sheets

OTHER PUBLICATIONS

K.T. Knox, "Evolution of error diffusion", Journal of Electronic Imaging, Oct. 1999, vol. 8(4), pp. 422-429.

J.Shiau, et al., "A set of easily implementable coefficients in error diffusion with reduced worn artifacts", SPIE, vol. 2658, pp. 222-225.

R. Ulichney, "Digital Halftoning", MIT Press, 1987, pp. 340-342.

R.W. Floyd, et al., "An Adaptive Algorithm for Spatial Greyscale", Proceedings of the Society For Information Display, vol. 17, No. 2, pp. 75-77 (1976).

G. Marcu, "An error diffusion algorithm with output constraints for homogeneous highlight and shadow dot distribution", Proceedings of The International Society for Optical Engineering, vol. 3300, pp. 341-352 (1998).

D. Hong et al., "A Serpentine Error Diffusion Dernel with Threshold Modulation for Homogeneous dot Distribution", IS&Ts Recent Progress in Digital Halftoning II (1999) pp. 306-309.

M. Nose et al., "Modified Error Diffusion with Smoothly Dispersed Dots in Highlight and Shadow", IS&Ts Recent Progress in Digital Halftoning II, (1999) pp. 310-313.

R. Eschbach, Error Diffusion Algorithm with Reduced Artifacts, Proceedings of the IS&T's 45th Annual Conference, May 10-15, 1992, pp. 133-136.

* cited by examiner

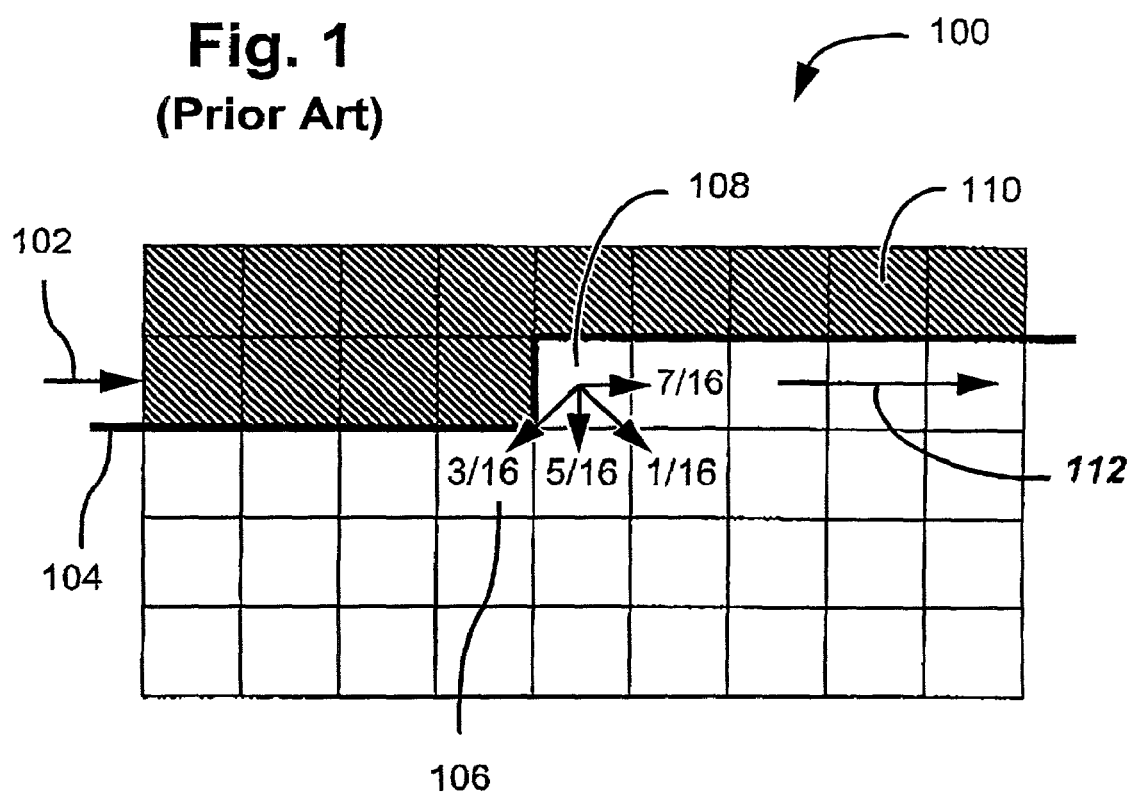
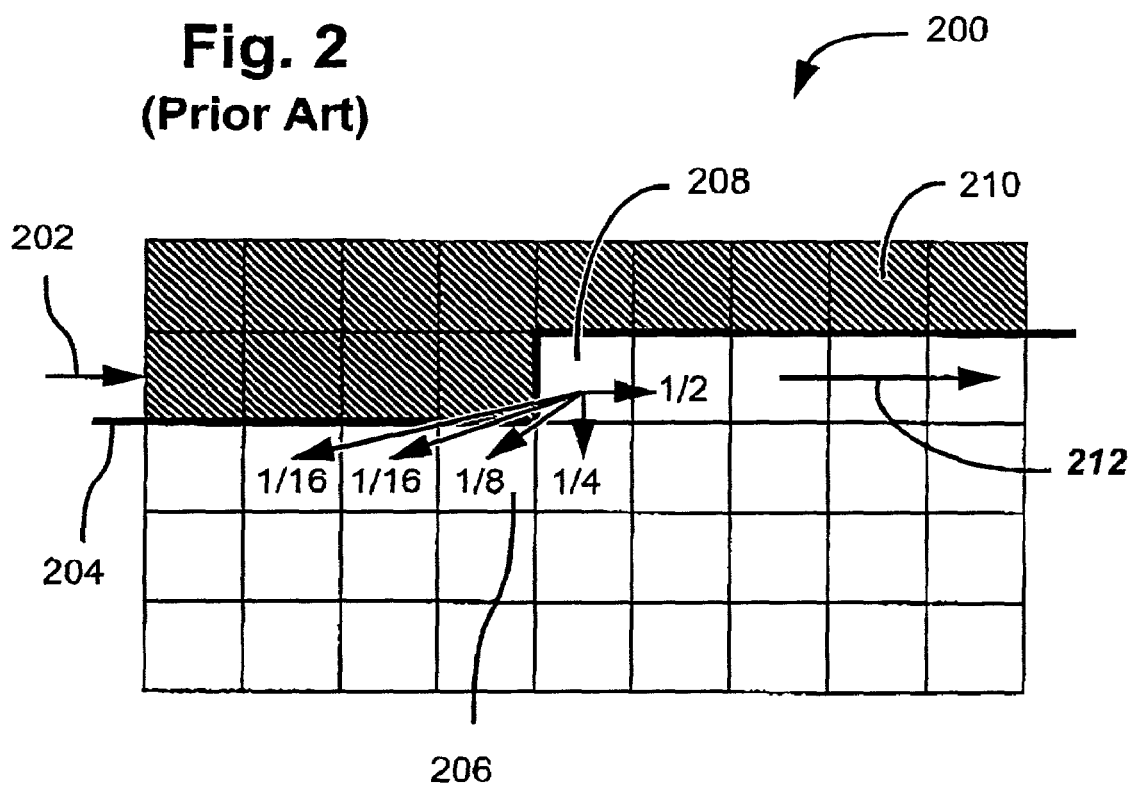

Floyd Steinberg error diffusion next scanline error impulse reponse function and its self-convolutions

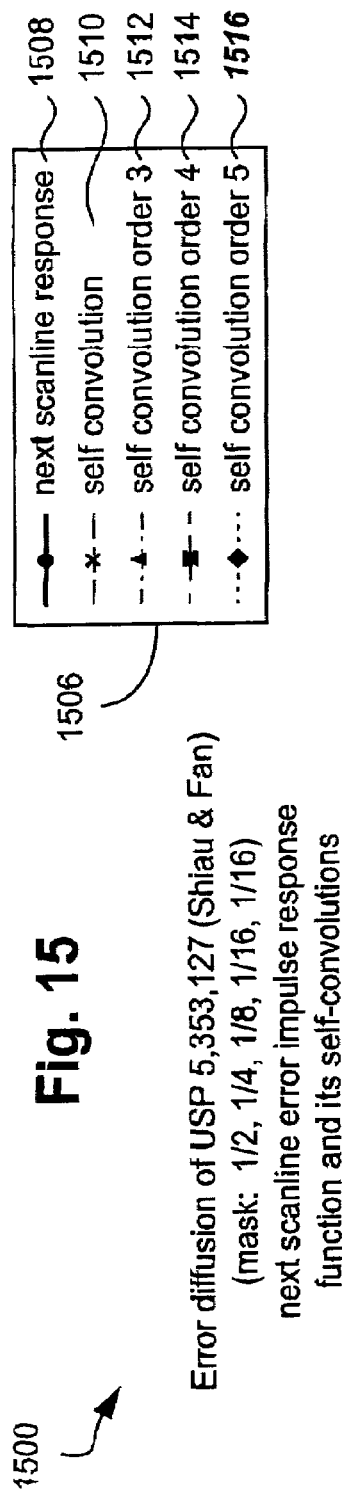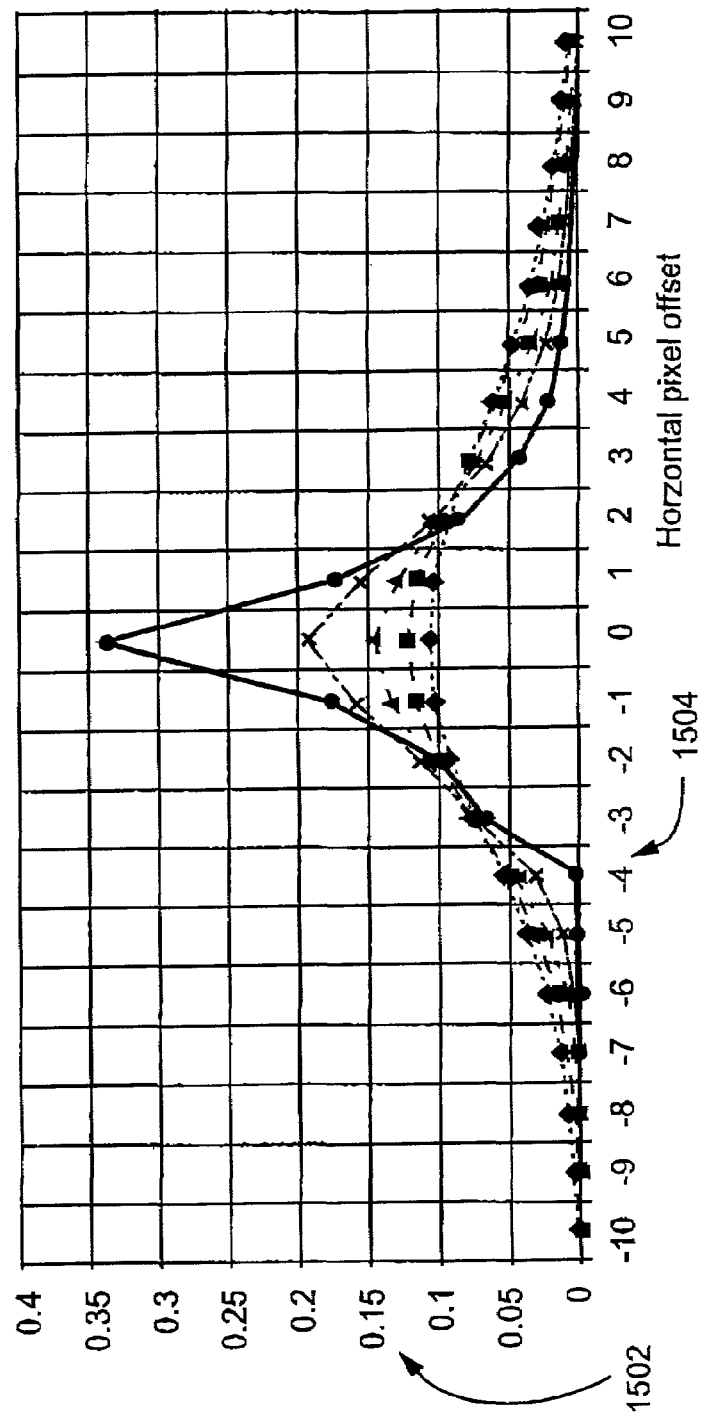
Fig. 15
Error diffusion of USP 5,353,127 (Shiau & Fan) (mask: 1/2, 1/4, 1/8, 1/16, 1/16) next scanline error impulse response function and its self-convolutions

| pixel offset | mask 1 | mask 2 | mask 3 | mask 4 | mask 5 | mask 6 |
|---|---|---|---|---|---|---|
| c1 | 0.590522 | 0.474801 | 0.561741 | 0.536627 | 0.538362 | 0.536667 |
| c2 |  | 0.063092 | -0.122958 | -0.059029 | -0.080649 | -0.076928 |
| c3 |  |  | 0.099337 | -0.006168 | 0.043546 | 0.02488 |
| c4 |  |  |  | 0.057792 | -0.01825 | 0.022132 |
| c5 |  |  |  |  | 0.042134 | -0.018664 |
| c6 |  |  |  |  |  | 0.034487 |
| c7 |  |  |  |  |  |  |
| c8 |  |  |  |  |  |  |
| c9 |  |  |  |  |  |  |
| c10 |  |  |  |  |  |  |
| c11 |  |  |  |  |  |  |
| c12 |  |  |  |  |  |  |
| n0 | 0.222974 | 0.243788 | 0.236484 | 0.237737 | 0.237758 | 0.237552 |
| n1 | 0.186504 | 0.137512 | 0.132786 | 0.130425 | 0.129196 | 0.128519 |
| n2 |  | 0.080808 | 0.050122 | 0.051474 | 0.050109 | 0.049341 |
| n3 |  |  | 0.042489 | 0.024984 | 0.025532 | 0.024637 |
| n4 |  |  |  | 0.026159 | 0.014588 | 0.014971 |
| n5 |  |  |  |  | 0.017672 | 0.009629 |
| n6 |  |  |  |  |  | 0.012776 |
| n7 |  |  |  |  |  |  |
| n8 |  |  |  |  |  |  |
| n9 |  |  |  |  |  |  |
| n10 |  |  |  |  |  |  |
| n11 |  |  |  |  |  |  |
| n12 |  |  |  |  |  |  |

1902  1904  1906  1908  1910  1912  1914

1900

| mask 7 | mask 8 | mask 9 | mask 10 | mask 11 | mask 12 |
|---|---|---|---|---|---|
| 0.53547 | 0.535275 | 0.535142 | 0.535113 | 0.535478 | 0.534915 |
| -0.07781 | -0.077282 | -0.080266 | -0.080382 | -0.08105 | -0.080892 |
| 0.028431 | 0.026191 | 0.029559 | 0.029124 | 0.028874 | 0.0286 |
| 0.008507 | 0.010402 | 0.008627 | 0.007733 | 0.007593 | 0.007557 |
| 0.010482 | 0.001604 | 0.002612 | 0.003383 | 0.003171 | 0.003258 |
| -0.010039 | 0.012859 | 0.004904 | 0.005821 | 0.006146 | 0.005601 |
| 0.025736 | -0.010894 | 0.008603 | 0.001705 | 0.00219 | 0.002344 |
|  | 0.021552 | -0.008178 | 0.007955 | 0.002221 | 0.002784 |
|  |  | 0.017524 | -0.006994 | 0.00679 | 0.00211 |
|  |  |  | 0.01448 | -0.006819 | 0.005269 |
|  |  |  |  | 0.012944 | -0.005752 |
|  |  |  |  |  | 0.011165 |
| 0.237517 | 0.237154 | 0.237201 | 0.23708 | 0.236933 | 0.236962 |
| 0.128013 | 0.127828 | 0.127623 | 0.127408 | 0.127224 | 0.127126 |
| 0.049103 | 0.048672 | 0.04855 | 0.04837 | 0.048253 | 0.048164 |
| 0.023997 | 0.023767 | 0.023463 | 0.023307 | 0.02315 | 0.023072 |
| 0.014323 | 0.013879 | 0.013715 | 0.013511 | 0.013347 | 0.013238 |
| 0.009888 | 0.009369 | 0.009058 | 0.0089 | 0.008756 | 0.008605 |
| 0.006755 | 0.00706 | 0.006642 | 0.006382 | 0.006227 | 0.006122 |
| 0.009627 | 0.004983 | 0.005251 | 0.004924 | 0.004755 | 0.004631 |
|  | 0.007582 | 0.003865 | 0.004091 | 0.003857 | 0.003692 |
|  |  | 0.006104 | 0.003066 | 0.003254 | 0.003043 |
|  |  |  | 0.005022 | 0.002511 | 0.002717 |
|  |  |  |  | 0.004195 | 0.002068 |
|  |  |  |  |  | 0.003602 |

| mask index | grey levels |
|---|---|
| 1 | 31-116, 138-224 |
| 2 | 28-30, 225-227, 117, 138 |
| 3 | 25-27, 228-230, 118, 137 |
| 4 | 22-24, 231-233, 119, 136 |
| 5 | 19-21, 234-236, 120, 135 |
| 6 | 16-18, 237-239, 121, 134 |
| 7 | 13-15, 240-242, 122, 133 |
| 8 | 10-12, 243-245, 123, 132 |
| 9 | 7-9, 246-248, 124, 131 |
| 10 | 4-6, 249-251, 125, 130 |
| 11 | 2-3, 252-253, 126, 129 |
| 12 | 0-1, 254-255, 127, 128 |

Fig. 20

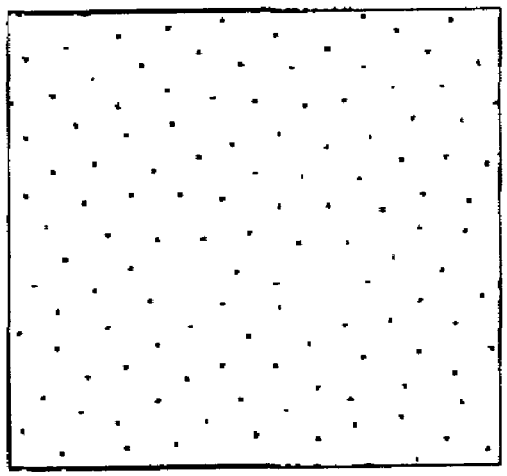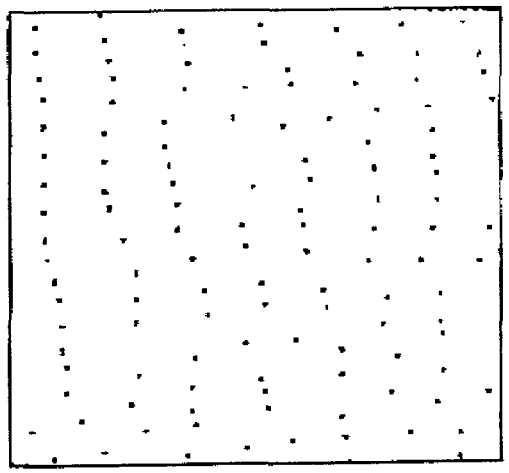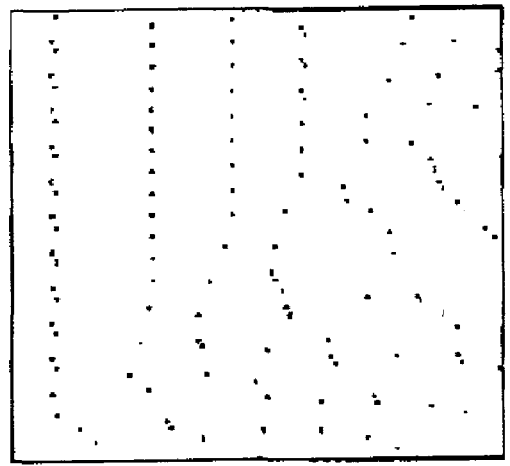
Fig. 28

| mask position | mask weight | mask position | mask weight |
|---|---|---|---|
| n0 | 0.236962 | | |
| n1 | 0.127126 | c1 | 0.534915 |
| n2 | 0.048164 | c2 | -0.080892 |
| n3 | 0.023072 | c3 | 0.0286 |
| n4 | 0.013238 | c4 | 0.007557 |
| n5 | 0.008605 | c5 | 0.003258 |
| n6 | 0.006122 | c6 | 0.005601 |
| n7 | 0.004631 | c7 | 0.002344 |
| n8 | 0.003692 | c8 | 0.002784 |
| n9 | 0.003043 | c9 | 0.00211 |
| n10 | 0.002717 | c10 | 0.005269 |
| n11 | 0.002068 | c11 | -0.005752 |
| n12 | 0.003602 | c12 | 0.011165 |

Fig. 30

| pixel offset | mask 1 | mask 2 | mask 3 | mask 4 | mask 5 | mask 6 | mask 7 | mask 8 | mask 9 | mask 10 | mask 11 | mask 12 |
|---|---|---|---|---|---|---|---|---|---|---|---|---|
| c1 | 0.590522 | 0.474901 | 0.561741 | 0.536627 | 0.538362 | 0.536667 | 0.53547 | 0.535275 | 0.535142 | 0.535113 | 0.535478 | 0.534915 |
| c2 | | 0.063092 | -0.122958 | -0.059029 | -0.080649 | -0.076928 | -0.07781 | -0.077282 | -0.080266 | -0.080382 | -0.08105 | -0.080652 |
| c3 | | | 0.099337 | -0.006168 | 0.043546 | 0.02488 | 0.028431 | 0.026191 | 0.029559 | 0.029124 | 0.028874 | 0.0286 |
| c4 | | | | 0.057792 | -0.01825 | 0.022132 | 0.008507 | 0.010402 | 0.008627 | 0.007733 | 0.007593 | 0.007557 |
| c5 | | | | | 0.042134 | -0.018664 | 0.010482 | 0.001604 | 0.002612 | 0.003383 | 0.003171 | 0.003259 |
| c6 | | | | | | 0.034487 | -0.010039 | 0.012859 | 0.004904 | 0.005821 | 0.006146 | 0.005601 |
| c7 | | | | | | | 0.025736 | -0.010894 | 0.006603 | 0.001705 | 0.00219 | 0.002344 |
| c8 | | | | | | | | 0.021552 | -0.008178 | 0.007955 | 0.002221 | 0.002784 |
| c9 | | | | | | | | | 0.017524 | -0.005994 | 0.00679 | 0.00211 |
| c10 | | | | | | | | | | 0.01448 | -0.006819 | 0.005269 |
| c11 | | | | | | | | | | | 0.012944 | -0.005752 |
| c12 | | | | | | | | | | | | 0.011165 |
| n0 | 0.222974 | 0.243788 | 0.236484 | 0.237737 | 0.237758 | 0.237552 | 0.237517 | 0.237154 | 0.237201 | 0.23708 | 0.236933 | 0.236962 |
| n1 | 0.186504 | 0.137512 | 0.132786 | 0.130425 | 0.129196 | 0.128519 | 0.129013 | 0.127828 | 0.127623 | 0.127408 | 0.127224 | 0.127126 |
| n2 | | 0.080808 | 0.050122 | 0.051474 | 0.050109 | 0.049341 | 0.049103 | 0.048672 | 0.04855 | 0.04837 | 0.048253 | 0.048164 |
| n3 | | | 0.042489 | 0.024984 | 0.025532 | 0.024637 | 0.023997 | 0.023767 | 0.023463 | 0.023307 | 0.02315 | 0.023072 |
| n4 | | | | 0.026159 | 0.014589 | 0.014971 | 0.014323 | 0.013879 | 0.013715 | 0.013511 | 0.013347 | 0.013236 |
| n5 | | | | | 0.017672 | 0.009629 | 0.009888 | 0.009369 | 0.009058 | 0.0089 | 0.008756 | 0.008605 |
| n6 | | | | | | 0.012776 | 0.006755 | 0.00706 | 0.006642 | 0.006382 | 0.006227 | 0.006122 |
| n7 | | | | | | | 0.009627 | 0.004983 | 0.005251 | 0.004924 | 0.004755 | 0.004631 |
| n8 | | | | | | | | 0.007582 | 0.003865 | 0.004091 | 0.003837 | 0.003692 |
| n9 | | | | | | | | | 0.006104 | 0.003066 | 0.003254 | 0.003043 |
| n10 | | | | | | | | | | 0.005022 | 0.002511 | 0.002717 |
| n11 | | | | | | | | | | | 0.004195 | 0.002068 |
| n12 | | | | | | | | | | | | 0.003602 |

Fig. 35

| mask index | grey levels |
|---|---|
| 1 | 31-116, 138-224 |
| 2 | 28-30, 225-227, 117, 138 |
| 3 | 25-27, 228-230, 118, 137 |
| 4 | 22-24, 231-233, 119, 136 |
| 5 | 19-21, 234-236, 120, 135 |
| 6 | 16-18, 237-239, 121, 134 |
| 7 | 13-15, 240-242, 122, 133 |
| 8 | 10-12, 243-245, 123, 132 |
| 9 | 7-9, 246-248, 124, 131 |
| 10 | 4-6, 249-251, 125, 130 |
| 11 | 2-3, 252-253, 126, 129 |
| 12 | 0-1, 254-255, 127, 128 |

Fig. 36

ERROR DIFFUSION USING NEXT SCANLINE ERROR IMPULSE RESPONSE

COPYRIGHT NOTICE

This patent specification contains material that is subject to copyright protection. The copyright owner has no objection to the reproduction of this patent specification or related materials from associated patent office files for the purposes of review, but otherwise reserves all copyright whatsoever.

TECHNICAL FIELD OF THE INVENTION

The present invention relates to the field of digital image processing and more particularly to apparatus and method for digital halftoning continuous tone images.

BACKGROUND ART

Digital Images

An image is typically represented digitally as a rectangular array of pixels with each pixel having one of a restricted set of legitimate pixel values. Digital images may be black and white in which case the restricted set of legitimate pixel values is used to encode an optical density or luminance score. Digital images may also be colour where the restricted set of pixel values may encode an optical density or intensity score for each of a number of colour channels—for example Cyan, Magenta, Yellow and Black (CMYK) or Red, Green and Blue (RGB).

Digital images are common where the image value per pixel per colour channel is an 8 bit unsigned number—providing intensity values in the range 0 through 255. Such images are often called "continuous tone" images because of the reasonably large number (256) of legitimate intensity values.

Digital Halftoning

By contrast, digital images are often printed on devices which provide a more limited variation in intensity or colour representation per pixel. For example, many Bubble Jet printers only provide the ability to print or not print a dot of each of a Cyan, Magenta, Yellow and Black ink at each pixel position.

In order to print a digital image on a printer with lower colour resolution than the digital image, it is necessary to use the original image to generate an image with the required lower colour resolution such that the generated image has a similar appearance to the original image. This process of generating a digital image of similar appearance where each pixel colour value is within a smaller set of legitimate pixel colour values, is known as digital halftoning.

For ease of explanation, digital halftoning is hereafter described for the case where the input image is a single colour channel, 8 bit per pixel image and the halftoned image is a 1 bit per pixel (bi-level) image. The input image values are known as greyscale values or grey levels. Extensions of digital halftoning from this monochrome bi-level case to cases where the halftoned image pixels have more than 2 legitimate output values (multi-level halftoning) and extensions to digital halftoning of colour images can be performed. See for example, "Digital Halftoning" Ulichney R., MIT Press, 1987, pp 340–342.

Consider the case of a single colour channel, 8 bit per pixel, image which is halftoned to generate a 1 bit per pixel (bi-level) image which is printable on a black and white bubble jet printer, for which each pixel of the halftoned image has one of 2 legitimate pixel values, a "no dot" value and a "dot" value.

An image region in the halftoned image will print as a minimum optical density ("fully white") region when all pixels of the region have the "no dot" value corresponding to non-placement of an ink dot; it will print as a maximum optical density ("fully black") region when all pixels of the region have the "dot" value corresponding to placement of an ink dot; and it will print as an intermediate optical density (halftone) region when some of the pixels of the region have the "no dot" value and some of the pixels have the "dot" value.

A highlight (near white) region in the halftoned image will have only a few of the pixels with the "dot" value—in these regions the "dot" halftone output value is the minority or exceptional result. A shadow (near black) region will have only a few of the pixels with the "no dot" value—in these regions the "no dot" halftone output value is the minority or exceptional result.

The role of the halftoning process is to generate the printable image so that an appropriate number of ink dots will print in appropriate pixel positions so that there is a good match between the optical density of image regions in the original image and the average optical density of the matching image regions in the printed image.

Error Diffusion

Error diffusion is a digital halftoning method originally developed by Floyd and Steinberg and described in the publication "An Adaptive Algorithm for Spatial Greyscale", Proceedings of the SID 17/2, pp 75–77 (1976), Error diffusion as developed by Floyd and Steinberg is hereafter described as "standard error diffusion".

An overview of standard error diffusion is now provided.

The standard error diffusion algorithm processes pixels line by line from the top of the image to the bottom of the image. Each line (or "scanline") is processed one pixel at a time from left to right.

The standard error diffusion algorithm employs a pixel decision rule in which a modified input image pixel value is compared against a threshold value. If the pixel's modified input value is less than the threshold, then the pixel's halftone output value is assigned to be the lower halftone output value; and if it is greater, then the pixel's halftone output value is assigned to be the higher halftone output value.

Following determination of the pixel halftone output value, an error is determined for the pixel as the difference between the pixel's modified input value and the pixel's halftone output value. The error is distributed to neighbouring, as yet unprocessed, pixels according to a set of weighting coefficients.

A pixel's modified input value is the sum of the pixel's input image value and a neighbourhood error value for the pixel. The neighbourhood error for a pixel is the sum of the errors distributed to that pixel from previously processed neighbouring pixels.

The set of weighting coefficients is known as an error diffusion mask. Each weighting coefficient of the error diffusion mask is associated with a pixel offset. When a pixel is processed, the error distributed from the pixel to an as yet unprocessed pixel is the pixel error multiplied by the weight corresponding to the offset from the pixel to the unprocessed pixel.

Note that the error at a pixel which is distributed to its neighbours can be considered as a sum of the neighbourhood error at the pixel and the pixel-only error being the pixel's input value less the pixel's halftone output value.

The error diffusion mask described by Floyd and Steinberg is shown in FIG. 1. The error at a pixel is distributed in the proportions $7/16$, $1/16$, $5/16$ and $3/16$ to 4 neighbouring pixels which are as yet unprocessed as indicated in the diagram. FIG. 1 shows an error diffusion mask 100 in which an error for a current pixel 108 is distributed in the proportions indicated to four neighbouring pixels eg. 106 in the fractional proportions shown. Previously processed pixels eg. 110 are shown using a shaded representation, and it is noted that the current pixel 108 lies on a current scanline 102. Previously processed pixels lie above a bold line 104 in FIG. 1, and a scanline processing direction is depicted by a horizontal arrow 112.

It is noted that the sum of the weighting coefficients is 1. As a result 100% of a pixel's error is transferred to its neighbouring pixels. If the sum of weighting coefficients were greater than 1, then error would be amplified and could build up without bound. If the sum of weighting coefficients were less than 1, then error would be reduced. By having the sum of weighting coefficients equal to unity, the average intensity of a region of the halftoned image tends to match the average intensity of that region in the input image which is a very desirable characteristic of a halftoning process.

In implementations of standard error diffusion where multiplication of error by a weighting coefficient results in significant rounding errors, it is necessary to co-ordinate the calculation of error distributions to neighbouring pixels so that effectively 100% of current pixel error is transferred on. This can be achieved by determining error distributions to all but one of the neighbouring pixels by multiplication by a weight and determining the error distribution to the remaining neighbouring pixel by subtracting the other error distributions from the total error to be distributed.

For improved execution speed, error distributions corresponding to a particular pixel error value are often determined in advance and retrieved from a look up table.

In the Floyd and Steinberg error diffusion mask, the pixels which receive error distributions from a current pixel are on the current scanline and succeeding scanline only. An implementation of error diffusion with this mask requires the use of a single "line store" memory to store neighbourhood error values. The memory is referred to as a "line store" because it is required to store a neighbourhood error value for each pixel of a scanline. Many of the modifications to error diffusion which are referred to below are achieved at the cost of extra memory for an additional one or more line stores.

Error diffusion algorithms are used in the printing and display of digital images. Many modifications to the standard error diffusion algorithm have been developed.

Worm Artifacts

The error diffusion algorithm suffers from the disadvantage that in image regions of very low or very high intensity, it generates a pattern of image values in the halftoned image which are poorly spread—the exceptional values are concentrated in wavy lines. These patterns can be very noticeable and distracting to a viewer of the image—they are often known as "worm" artifacts.

FIG. 5 shows a section of a halftone output image generated by Floyd Steinberg error diffusion which shows worm artifacts. This halftone output was generated by bi-level halftoning of an 8 bit per pixel monochrome source image with a constant grey value of 253. FIG. 5 shows a halftone output image 500 which, as noted, shows worm artifacts, as illustrated by, for example, pairs of pixels 502, and a quadruplet of pixels 504.

Modifications to error diffusion have been developed to reduce worm artifacts.

Prior Art Methods of Reducing Worm Artifacts

One method of reducing worm artifacts is by addition of some randomisation. The randomisation may be achieved by adding noise to the input image, by adding noise to the thresholds or by randomising the error distribution to neighbouring pixels. A large amount of noise or randomisation can be added to fully avoid worm artifacts; however, this also seriously degrades the halftoned image.

Another method of reducing worm artifacts is to vary the direction in which scanlines are processed. By way of example, U.S. Pat. No. 4,955,065 titled "System for Producing Dithered Images from Continuous-tone Image Data" to Ulichney discloses error diffusion with perturbed weighting coefficients and bi-directional scanline processing.

Another method of reducing worm artifacts is by use of larger error diffusion masks. For example, in "Error Diffusion Algorithm with Reduced Artifacts", Eschbach R., Proceedings of the IS&T's 45th Annual Conference, May 10–15, 1992, either a large or a small error diffusion mask is used depending on the input image grey level. The large error diffusion mask is suited to use in image regions of very high or very low greyscale, reducing the worm artifacts in those regions. A disadvantage of this method is that large error diffusion masks which distribute error to pixels of more than 1 succeeding scanline require additional error line stores and associated processing.

A further method of reducing worm artifacts by use of an "extended distribution set" style of error diffusion mask is described in U.S. Pat. No. 5,353,127, titled "Method for Quantization Gray Level Pixel Data with Extended Distribution Set" to Shiau and Fan. This patent describes error diffusion masks including pixel positions of only the current and succeeding scanline with additional pixel positions on the next scanline to the left of (that is, behind) the current pixel.

FIG. 2 shows an error diffusion mask of U.S. Pat. No. 5,353,127. An error for a current pixel 208 is, in this case, distributed to five neighbouring pixels eg. 206, where each of these five pixels receives a fractional proportion of the error as indicated. Scanline processing is from left to right as depicted by an arrow 212, and previously processed pixels, eg. 210, are full shaded and lie above a bold line 204. The current pixel 208 lines on a current scanline 202. While this method is successful at reducing worm artifacts and only requires a single error line store, worm artifacts are still evident for bi-level halftoning of 8 bit grey scale image data, as can be seen in FIG. 6.

FIG. 6 shows example halftone output generated by bi-level error diffusion, using the mask of FIG. 2, for an 8 bit per pixel source image with constant grey value of 253, FIG. 6 shows an image 600 which exhibits worm artifacts as exemplified by reference numerals 602 and 604.

Prior Art Methods of Preventing Artifacts

While the above methods are successful in reducing worm artifacts, complete prevention of worm artifacts can also be achieved.

One method of preventing worm artifacts is by modulating threshold values. U.S. Pat. No. 5,535,019 titled "Error diffusion halftoning with homogeneous response in high/low intensity image regions" to Eschbach discloses a modification to error diffusion which adjusts the error diffusion threshold according to the halftone output and according to the input intensity using a threshold impulse function, for the purpose of preventing worm artifacts.

Another modification to error diffusion which prevents worm artifacts by threshold modulation is described in "A serpentine error diffusion kernel with threshold modulation for homogeneous dot distribution", Hong D., Kim C., Japan Hardcopy '98 pp 363–366, 1998 which is also published in IS&T's Recent Progress In Digital Halftoning II (1999) pp 306–309.

Another method of preventing worm artifacts is the addition of grey level dependent periodic noise to the input image, described in "Modified error diffusion with smoothly dispersed dots in highlight and shadow", Japan Hardcopy '98 pp 379–382, 1998 which is also published in IS&T's Recent Progress In Digital Halftoning II (1999) pp 310–313.

Another method of preventing worm artifacts is by imposing output position constraints. An example of this method is provided in "An error diffusion algorithm with output constraints for homogeneous highlight and shadow dot distribution", Marcu G., Proceedings of SPIE, Vol 3300, pp 341–352 (1998).

Disadvantages of Prior Art Methods of Preventing Worm Artifacts

In many cases the desirability of a halftoning algorithm is determined by how fast it executes and how easy it is to implement. For example, in software implementations in a printer driver on a general purpose computer, the algorithm execution speed is very important; whereas in special purpose hardware, the algorithm complexity and memory usage are very important because they relate strongly to the expense of the circuitry.

Use of additional line store memory by a halftoning algorithm generally indicates that it will execute slower in software and is more expensive to implement in hardware.

The modification to error diffusion disclosed in U.S. Pat. No. 5,535,019 to Eschbach requires use of memory for an additional line store to store threshold adjustment values generated by preceding scanlines for use by a current scanline. The modification also requires additional processing including addition of threshold impulse values and dampening of threshold values transferred to subsequent scanlines.

The modification to error diffusion described in the previously mentioned paper titled "A serpentine error diffusion kernel with threshold modulation for homogeneous dot distribution" also requires use of an additional line store memory to store threshold adjustment values. Additional processing is also required to diffuse threshold adjustment values.

The modification to error diffusion described in the previously mentioned paper titled "Modified error diffusion with smoothly dispersed dots in highlight and shadow" requires memory for additional line stores to store several neighbouring scanlines of processed input image data from which filtered input image values for a current scanline are determined; the filtered input image values are used in turn to determine the noise to be added to the input image data.

The modification to error diffusion described in the previously mentioned paper titled "An error diffusion algorithm with output constraints for homogeneous highlight and shadow dot distribution" requires memory for additional lines stores to store halftoned image data for several previously processed scanlines. This modification also includes processing to exclude minority halftone output results when that result is present in a certain portion of the previously processed scanlines.

In summary, all the modifications listed above which prevent worm artifacts in error diffusion require use of additional line store memory together with the processing associated with use of that additional memory.

References made to prior art documents in the present description in no way constitutes an acknowledgment that the prior art documents are part of the common general knowledge.

SUMMARY OF THE INVENTION

It is an object of the present invention to substantially overcome, or at least ameliorate, one or more disadvantages of existing arrangements.

According to a first aspect of the invention, there is provided a method of halftoning an image, said method comprising steps of:

determining an output value of a current pixel on a current scanline using a sum of an input value for the current pixel and a neighbourhood error value at the current pixel;

determining an error at the current pixel as the difference between (i) the sum of the input value for the current pixel and the neighbourhood error value at the current pixel, and (ii) the output value of the current pixel; and adding a proportion of the error at the current pixel to neighbourhood error values at as yet unprocessed pixels of a subsequent scanline in accordance with a next scanline error impulse response; wherein said next scanline error impulse response:

approximates a function which spreads with self-convolution in proportion to a degree of self-convolution.

According to another aspect of the invention, there is provided a method of generating an error diffusion mask suitable for use with any of the aforementioned methods.

According to another aspect of the invention, there is provided an error diffusion mask suitable for use with any of the aforementioned methods.

According to another aspect of the invention, there is provided a method of halftoning an image, said image comprising a plurality of pixels each having an input value and an assignable output value that can take on one of at least two output values, where pixels are processed scanline by scanline, and scanlines are processed one at a time from the top of the image to the bottom of the image, and where a scanline is processed pixel by pixel either from left to right or from right to left, and where the processing for each pixel comprises the steps of:

(a) determining the output value of a current pixel using a sum of the input value of the current pixel and a neighbourhood error value for the pixel;

(b) determining an error at the current pixel as the difference between, firstly, the sum of the input value of the current pixel and the neighbourhood error value for the pixel, and secondly the output value of the pixel;

(c) adding proportions of the error at the current pixel to the neighbourhood error values of yet to be processed pixels of the current and next scanline;

and where the said proportions of the error at a current pixel are designed so that the next scanline error impulse response, being that function which maps (A) from a horizontal pixel offset;

(B) to the total proportion of the error at the current pixel added to the neighbourhood error of that pixel of the next scanline which is displaced by the horizontal pixel offset from the current pixel, following complete processing of the current scanline;

approximates a function which spreads with self-convolution in proportion to the degree of self-convolution.

According to another aspect of the invention, there is provided a method of halftoning an image, said image comprising a plurality of pixels each having an input value and an assignable output value that can take on one of at least two output values, where pixels are processed scanline by scanline and scanlines are processed one at a time from the top of the image to the bottom of the image, and where a scanline is processed pixel by pixel either from left to right or from right to left, and where the processing for each pixel comprises the steps of:

(a) determining the output value of a current pixel using a sum of the input value of the current pixel and a neighbourhood error value for the pixel;

(b) determining an error at the current pixel as the difference between, firstly, the sum of the input value of the current pixel and the neighbourhood error value for the pixel, and secondly the output value of the pixel;

(c) selecting, using the current pixel input value, a set of proportions and a set of corresponding pixel position offsets, from a family of sets of proportions and corresponding pixel position offsets;

(d) adding the selected proportions of the error at the current pixel to the neighbourhood error values of yet to be processed pixels at pixel positions offset from the current pixel by the selected corresponding pixel position offsets;

and where each set of the said family of sets of proportions and corresponding pixel offsets, is designed so that the next scanline error impulse response corresponding to that set, being that function which maps (A) from a horizontal pixel offset;

(B) to the proportion of the error at the current pixel added to the neighbourhood error of that pixel of the next scanline displaced by the horizontal pixel offset from the current pixel, following complete halftone processing of the current scanline using only the said set of proportions and corresponding pixel offsets;

approximates a function which spreads with self-convolution in proportion to the degree of self-convolution.

According to another aspect of the invention, there is provided a method of halftoning an image, said image comprising a plurality of pixels each having an input value and an assignable output value that can take on one of at least two output values, where pixels are processed scanline by scanline and scanlines are processed one at a time from the top of the image to the bottom of the image, and where a scanline is processed pixel by pixel either from left to right or from right to left, and where the processing for each pixel comprises the steps of:

(a) determining the output value of a current pixel using a sum of the input value of the current pixel and a neighbourhood error value for the pixel;

(b) determining an error at the current pixel as the difference between, firstly, the sum of the input value of the current pixel and the neighbourhood error value for the pixel, and secondly the output value of the pixel;

(c) selecting, using the current pixel input value, a set of proportions and a set of corresponding pixel position offsets, from a family of sets of proportions and corresponding pixel position offsets, said set of proportions being in accordance with a next scanline error impulse response that approximates a function which spreads with self-convolution in proportion to a degree of self-convolution;

(d) adding the selected proportions of the error at the current pixel to the neighbourhood error values of yet to be processed pixels at pixel positions offset from the current pixel by the selected corresponding pixel position offsets;

and where each set of the said family of sets of proportions and corresponding pixel offsets, only includes pixel offsets corresponding to pixels on the same scanline as the current pixel or to pixels on the next scanline.

According to another aspect of the invention, there is provided an apparatus for halftoning an image, said apparatus comprising:

means for determining an output value of a current pixel on a current scanline using a sum of an input value for the current pixel and a neighbourhood error value at the current pixel;

means for determining an error at the current pixel as the difference between (i) the sum of the input value for the current pixel and the neighbourhood error value at the current pixel, and (ii) the output value of the current pixel; and means for adding a proportion of the error at the current pixel to neighbourhood error values at as yet unprocessed pixels of a subsequent scanline in accordance with a next scanline error impulse response; wherein said next scanline error impulse response:

approximates a function which spreads with self-convolution in proportion to a degree of self-convolution.

According to another aspect of the invention, there is provided an apparatus for halftoning an image, said apparatus comprising:

a memory for storing a program;

a processor for executing the program, said program comprising:

code for a determining step for determining an output value of a current pixel on a current scanline using a sum of an input value for the current pixel and a neighbourhood error value at the current pixel;

code for a determining step for determining an error at the current pixel as the difference between (i) the sum of the input value for the current pixel and the neighbourhood error value at the current pixel, and (ii) the output value of the current pixel; and code for an adding step for adding a proportion of the error at the current pixel to neighbourhood error values at as yet unprocessed pixels of a subsequent scanline in accordance with a next scanline error impulse response; wherein said next scanline error impulse response:

approximates a function which spreads with self-convolution in proportion to a degree of self-convolution.

According to another aspect of the invention, there is provided a computer program product including a computer readable medium having recorded thereon a computer program for directing a processor to execute a method for halftoning an image, said program comprising:

code for a determining step for determining an output value of a current pixel on a current scanline using a sum of an input value for the current pixel and a neighbourhood error value at the current pixel;

code for a determining step for determining an error at the current pixel as the difference between (i) the sum of the input value for the current pixel and the neighbourhood error value at the current pixel, and (ii) the output value of the current pixel; and code for an adding step for adding a proportion of the error at the current pixel to neighbourhood error values at as yet unprocessed pixels of a subsequent scanline in accordance with a next scanline error impulse response; wherein said next scanline error impulse response:

approximates a function which spreads with self-convolution in proportion to a degree of self-convolution.

According to another aspect of the invention, there is provided a computer program for directing a processor to execute a method for halftoning an image, said program comprising:

code for a determining step for determining an output value of a current pixel on a current scanline using a sum of an input value for the current pixel and a neighbourhood error value at the current pixel;

code for a determining step for determining an error at the current pixel as the difference between (i) the sum of the input value for the current pixel and the neighbourhood error value at the current pixel, and (ii) the output value of the current pixel; and code for an adding step for adding a proportion of the error at the current pixel to neighbourhood error values at as yet unprocessed pixels of a subsequent scanline in accordance with a next scanline error impulse response; wherein said next scanline error impulse response:

approximates a function which spreads with self-convolution in proportion to a degree of self-convolution.

BRIEF DESCRIPTION OF THE DRAWINGS

One or more embodiments of the present invention will now be described with reference to the drawings, in which:

FIG. 1 shows an error diffusion mask as described by Floyd and Steinberg;

FIG. 2 shows an error diffusion mask in accordance with U.S. Pat. No. 5,353,127 (Shiau and Fan);

FIG. 15 shows self convolutions of a next scanline error impulse response function for U.S. Pat. No. 5,353,127 error diffusion;

FIG. 20 shows a tabular representation of a mapping between grey levels and the masks shown in FIG. 19;

FIG. 28 shows error diffusion outputs for a region of grey-level 253, for the three error diffusion methods indicated;

FIG. 30 shows mask weights for the various mask positions in the mask of FIG. 29;

FIG. 35 shows error diffusion masks for a range of widths; and

FIG. 36 shows mappings between grey levels and masks of FIG. 35.

DETAILED DESCRIPTION INCLUDING BEST MODE

Figure 3:
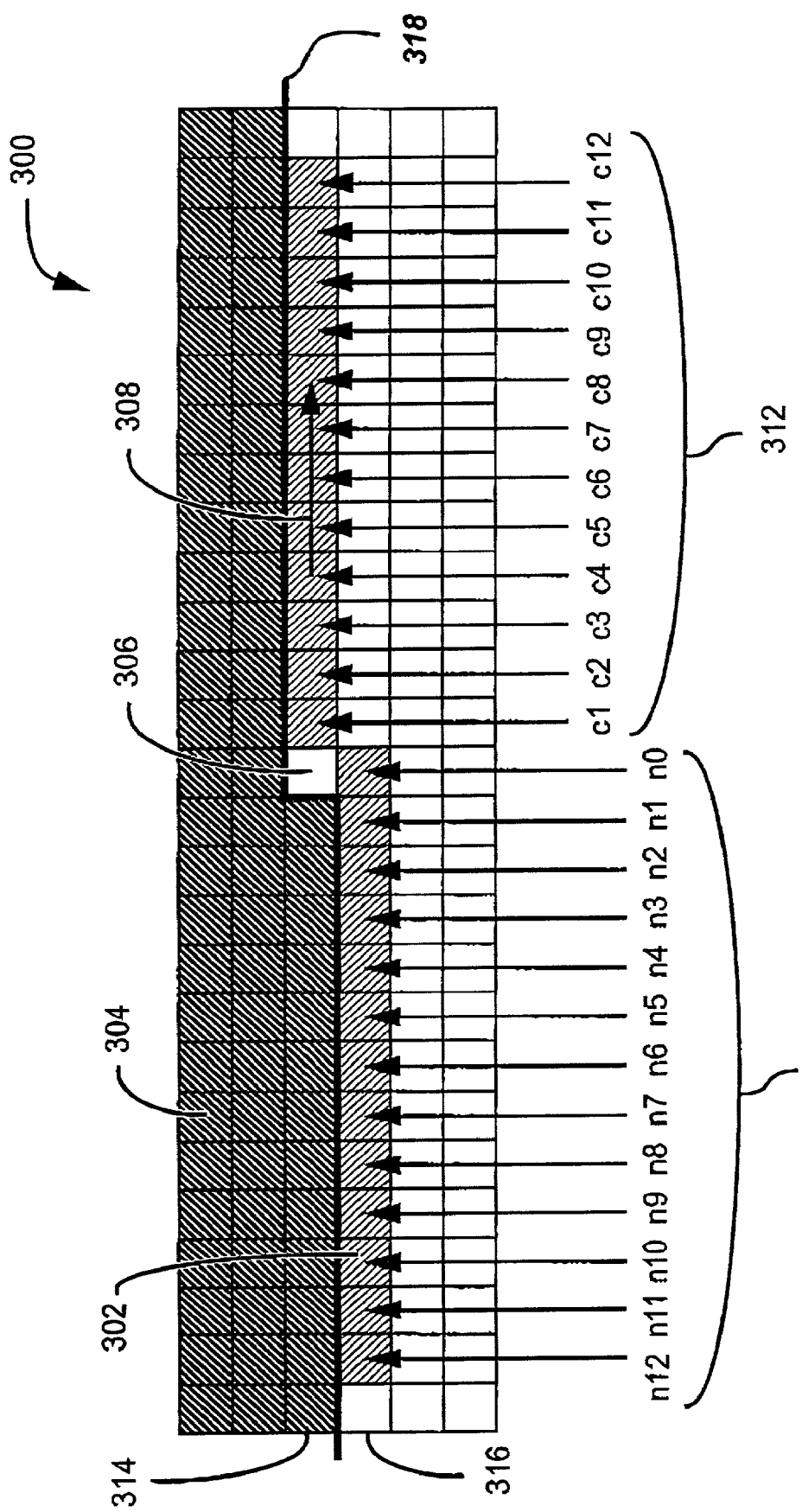
FIG. 3 shows the mask positions of an exemplary error diffusion mask, designed in accordance with an arrangement described herein.

Where reference is made in any one or more of the accompanying drawings to steps and/or features, which have the same reference numerals, those steps and/or features have for the purposes of this description the same function(s) or operation(s), unless the contrary intention appears. Further descriptive material is to be found in Appendix A.

Some portions of the description which follows are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that the above and similar terms are to be associated with the appropriate physical quantities and are merely convenient labels applied to these quantities. Unless specifically stated otherwise, and as apparent from the following, it will be appreciated that throughout the present specification, discussions utilizing terms such as "scanning", "calculating", "determining", "replacing", "generating" "initializing", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers or other such information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also discloses a computer readable medium comprising a computer program for performing the operations of the methods. The computer readable medium is taken herein to include any transmission medium for communicating the computer program between a source and a designation. The transmission medium may include storage devices such as magnetic or optical disks, memory chips, or other storage devices suitable for interfacing with a general purpose computer. The transmission medium may also include a hard-wired medium such as exemplified in the Internet system, or wireless medium such as exemplified in the GSM mobile telephone system. The computer program is not intended to be limited to any particular programming language and implementation thereof It will be appreciated that a variety of programming languages and coding thereof may be used to implement the teachings of the disclosure contained herein.

Modifications to error diffusion are now described, which remove worm artifacts in highlight and shadow regions, by design of the error diffusion mask.

Figure 4:
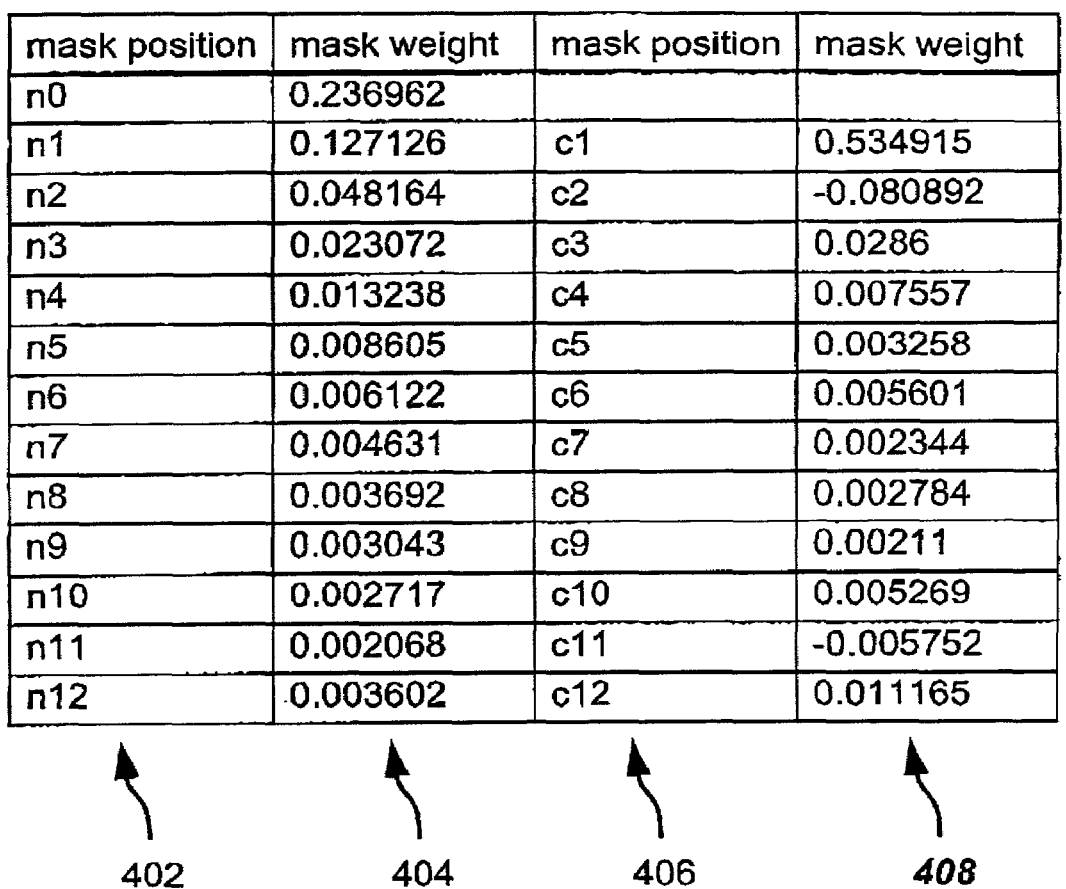
FIG. 4 shows a tabular representation of the mask weight values of the exemplary error diffusion mask shown in FIG. 3.
Figure 5:
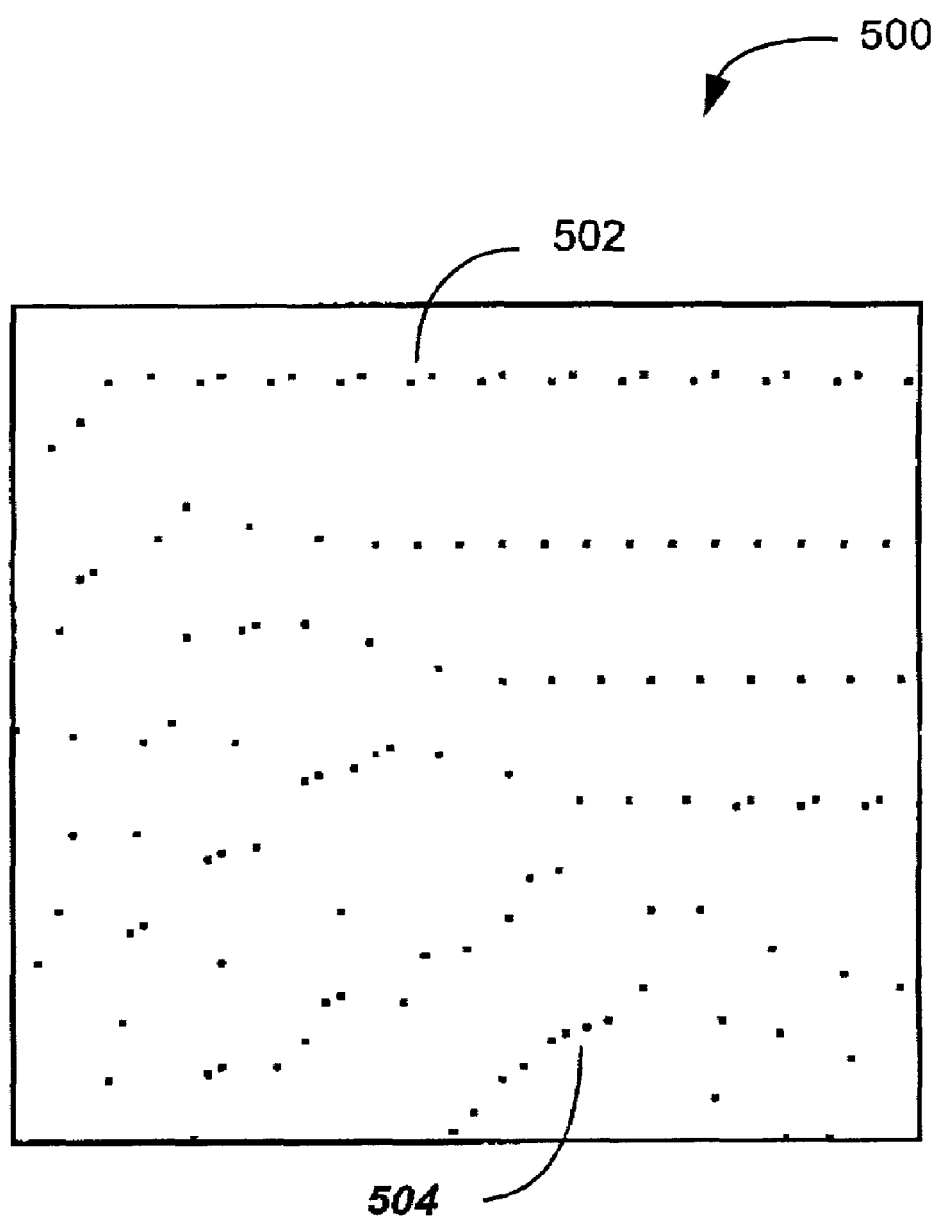
FIG. 5 shows a halftone output image generated in accordance with the Floyd Steinberg mask shown in FIG. 1.
Figure 6:
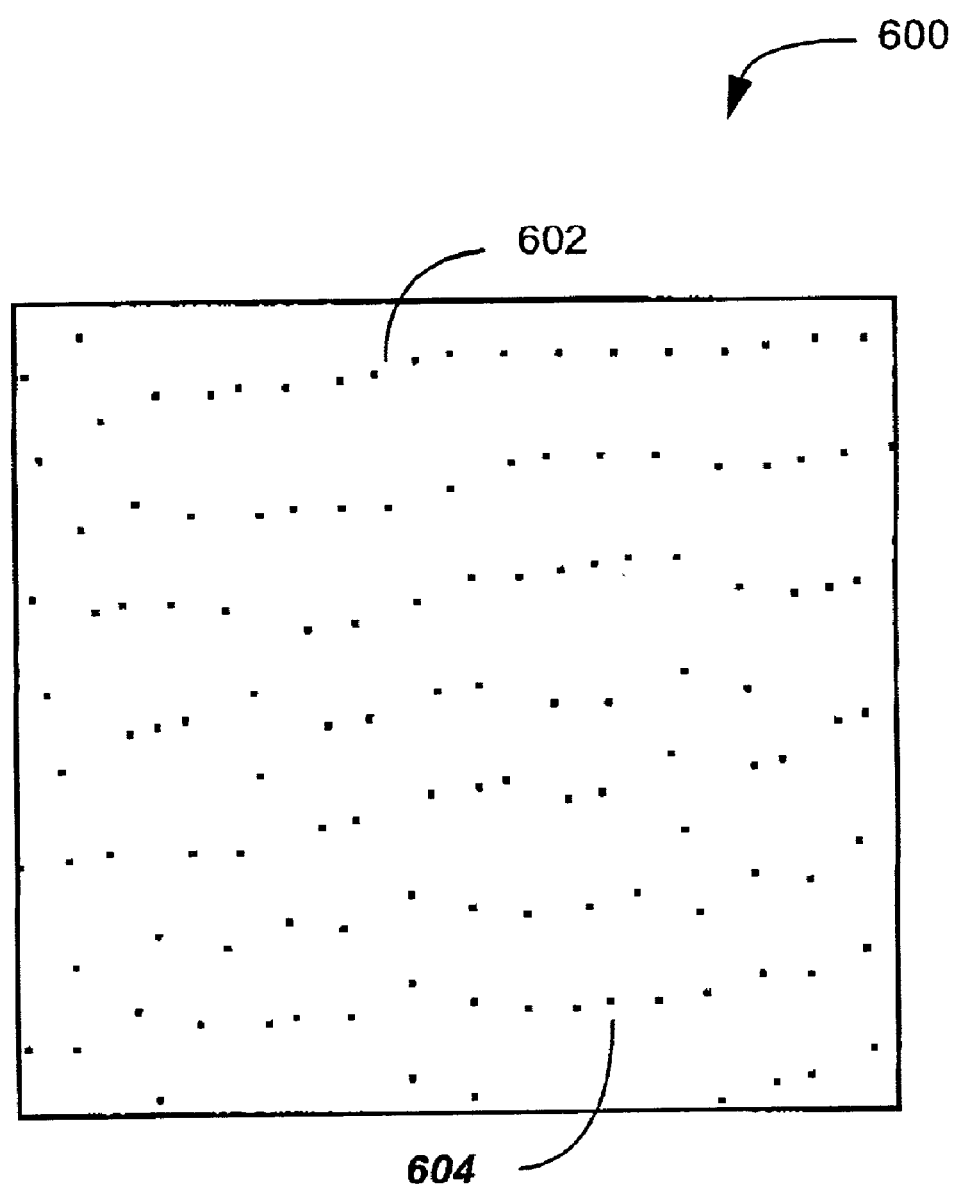
FIG. 6 shows an exemplary halftone output image in accordance with bi-level error diffusion, using the mask shown in FIG. 2.

FIGS. 3 and 4 show an example of an error diffusion mask, designed as described in this document, which generates bi-level halftone output for 8 bit per pixel source images which is substantially free of worn artifacts; that is, all sparse halftone patterns are well-spread. FIG. 3 shows an error diffusion mask 300 in which error for a current pixel 306 is distributed to neighboring pixels on a current scanline 314, as well as pixels on a "next" scanline 316. Previously processed pixels are shown in full shade above a bold line 318, and it is noted that a current scanline 314 and a next scanline 316 contain pixels to which the error for the current pixel 306 is distributed. Current scanline pixels which receive error distribution from the current pixel 306 are represented by a group 312, and next line pixels are correspondingly represented by a group 310. FIG. 4 shows a tabular representation of the error distribution weight values for the error diffusion mask, and it is noted that the table 400 is made up of four columns 402 to 408. Columns 402 and 406 represent mask positions for the next and current scanlines respectively, and columns 404 and 408 represent the proportions in which the error from the current pixel are distributed.

The first arrangement is described for the case of halftoning a monochrome 8 bit per pixel input image to a bi-level output image.

A monochrome input image with pixel values $g_{i,j}$ being integers in the range 0 to 255 is used to generate a bi-level halftone output image with pixel values $r_{i,j}$ being the integers 0 and 255.

The halftone output value for each pixel is obtained by error diffusion, using an error diffusion mask which has been specially designed so that the next scanline error impulse response function, corresponding to the mask, approximates a Cauchy distribution which has been sampled and normalised.

An example of a suitable error diffusion mask for the first arrangement is the 12-13 mask described in FIGS. 3 and 4. This mask has weights for 12 pixel positions on the current scanline and 13 pixel positions on the next scanline and was prepared as described above. Use of such a specially designed error diffusion mask generates halftone output for which all sparse halftone patterns are well spread and substantially worm-free.

Figure 7:
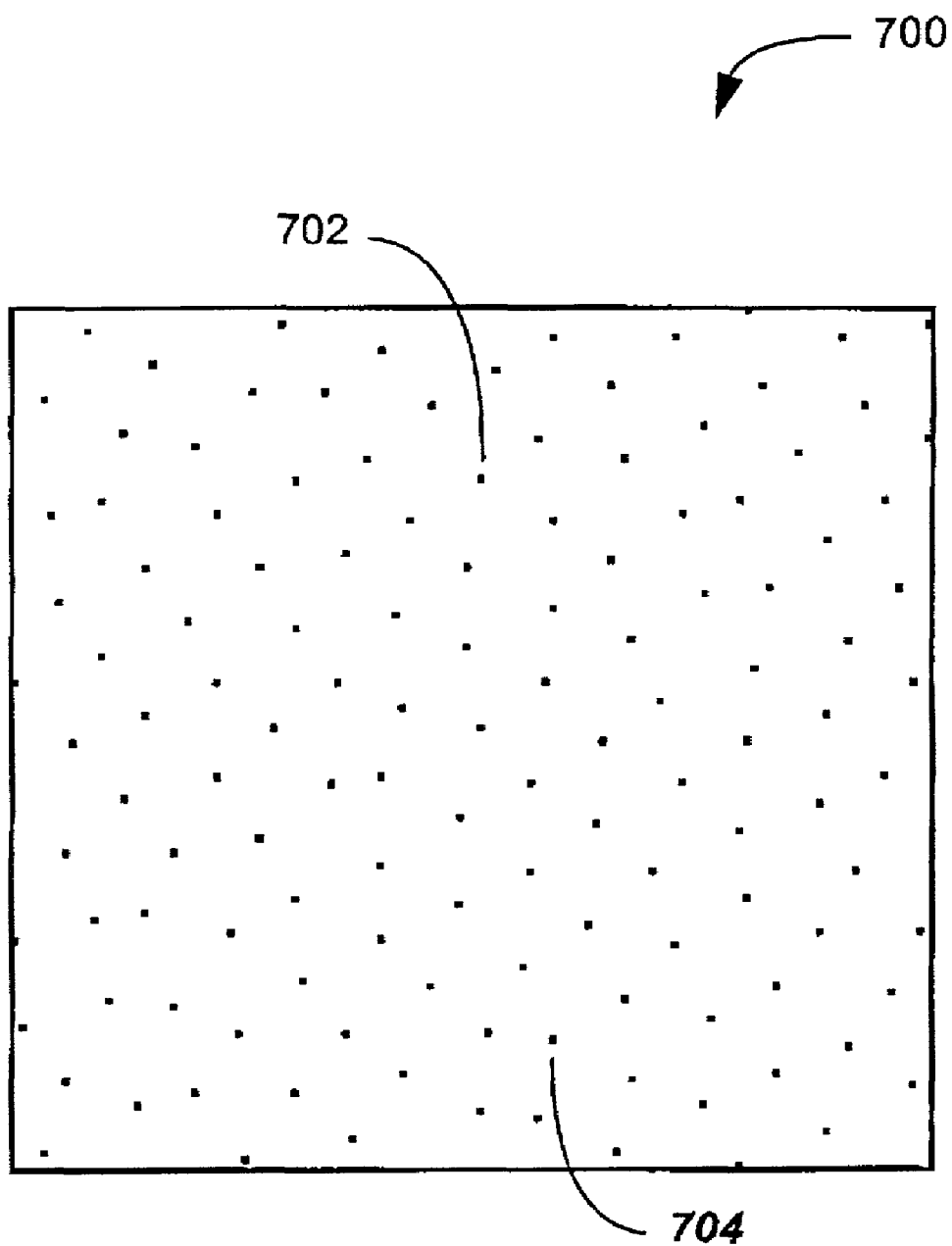
FIG. 7 shows a halftone output image produced using the mask shown in FIG. 3.

FIG. 7 shows halftone output using this mask for a source image of constant grey level 253. FIG. 7 shows an image 700 which is substantially free from worm artifacts, as exemplified by dots 702 and 704, which are well spaced from their neighbours. This description includes:

- a definition of the term "next scanline error impulse response" function;
- arguments supporting the proposition that in order for error diffusion with mask positions on the current and next scanlines to be worn-free, it is desirable that the next scanline error impulse response function should spread in proportion to the degree of self-convolution, or stated alternatively, should approximate a Cauchy distribution;
- a method for generating error diffusion masks for which the next scanline error impulse response function is optimised to approximate a function which spreads in proportion to the degree of self-convolution, ie. is optimised to approximate a Cauchy distribution.

It will also be shown that the requirement that the next scanline error impulse response function should spread in proportion to the degree of self-convolution is closely related to the requirement that it should approximate a Cauchy distribution.

Influence of a Pixel Decision on Subsequent Pixel Decisions

With standard error diffusion, if the modified input value of a pixel is lower than the threshold, then the halftone result is set low and the error distributed to neighbouring pixels acts to increase the likelihood that neighbouring pixels are set high. Conversely if the modified input value of a pixel is higher than the threshold, then the halftone result is set high and the error distributed to neighbouring pixels acts to increase the likelihood that neighbouring pixels are set low.

The proportion of the (non-zero) error of an arbitrary reference pixel which contributes to the neighbourhood error of a subsequently processed pixel of interest, is a measure of a disincentive to assign the pixel of interest the same halftone output result as the reference pixel.

Due to the typically sequential processing of pixels, and because the processing of each pixel includes the distribution (according to the error diffusion mask) of that pixel's error, being the sum of that pixel's neighbourhood error (the error distributed to that pixel) and that pixel's pixel-only error, a pixel contributes a proportion of its error to the neighbourhood error of pixels which are beyond those to which it directly distributes error.

Error Diffusion Implementable with a Single Error Line Store

Error diffusion is now described, where:
(a) pixels are processed one at a time across a scanline or row, either left to right or right to left, and scanlines are processed one after another from the top to the bottom of the image; and
(b) the error diffusion mask includes only pixel positions in the current and succeeding scanline.

Figure 8:
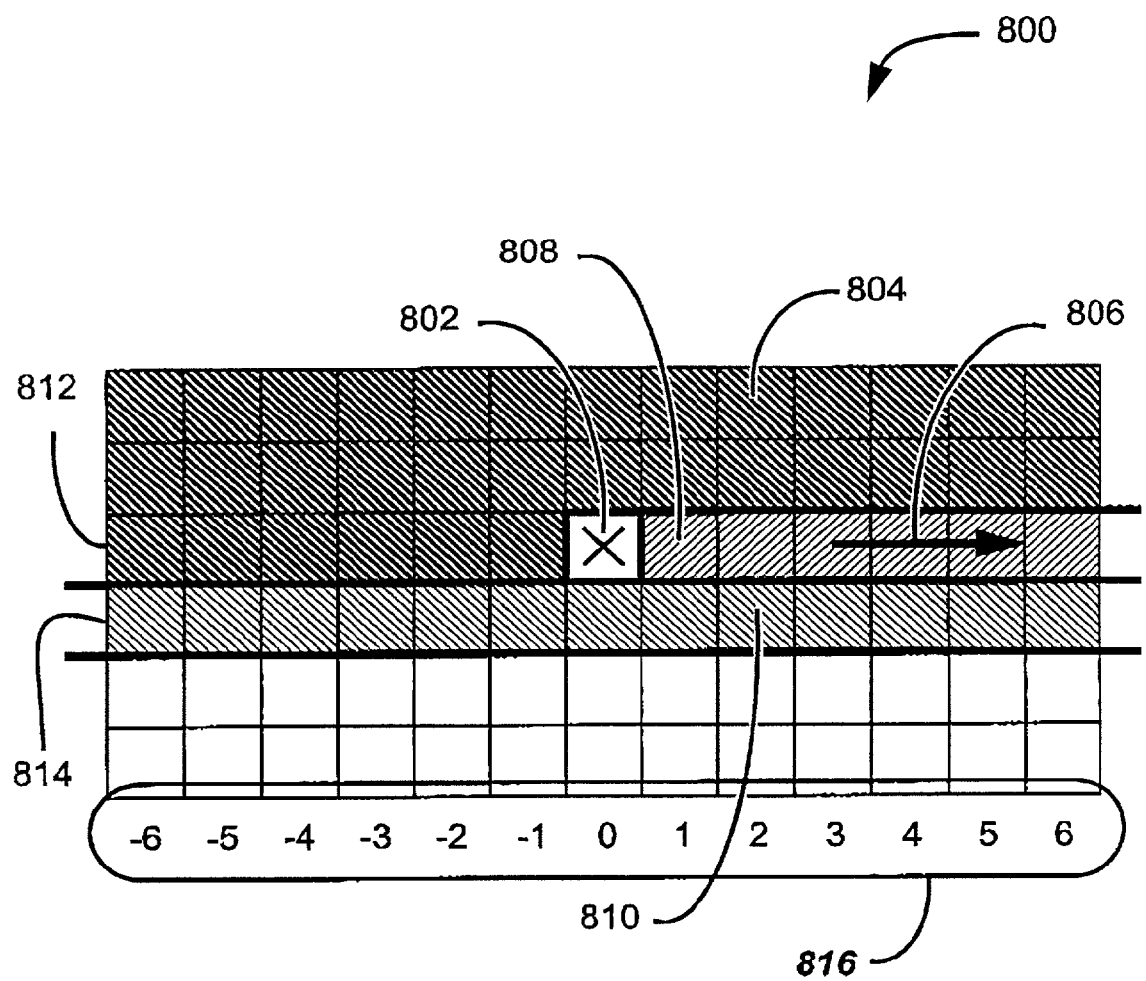
FIG. 8 shows distribution of pixel errors for error diffusion using a single error line store.

FIG. 8 is a diagram indicating, for this class of error diffusion, the pixels to which error is distributed. FIG. 8 a representation 800 in which a current pixel 802 is shown on a current scanline 812, where scanline processing is from left to right as depicted by an arrow 806, and where previously processed pixels eg. 804 are full shaded. Current scanline mask positions eg. 808 denote mask values for pixel positions on the current scanline, and are designated $mask_{curr}[i] (i>0)$. Next scanline mask positions eg. 810 denote mask values for pixel positions on the next scanline, and are designated $mask_{next}[i]$. Mask positions on the current and next scanlines are identified by a horizontal pixel offset "i". Horizontal pixel offsets are shown in FIG. 8 by circled numbers 816.

Error Diffusion Processing per Pixel

Figure 9:
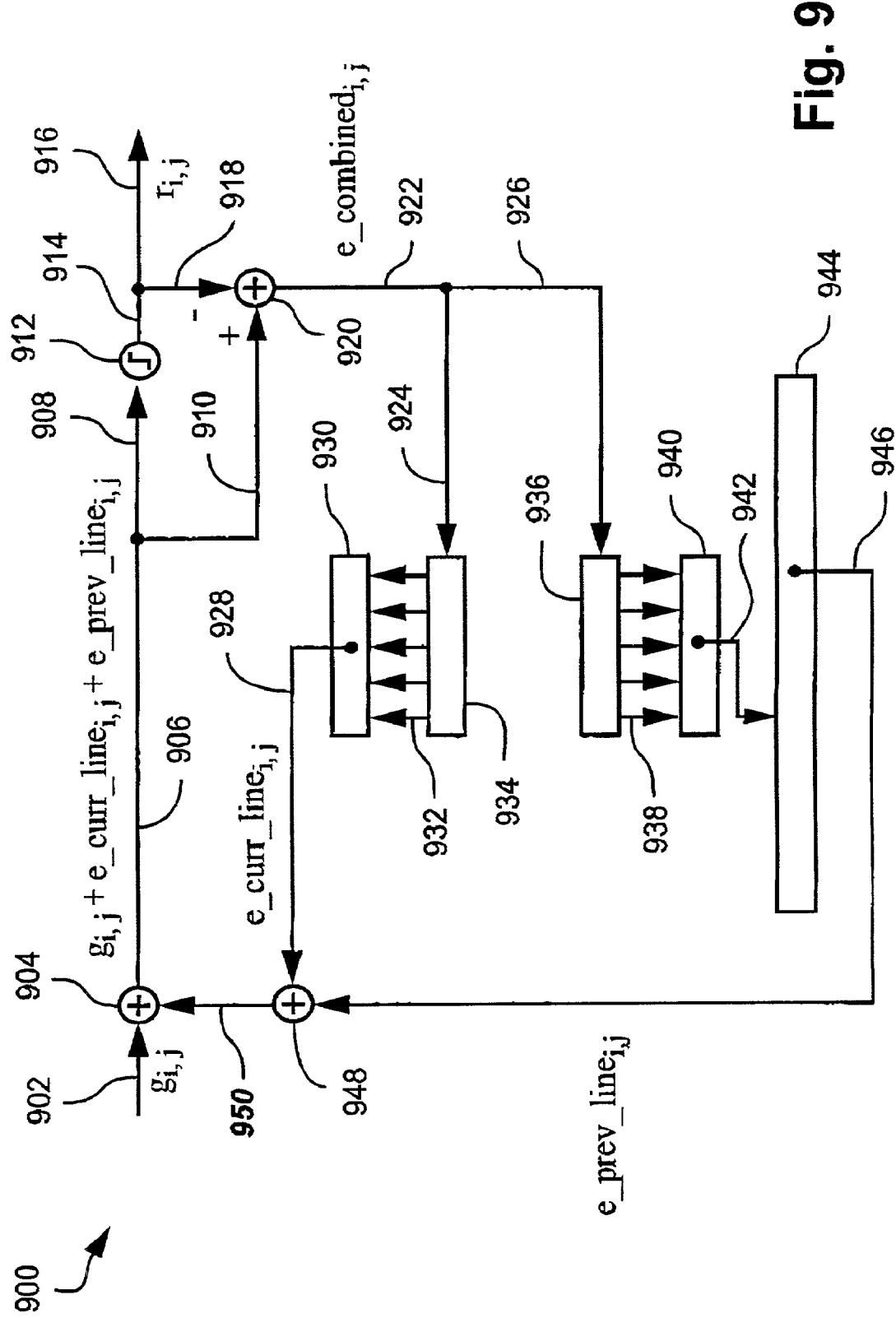
FIG. 9 shows error diffusion processing for an arbitrary pixel.

FIG. 9 shows error diffusion processing per pixel, for an arbitrary pixel of column i and scanline j. FIG. 9 shows a block diagram representation 900 where an input image grey level at pixel (i,j) ie. 902 is provided to an addition process 904 which outputs, on a line 906, the sum of the input image grey level ($g_{i,j}$), a total error distributed directly to pixel (i,j) from pixels of the current scanline ($e\_curr\_line_{i,j}$), and a total error distributed directly to the pixel (i,j) from pixels of a previous scanline ($e\_prev\_line_{i,j}$).

The output signal on the line 906 is provided, on a line segment 908, to a threshold process 912 where it is compared against a threshold to obtain a halftone result for the pixel on a line 914, and subsequently on a line segment 916, the halftone result being designated $r_{i,j}$. The modified input value on the line 906 is also provided on a line segment 910 to an adder process 920 which receives a negative value of the halftone result for the pixel on a line segment 918. An output from the addition process 920 is an error for distribution (designated $e\_combined_{i,j}$) on a line 922. This error for distribution is provided on a line 924 to a current scanline error distribution unit (designated $mask_{curr}$) 934 which distributes the combined pixel error $e\_combined_{i,j}$, as shown by an exemplary arrow 932, to unprocessed pixels of the current scanline in a current line error buffer 930. An output from the current line error buffer 930 is provided on a line 928 (the signal being designated as $e\_curr\_line_{i,j}$) and is delivered to an adder process 948. The combined pixel error $e\_combined_{i,j}$ is also provided on a line 926 to a next scanline error distribution unit (designated as $mask_{next}$) 936, which outputs, as exemplified by an arrow 938, corresponding values to pixels of the next scanline which are stored in a line store error buffer 940. The buffer 940 provides an output on a line 942 to an error line store 944. On a line 946, a value is retrieved from the error line store, the value being the total error distributed directly to a pixel (i,j) from pixels of the previous scanline, ie. $e\_prev\_line_{i,j}$.

Operation of the process of FIG. 9 is described by the following 4 steps.

Step 1. Derive a modified input value for the pixel as:

$$g_{ij}+e\_curr\_line_{ij}+e\_prev\_line_{ij} \qquad (30)$$

where: $g_{ij}$ is the input image grey level at pixel (i,j), $e\_curr\_line_{ij}$ is the total error distributed directly to pixel (i,j) from pixels of the current scanline, and $e\_prev\_line_{ij}$ is the total error distributed directly to pixel (i,j) from pixels of the previous scanline;

Step 2. Compare the modified input value against a threshold to obtain the halftone result for the pixel, denoted as $r_{ij}$ Step 3. Calculate an error for distribution as:

$$e\_combined_{ij}=e_{ij}+e\_curr\_line_{ij}+e\_prev\_line_{ij} \qquad (1)$$

where: $e_{ij}$ is the pixel-only error equal to $g_{ij}-r_{ij}$

Step 4. Distribute the combined pixel error, $e\_combined_{ij}$ according to the error diffusion mask to unprocessed pixels of the current scanline and pixels of the next scanline.

In step 1, the total error distributed to a pixel (i,j) from previously processed pixels is referred to as the "neighbourhood error" at pixel (i,j). The neighbourhood error, $e\_nbr_{ij}$, modifies the pixel input value prior to thresholding and is given by:

$$e\_nbr_{ij}=e\_curr\_line_{ij}+e\_prev\_line_{ij} \qquad (2)$$

In step 4 error values which are portions of the combined pixel error, $e\_combined_{ij}$ are used to update error sum values in a current line error buffer and in a line store error buffer.

Each error sum value in the current line error buffer is associated with a pixel position on the current scanline ahead of the current pixel—a "future pixel" of the current scanline; that error sum value is the sum of error values distributed directly to that future pixel from processed pixels of the current scanline.

Similarly, each error sum value in the line store error buffer is associated with a pixel position on the next scanline—a "next scanline pixel"; that error sum value is the sum of error values distributed directly to that next scanline pixel from processed pixels of the current scanline.

The number of error sum values in the current line error buffer and in the line store error buffer need only be as large as the number of error diffusion mask positions on the current scanline and next scanline respectively.

In step 4, once the error sum values in the line store error buffer have been updated, one value in the line store error buffer is complete, in that it will receive no fiber contributions, and it is transferred to the error line store.

The number of error sum values in the error line store needs to be (and need only be) as large as the number of pixels on a scanline—hence the name "line store".

The error sum values in the error line store generated by processing one scanline are used as input in the processing of the next scanline. When each pixel is processed:
 one error line store value is read (and the memory location from which it is read becomes available to store another error line store value)
 error sum values in the line store error buffer are updated, and
 one error line store value is written.

Figure 10:
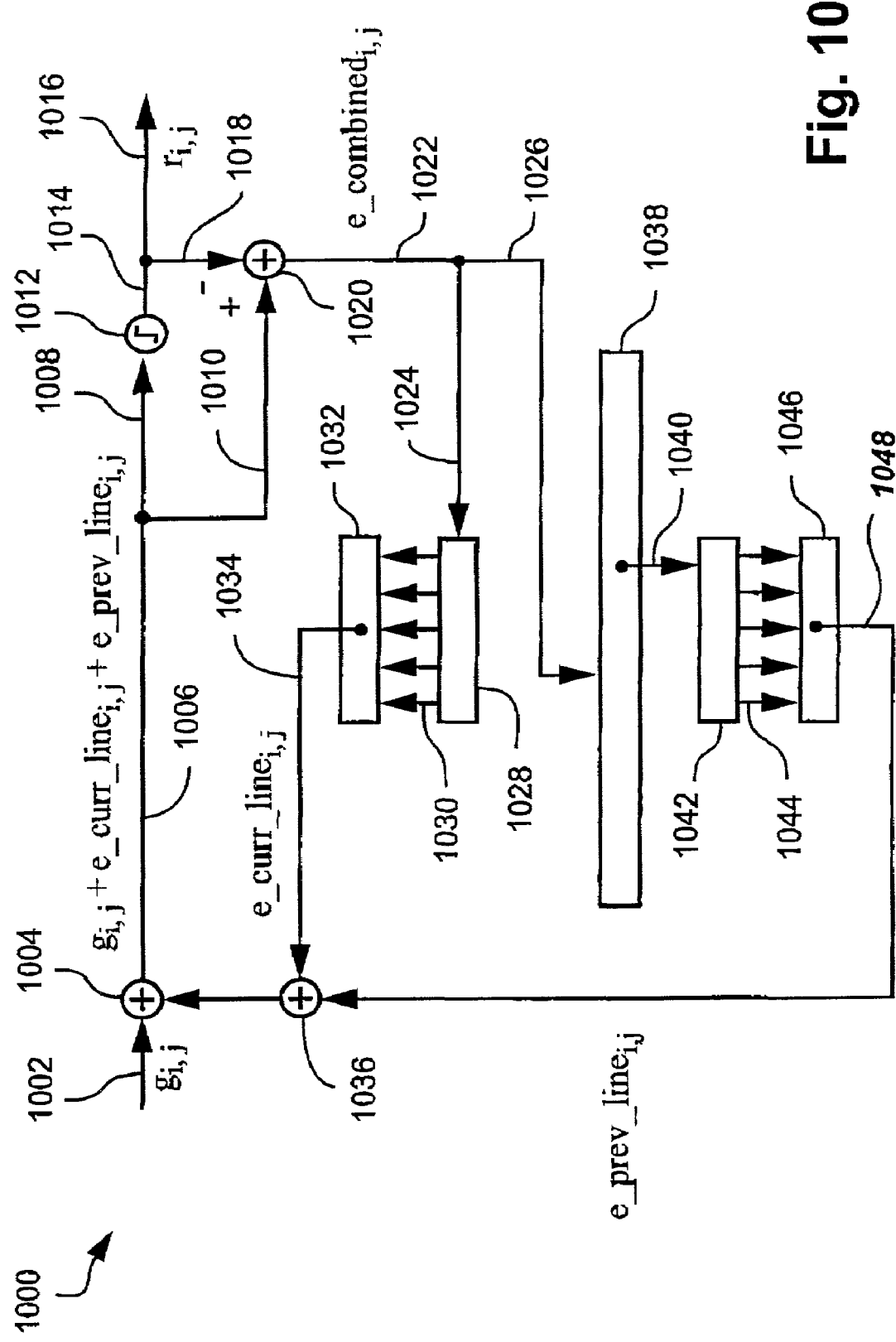
FIG. 10 shows an alternate arrangement of error diffusion processing on a per pixel basis.

FIG. 10 shows an alternative implementation 1000 of the error diffusion processing per pixel. The input image grey level at pixel (i,j), ie $g_{i,j}$ is provided to an adder process 1004 on a line 1002. The adder process 1004 outputs, on a line 1006, the sum of the input image grey level ($g_{i,j}$), the total error distributed directly to pixel (i,j) from pixels of the current scanline (ie. e_curr_line$_{i,j}$), and the total error distributed directly to the pixel (i,j) from pixels of the previous scanline (ie. e_prev_line$_{i,j}$). This value on the line 1006 is provided, by a line segment 1008, to a threshold process 1012 for comparison against a threshold, which consequently produces, on a line 1014, the output result for the pixel (ie. r$_{i,j}$) on a line 1016.

An inverse of the halftone result (ie. negative r$_{i,j}$) is provided on a line 1018 to an addition process 1020, along with the modified input value (ie. g$_{i,j}$+e_curr_line$_{i,j}$+e_prev_line$_{i,j}$) on a line 1010. An output from the addition process 1020 is provided on a line 1022, this being the error for distribution e_combined$_{i,j}$. This error for distribution is provided on a line 1024 to the current scanline error distribution unit (designated as mask$_{curr}$) 1028, which outputs, as exemplified by an arrow 1030, error distributions to unprocessed pixels of the current scanline in a current line error buffer 1032. The buffer 1032 consequently outputs the total error distributed directly to pixel (i,j) from pixels of the current scanline (ie e_curr_line$_{i,j}$) on a line 1034 to an addition process 1036. The error for distribution on the line 1022 is also distributed, on a line 1026, to an error line store 1038. From the error line store a weighted sum of error values is retrieved on a line 1040 to a next scanline error distribution unit (designated as mask$_{next}$) 1042, which distributes the weighted sum, as exemplified by an arrow 1044, to a line store error buffer 1046. The buffer 1046 provides, on a line 1048, the total error distributed directly to the pixel (i,j) from pixels of the previous scanline (ie. e_prev_line$_{i,j}$) to the addition process 1036.

The difference between the 2 implementations, is that in the alternative implementation:
(a) the combined error at a pixel is written to a location in the error line store;
(b) the contribution to neighbourhood error by direct distribution from pixels of a previous scanline is determined as a weighted sum of error values retrieved from the error line store. That is, in the alternative implementation, distribution of error to pixels of the next scanline is achieved by gathering error values from the line store, rather than distributing error amongst line store locations.

An analysis is presented below concerning self-convolution of a next scanline error impulse response function. That analysis is described referring to FIG. 9; however the same analysis also applies to the alternative implementation of FIG. 10.

Next Scanline Error Impulse Response Function for Error Diffusion Implementable with a Single Error Line Store Error diffusion is now considered for the case where 100% of the combined pixel error is distributed to as yet unprocessed pixels (step 4 above), and the fraction of error distributed to the next scanline is considered to be positive and non-zero.

Further, error diffusion is considered for the case where the error diffusion mask weights do not change from pixel to pixel. That is, it is assumed that the processing per pixel is spatially invariant.

The distribution of the combined pixel error of an arbitrary reference pixel (but which is not near the left and right edges of the image) is now considered according to the error diffusion mask. Part of that combined pixel error is distributed to pixels of the next scanline, and the remainder of the combined pixel error is distributed to pixels of the current scanline. This remainder error remains subject to error distribution according to the error diffusion mask as part of the processing of the current scanline. With the complete processing of the current scanline, effectively all of the combined error of the reference pixel is distributed to pixels of the next scanline.

The distribution of combined pixel error of an arbitrary reference pixel of the current scanline to pixels of the next scanline, as a result of the complete processing of the scanline, defines a "next scanline error impulse response" function which is denoted as h$_{next}$. To be precise, h$_{next}$ is defined as a function which maps integers to real values; where h$_{next}$[i] is that fraction of the error at a reference pixel which, following the complete processing of the scanline of the reference pixel, is distributed to the pixel on the next scanline horizontally offset i from the reference pixel. This is shown illustratively with reference to FIG. 13.

Self-Convolutions of the Next Scanline Error Impulse Response Function

As the domain of the function h$_{next}$ is the set of integers, it can also be considered as a (two-sided) sequence.

The set of input image grey levels, g$_{ij}$, is considered for a scanline j as a sequence, and the sequence is denoted as g$_j$.

Similarly:
the sequence of error sum values, e_prev_line$_{ij}$, being sums of errors distributed directly to pixels of scanline j from scanline j−1, is denoted as e_prev_line$_j$;
the sequence of halftone output image values for scanline j is denoted as r$_j$;
the sequence of pixel-only errors for scanline j is denoted as e$_j$.

For the class of error diffusion considered, the processing performed for each scanline, j, can be considered to take as input the following:

$$\text{e\_prev\_line}_j, g_j \quad (31)$$

and produces as output the following:

$$r_j, e_j, \text{e\_prev\_line}_{j+1} \quad (32)$$

For the implementation of FIG. 9, as part of the processing of scanline j, the sequence of values e_prev_line$_j$ are read from the error line store and the sequence of values e_prev_line$_{j+1}$ are written to the error line store.

From the definition of the next scanline error impulse response function, the following can be written:

$$\text{e\_prev\_line}_{j+1} = (e_j + \text{e\_prev\_line}_j) * h_{next} \quad (3)$$

That is, the sequence of sums of error values distributed directly to pixels of scanline j+1 from scanline j can be represented as the sum of the error sequence for scanline j and the sequence of sums of error values distributed directly to pixels of scanline j from scanline j−1 convolved with the next scanline error impulse response function.

Here the convolution of 2 sequences is denoted by '*' and the sequence formed by the convolution of 2 sequences, f and g is defined as:

$$(f*g)[i] = \Sigma_{k \in Z} f[i-k] g[k] \quad (33)$$

where Z is the set of all integers.

Assuming that the next scanline error impulse response function is the same for each scanline, (3) can be applied recursively, and the sequence of sums of error values distributed directly to pixels of a scanline from the previous scanline can be written as a weighted sum of pixel only errors of pixels of preceding scanlines.

That is, $$e\_prev\_line_j = (e_{j-1} + e\_prev\_line_{j-1}) * h_{next} \quad (33)$$

$$= (e_{j-1} + (e_{j-2} + e\_prev\_line_{j-2}) * h_{next}) * h_{next} \quad (34)$$

and so on, giving $$e\_prev\_line_j = \Sigma_{1<j} e_1 * h_{next}^{*(j-1)} \quad (4)$$

where $h_{next}^{*n}$ denotes the sequence formed as the convolution of the sequence $h_{next}$ with itself 'n−1' times. So that $$h_{next}^{*1} = h_{next} \quad (35)$$

$$h_{next}^{*2} = h_{next} * h_{next} \text{ and so on.} \quad (36)$$

The Current Scanline Error Impulse Response Function in Terms of the Error Diffusion Mask The error diffusion mask can be represented using 2 functions which map the integers into real values, $mask_{curr}$ and $mask_{next}$, where:

$mask_{curr}[i]$ is the error diffusion mask weight for that pixel on the current scanline horizontally offset by 'i' from the reference pixel being processed; and $mask_{next}[i]$ is the error diffusion mask weight for that pixel on the next scanline horizontally offset by 'i' from the reference pixel being processed.

FIG. 8 shows horizontal pixel offsets 816 from a reference pixel, together with mask positions 808 and 810 on the current and next scanline respectively.

Due to the sequential processing of pixels of the current scanline, $$mask_{curr}[i]=0 \text{ for } i<=0. \quad (37)$$

As a consequence of the error diffusion processing per pixel and from considering FIG. 9 it is seen that:

$$e\_curr\_line_{i,j} = \Sigma_{k \in Z} e\_combined_{i-k,j} \cdot mask_{curr}[k] \quad (38)$$

That is, the corresponding sequences are related by the convolution operation:

$$e\_curr\_line_j = e\_combined_j * mask_{curr} \quad (5)$$

The sequence $e\_combined_j$ is the same as $(e_j + e\_curr\_line_j + e\_prev\_line_j)$, and so:

$$e\_curr\_line_j = (e_j + e\_curr\_line_j + e\_prev\_line_j) * mask_{curr} \quad (6)$$

By repeatedly replacing $e\_curr\_line_j$ in the right hand side of (6) with the entire right hand side of (6), the following relationship results:

$$e\_curr\_line_j = (e_j + e\_prev\_line_j)*(mask_{curr} + mask_{curr}*mask_{curr} + \ldots) \quad (39)$$

That is, $$e\_curr\_line_j = (e_j + e\_prev\_line_j) * h_{curr} \quad (7)$$

where $h_{curr}$ is the function (sequence) given by:

$$h_{curr} = mask_{curr} + mask_{curr}^{*2} + mask_{curr}^{*3} + \quad (8)$$

$h_{curr}$ is equivalently defined by the recursive definition:

$$h_{curr} = (\delta + h_{curr}) * mask_{curr} \quad (9)$$

where $\delta$ is the delta function (sequence) given by:

$$\delta[k]=1 \text{ for } k=0 \quad (40)$$

$$\delta[k]=0 \text{ for } k \neq 0 \quad (41)$$

$h_{curr}$ is referred to as the current scanline error impulse response function.

The Next Scanline Error Impulse Response Function in Terms of the Error Diffusion Mask As is the case for the current scanline error impulse response function, the next scanline error impulse response function is determined by the error diffusion mask.

As a consequence of the error diffusion processing per pixel and from considering FIG. 9 the following relationship can be expressed:

$$e\_prev\_line_{i,j+1} = \Sigma_{k \in Z} e\_combined_{i-k,j} \cdot mask_{next}[k] \quad (42)$$

That is, the corresponding sequences are related by the convolution operation:

$$e\_prev\_line_{j+1} = e\_combined_j * mask_{next} \quad (10)$$

As above, using the fact that the sequence $e\_combined_j$ is the same as $(e_j + e\_curr\_line_j + e\_prev\_line_j)$, the following is seen:

$$e\_prev\_line_{j+1} = (e_j + e\_curr\_line_j + e\_prev\_line_j) * mask_{next} \quad (11)$$

By replacing $e\_curr\_line_j$ in the right hand side of (11) with the right hand side of (7), the following is seen:

$$e\_prev\_line_{j+1} = (e_j + e\_prev\_line_j + (e_j + e\_prev\_line_j) * h_{curr}) * mask_{next} \quad (43)$$

which can be re-written as $$e\_prev\_line_{j+1} = (e_j + e\_prev\_line_j) * ((\delta + h_{curr}) * mask_{next}) \quad (44)$$

Comparing this with (3), it is seen that that the next scanline error impulse response function is given by:

$$h_{next} = (\delta + h_{curr}) * mask_{next} \quad (12)$$

By substituting the expansion of $h_{curr}$ of (8) into (12) it is seen that $$h_{next} = mask_{next} * (\delta + mask_{curr} + mask_{curr}^{*2} + mask_{curr}^{*3} + \ldots) \quad (13)$$

Current and Next Scanline Error Impulse Response Functions for Standard Error Diffusion To assist an understanding of the above definitions of the current and next scanline error impulse response functions, the current and next scanline error impulse response for standard (Floyd Steinberg) error diffusion are now described.

For Floyd Steinberg error diffusion, the error diffusion mask is defined by the following mask functions:

$$\left. \begin{array}{l} mask_{curr}[i] = 0 \text{ for } i \neq 1 \\ mask_{curr}[1] = 7/16 \end{array} \right\} \text{ and} \quad (45)$$

$$\left. \begin{array}{l} mask_{next}[i] = 0 \text{ for } i < -1 \text{ and } i > 1 \\ mask_{next}[-1] = 3/16 \\ mask_{next}[0] = 5/16 \\ mask_{next}[1] = 1/16 \end{array} \right\} \quad (46)$$

For Floyd Steinberg error diffusion, the current scanline error impulse response function is given by:

$$\left. \begin{array}{l} h_{curr}[i] = 0 \text{ for } i <= 0 \\ h_{curr}[i] = (7/16)^i \text{ for } i >= 1 \end{array} \right\} \quad (47)$$

which is consistent with (8) and (9).

For Floyd Steinberg error diffusion, the next scanline error impulse response function is given by:

$$\begin{aligned} h_{next}[i] &= 0 \text{ for } i < -1 \\ h_{next}[-1] &= 3/16 \\ h_{next}[0] &= 5/16 + 7/16*3/16 \\ h_{next}[i] &= (1/16 + 7/16*5/16 + \\ & \quad (7/16)^2 * 3/16) * (7/16)^{i-1} \text{ for } i > 0 \end{aligned} \quad (48)$$

which is consistent with (12).

Description of Error Diffusion Processing in Terms of the Current and Next Scanline Error Impulse Response Functions This description provides, firstly, further clarification of the current and next scanline error impulse response functions, and secondly, it is the basis for later discussion concerning desirable characteristics of the current and next scanline error impulse response functions.

Figure 11:
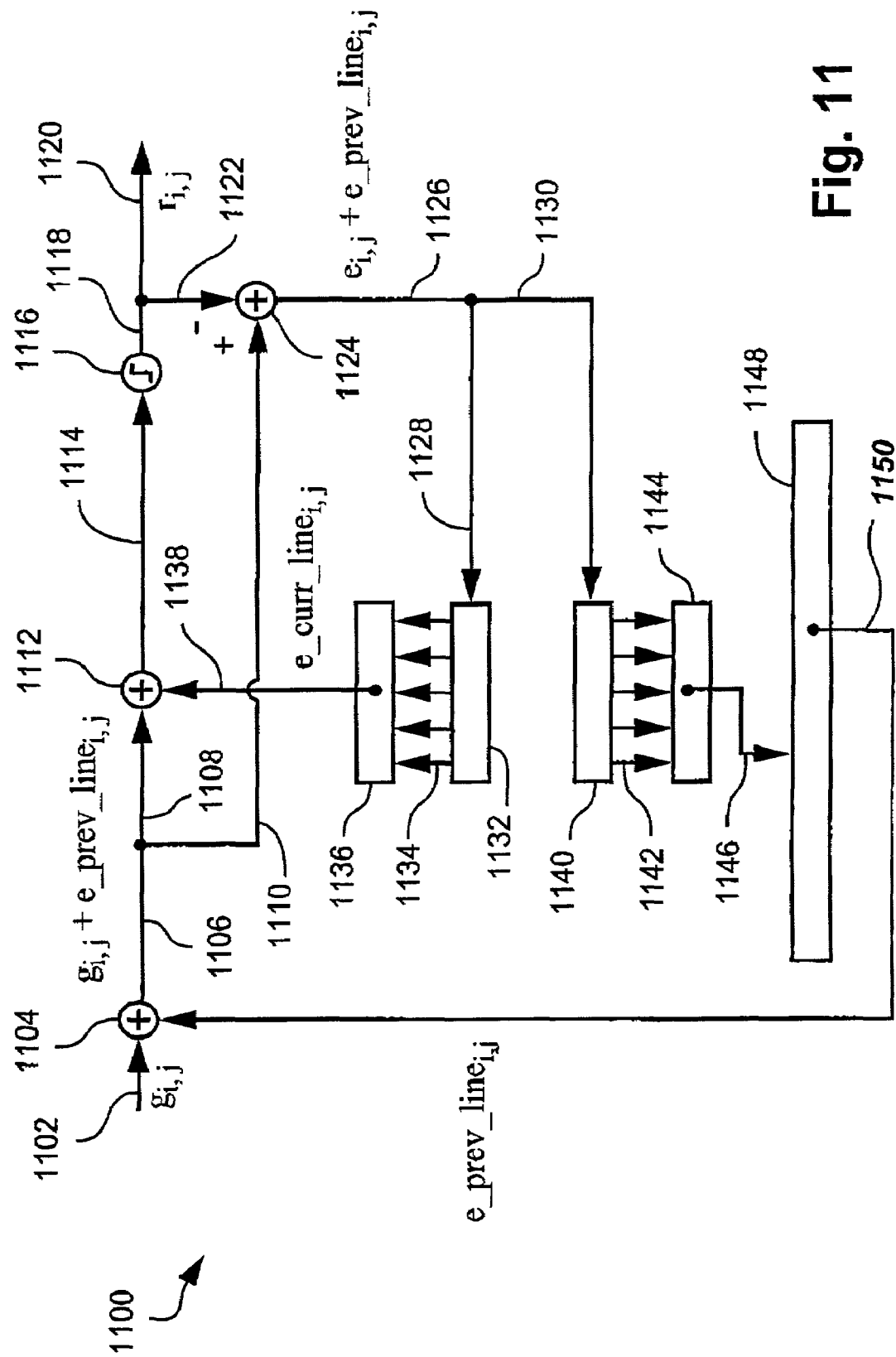
FIG. 11 shows error diffusion processing per pixel in accordance with current and next scanline error impulse response functions.

FIG. 11 shows error diffusion processing per pixel in terms of the current and next scanline error impulse response functions, $h_{curr}$ and $h_{next}$. The input image grey level at pixel (i,j), ie. $g_{i,j}$, is provided, as depicted by an arrow 1102, to an addition process 1104. The addition process 1104 provides, as depicted by a line segment 1106, the sum of the input image grey level ($g_{i,j}$), and the total error distributed directly to the pixel (i,j) from pixels of the previous scanline (ie. e_prev_line$_{i,j}$) on a line 1108, to an addition process 1112, and also, on a line 1110, to an addition process 1124. The addition process 1112 provides an output on a line 1114 to a threshold process 1116, which compares the value against a threshold, consequently outputting the halftone result for the pixel $r_{i,j}$ on a line 1118. An inverted value of the halftone result (ie. $-r_{i,j}$) is provided on a line 1122 to the addition process 1124.

The addition process 1124 outputs, on a line 1126, and on a line segment 1128, an aggregate value to a current scanline error impulse response distribution unit 1134 (designated $h_{curr}$) which provides, as exemplified by an arrow 1134, values distributed to pixels of the current scanline in a buffer 1136. From a buffer 1136 on a line 1138, a value labelled as e_curr_line$_{i,j}$ is provided to the addition process 1112. In a similar manner, the signal on the line 1126 is provided, on a line segment 1130, to a next scanline error impulse response distribution unit (designated $h_{next}$) 1140 which, as exemplified by an arrow 1142, distributes a value in accordance with the next scanline error impulse response $h_{next}$ to pixels of the next scanline in a line store error buffer 1144. The buffer 1144 consequently outputs, on a line 1146, a value to the error line store 1148. From the error line store, a value labelled as e_prev_line$_{i,j}$ is retrieved and provided to the addition process 1104.

Now the labels, e_curr_line$_{i,j}$ and e_prev_line$_{i,j}$ in FIG. 11 are consistent with the previous definitions of these terms. This is because 1. the sequence resulting from applying the current scanline error impulse response to the sequence $e_j$+e_prev_line$_j$ is the same as the sequence resulting from applying the current scanline mask coefficients to the sequence e_combined$_j$, which can be seen from (5) and (7) follows:

$$e\_curr\_line_j = e\_combined_j * mask_{curr} = (e_j + e\_prev\_line_j) * h_{curr} \quad (49)$$

2. the sequence resulting from applying the next scanline error impulse response to the sequence $e_j$+e_prev_line$_j$ is the same as the sequence resulting from applying the next scanline mask coefficients to the sequence e_combined$_j$, which can be seen from (3) and (10) as follows:

$$e\_prev\_line_{j+1} = e\_combined_j * mask_{next} = (e_j + e\_prev\_line_j) * h_{next} \quad (50)$$

That is, if $h_{curr}$ and $h_{next}$ are defined in terms of mask$_{curr}$ and mask$_{next}$ according to (8) or (9) and (12) or (13), then the processing described in relation to FIG. 11 is equivalent to the processing described in relation to FIGS. 9 and 10 in that they produce the same output. In each case, for each pixel, the same quantity, $g_{i,j}$+e_curr_line$_{i,j}$+e_prev_line$_{i,j}$ is applied to the threshold operation.

In general, for implementations of error diffusion, the processing models of FIG. 9 or 10 are preferred over the processing model of FIG. 11. This is because error diffusion masks with non-zero coefficients at a small number of pixel offset positions, correspond to current and next scanline error impulse response functions which typically have an unbounded number of non-zero function values.

However, the current and next scanline error impulse response functions and the processing model of FIG. 11 are useful for describing desirable features of error diffusion processing, and also for performing experiments to establish desirable features of error diffusion processing.

The neighbourhood error at a current pixel, is the total error distributed directly from previously processed pixels to the current pixel, and is used to modify the current pixel's input grey value prior to thresholding. Considering the sequence of neighbourhood errors for a scanline, the following is seen:

$$\begin{aligned} e\_nbr_j &= e\_curr\_line_j + e\_prev\_line_j \quad &(50)^* \\ &= (e_j + e\_prev\_line_j) * h_{curr} + (e_{j-1} + e\_prev\_line_{j-1}) * h_{next} \quad &(51) \end{aligned}$$

giving, $$e\_nbr_j = E_j * h_{curr} + E_{j-1} * h_{next} \quad (14)$$

The above equation (14) neatly isolates the contribution to neighbourhood error from pixels of the current scanline and pixels of the previous scanline in terms of a common error value per pixel. That common error value per pixel warrants a special name. The (previous scanlines) "modified pixel error" for a pixel (i,j) $E_{i,j}$ is defined as:

$$E_{ij} = e_{ij} + e\_prev\_line_{ij} \quad (52)$$

Equation 14 provides assistance in inferring some conclusions regarding desirable characteristics of error diffusion.

Desirable Attributes of the Next Scanline Error Impulse Response Function: Requirement of Unity Sum As noted earlier, in order that the average halftone image output matches the average image input, it is a requirement that the sum of the error diffusion coefficients should be 1. That is, $$\Sigma_i \text{mask}_{curr}[i] + \Sigma_i \text{mask}_{next}[i] = 1 \quad (15)$$

It follows from equations 13 and 15, assuming that the absolute value of the sum of error diffusion mask coefficients on the current scanline is less than 1, that the sum of coefficients of the next scanline error impulse response function is 1:

$$\Sigma_i h_{next}[i] = 1 \quad (16)$$

In summary, for the processing model of FIGS. 9 and 10, involving the 2 functions $mask_{curr}$ and $mask_{next}$; the requirement that average halftone image output matches average image input is summarised by (15), whereas for the processing model of FIG. 11, the same requirement is summarised by equation 16, involving only one function $h_{next}$.

That is, in the processing model of FIG. 11, the current scanline error impulse response function can be varied independently, without compromising the requirement for average halftone output to match average image input.

Desirable Attributes of the Next Scanline Error Impulse Response Function: Requirement of Left-Right Symmetry The next scanline error impulse response function as defined by equation 3, and as depicted in FIG. 11, does not show any dependence on whether current scanline processing is left to right or right to left.

If it is assumed that current scanline processing does a very good job of setting halftone output values for the scanline, and consequently generating pixel only error values for the scanline, then it is reasonable to assume that subsequent processing of the next scanline could be left to right or right to left and does not need to compensate for any left-right bias in the pixel only errors of the current scanline. It seems clear then that the next scanline error impulse response function should not be biased to left or right but be left-right symmetric.

A requirement is thus defined that the next scanline error impulse response function should be left-right symmetric.

In fact, some signal shifting or phase distortion due to the current scanline error impulse response function is inevitable because it is a causal filter. However, the signal shifting and phase distortion can be made small. So, it is reasonable to ignore compensation for left-right bias by use of the next scanline error impulse response function, at least for discussion of appropriate spreading of the next scanline error impulse response function.

Desirable Attributes of the Current and Next Scanline Error Impulse Response Functions: Requirement of being Monotonic Decreasing with Increasing Horizontal Pixel Offset The current scanline error impulse response function measures the degree to which the halftone error at a current pixel on the current scanline should be taken account of in the halftone decision of a subsequently processed pixel on the current scanline.

Also, having concluded, at least to a first approximations that the next scanline error impulse response function should be left-right symmetric, there is no preference in whether a scanline is processed in the same direction as the preceding scanline. The next scanline error impulse response function contributes to the amount to which the halftone error at a current pixel on the current scanline is taken account of in the halftone decision of a pixel on the next scanline.

It is further suggested that both the current and next scanline impulse response functions should decrease monotonically with increasing horizontal pixel separation.

Desirable Attributes of the Next Scanline Error Impulse Response Function: Requirement of Similar Shape of Current and Next Scanline Error Impulse Response Functions Having concluded, at least to a first approximation, that the next scanline error impulse response function should be left-right symmetric, it can be seen using (52) and (4) that each of the modified pixel error values, $E_{ij}$, is a weighted sum of pixel-only errors and is obtained by convolution of pixel-only scanline sequences ($e_j$), with left-right symmetric function $h_{next}*(i-1)$.

Thus, (2) and (14) isolate the asymmetric and symmetric influence of pixel only error of previously processed pixels on the halftone decision at a current pixel.

That is, the term $$e\_curr\_line_{ij} = (E_j * h_{curr})[i] \quad (53)$$

is an asymmetric contribution to the neighbourhood error of pixel (i,j), being the error distributed to the pixel directly from pixels of the current scanline; whereas the term $$e\_prev\_line_{ij} = (E_{j-1} * h_{next})[i] \quad (54)$$

is a symmetric contribution, being the error distributed to the pixel directly from pixels of the previous scanline.

In a similar argument to that for inferring monotonicity and left-right symmetry, it is suggested that the contribution to the neighbourhood error of the current pixel, from the modified error of previously processed pixels of the current scanline, should reduce with increasing horizontal separation in a singular fashion to the contribution from the modified error of previously processed pixels of the previous scanline. In his way no particular horizontal separation is favoured on either the current or previous scanline.

Desirable Attributes of the Next Scanline Error Impulse Response Function: Requirement of Appropriate Spreading Experiments have been performed, observing halftone output when the next scanline error impulse response function has various shapes. In each case, the current scanline response function has the same shape as the next scanline response function, being determined from the next scanline response function by multiplication by a step function Note that in these simulations the number of non-zero values used for the current and next scanline response functions was set high to avoid misleading results due to truncation of the functions.

Experiment 1

In this case the next scanline error impulse response function is a sampling of the 2-sided exponential distribution.

$$\left. \begin{array}{l} h_{curr}[i] = a \cdot w^i \text{ for } i >= 1 \\ h_{next}[i] = ((1-w)/(1+w)) \cdot w^{|i|} \end{array} \right\} \quad (55)$$

where a is a positive constant and w is a constant with 0<w<1

Note that with a=1, the above current and next scanline error impulse response functions correspond to the following mask functions $$\left. \begin{array}{l} mask_{curr}[1] = w \text{ and } mask_{curr}[i] = 0 \text{ for } i \neq 1 \\ mask_{next}[i] = (1-w)^2 w^{|i|} \text{ for } i <= 0 \text{ and } mask_{next}[i] = 0 \text{ for } i > 0 \end{array} \right\} \quad (56)$$

With a=1 and w=½, the above mask functions and functions $h_{curr}$ and $h_{next}$ provide an extension to U.S. Pat. No. 5,353,127 (Shiau & Fan) where the extended distribution set of the error diffusion mask is left extended without limit.

Observations for Experiment 1

When a=1 and w=½, halftone output at very low or very high grey levels suffers from worm type artifacts where the horizontal separation of minority pixels is too small These artifacts can be reduced by increasing either of the parameters a or w. However modifying these parameters so that minority pixels at very low or very high grey levels are better separated, introduces other unpleasant artifacts, including artifacts where for other grey levels the vertical separation between pixels becomes too small.

Experiment 2

In this case the next scanline error impulse response function is a sampling of the gaussian distribution.

$$h_{curr}[i] = a \cdot \exp(-\pi \cdot (i/b)^2) \text{ for } i >= 1 \atop h_{next}[i] = c \cdot \exp(-\pi \cdot (i/b)^2) \quad \Big\} \quad (57)$$

where a, b, c are positive constants, with c chosen so that $\Sigma_i h_{next}[i]=1$ The parameter b defines the width of the gaussian distribution.

Observations for Experiment 2

When $a=\frac{1}{2}$ and $b=4$, halftone output at low or high grey levels suffers from worm type artifacts where the horizontal separation of minority pixels is too small. These artifacts can be reduced by increasing a or b. However, again, modifying these parameters so that minority pixels at low or high grey levels are better separated, introduces other unpleasant artifacts, including artifacts where for other grey levels the vertical separation between pixels becomes too small.

Experiment 3

In this case the next scanline error impulse response function is a sampling of the Cauchy distribution (also known as the Lorentz distribution), $$h_{curr}[i] = a \cdot 1/(b^2 + i^2) \text{ for } i >= 1 \atop h_{next}[i] = c \cdot 1/(b^2 + i^2) \quad \Big\} \quad (58)$$

where a, b, c are positive constants, with c chosen so that $\Sigma_i h_{next}[i]=1$ The parameter b controls the spread of the distribution.

Observations for Experiment 3

When $a=1$ and $b=1$, the halftone patterns for all grey levels with sparse halftone patterns are well spread. Also the general quality of the halftone output is high across all grey levels.

With 8 bit monochrome halftoning, the extreme sparse halftone patterns correspond to grey levels 1 and 254. By allowing fractional grey levels less than 1 the behaviour of error diffusion can be observed for halftone patterns which are much more sparse than the halftone patterns for grey level 1.

It is noted that the very sparse halftone patterns for sub-unity fractional grey values are also well spread when the Cauchy distribution is used for the current and next scanline response functions. That is, error diffusion processing using the Cauchy distribution appears capable of generating well spread halftone patters no matter how sparse the patterns.

When b is increased well above 1 the vertical separation of minority pixels in sparse halftone patterns is too small; when b is decreased well below 1 the horizontal separation of minority pixels in sparse halftone patterns is too small.

Experiment 4

In this case the next scanline error impulse response function is a generalisation of the Cauchy or Lorentz distribution.

$$h_{curr}[i] = a \cdot 1/(b^2 + i^2)^p \text{ for } i >= 1 \atop h_{next}[i] = c \cdot 1/(b^2 + i^2)^p \quad \Big\} \quad (59)$$

where a, b, c, p are positive constants, with c chosen so that $\Sigma_i h_{next}[i]=1$ Observations for Experiment 4

With p set to be greater than 1, the observations are similar in character to those for experiments 1 and 2.

With p set to be less than 1 (but necessarily greater than ½), the halftone patterns for low or very high grey values are well spread horizontally, but the horizontal separation for intermediate grey values is too small.

Conclusion from the Experiments

As noted, the Cauchy distribution of experiment 3 generates well spread halftone patterns across the entire range of grey values with sparse patterns, while the other distributions fail to do so. It is believed the reason for the constrasting behaviours lies in the 'spread' of the distributions and in the spread of the self-convolutions of the distributions.

Expressing neighbourhood error in terms of the current and next scanline error impulse response functions and pixel only errors, from (2), (4), and (7) it is seen that:

$$e\_nbr_j = e\_curr\_line_j + e\_prev\_line_j \quad (59)^*$$

$$= (e_j + e\_prev\_line_j) * h_{curr} + e\_prev\_line_j \quad (60)$$

$$= (e_j + \Sigma_{1 \leq j} e_1 * h_{next}*^{(j-1)}) * h_{curr} + \Sigma_{1 \leq j} e_1 * h_{next}*^{(j-1)} \quad (61)$$

Accordingly, if the strength of the next scanline error impulse response function and its self convolutions is weak beyond some width, then insufficient account is taken of pixel only error at pixels horizontally separated by that width or more. Hence the disincentive to place minority pixel results at that width is insufficient, leading to sparse patterns which are not spread enough horizontally.

Self-Convolution of the Cauchy Distribution

The Cauchy distribution is given by $$f(x) = (1/\pi)(b/(b^2+x^2)) \quad (17)$$

where x is a real number and b is a real positive constant.

By change of variable from x to θ, where $\tan \theta = b/x$, it can be shown that, $$\int_{-\infty}^{\infty} \left(\frac{1}{\pi}\right) \frac{b}{(b^2+x^2)} dx = 1 \quad (62)$$

The Cauchy distribution satisfies the following self-convolution equations:

$$(1/\pi)(b/(b^2+x^2)) * (1/\pi)(b/(b^2+x^2)) = (1/\pi)(2b/((2b)^2+x^2)) \quad (63)$$

and for $n=1, 2, 3 \ldots$ $$(1/\pi)(b/(b^2+x^2))*^n = (1/\pi)(nb/((nb)^2+x^2)) \quad (18)$$

These results can be established from Fourier Transform theory. The following definitions and notation for the Continuous Space Fourier Transform are used:

Analysis equation/forward transform:

$$F(w)=\int_{-\infty}^{\infty} f(x)e^{-jwx}dx \quad (64)$$

Synthesis equation/reverse transform $$f(x)=(1/2\pi)\int_{-\infty}^{\infty} F(w)e^{jwx}dw \quad (65)$$

Fourier Transform pair:

$$f(x) \Leftrightarrow F(w) \quad (66)$$

The Fourier Transform pair corresponding to the double exponential distribution, with 'a' being a positive real constant, can be shown to be $$e^{-a|x|} \Leftrightarrow 2a/(a^2+w^2) \quad (67)$$

By the symmetry/duality property of the Fourier Transform $$(1/\pi)a/(a^2+x^2) \Leftrightarrow e^{-a|w|} \quad (68)$$

By the convolution property of the Fourier Transform, with b=a, $$((1/\pi)b/(b^2+x^2))^{*n} \Leftrightarrow e^{-nb|w|} \quad (69)$$

From this, (18) can be deduced. It can be stated that the Cauchy distribution is determined by its Continuous Space Fourier Transform which is a two-sided exponential function.

Discrete Convolution

Related equations exist for discrete convolution,
For k∈Z, let $$h[k]=(b/\pi)((1+(-1)^{k-1}e^{-b\pi})/(b^2+k^2)) \quad (19)$$

then for n=1, 2, 3 ...

$$h[k]^{*n}=(nb/\pi)((1+(-1)^{k-1}e^{-nb\pi})/((nb)^2+k^2)) \quad (20)$$

and $$\Sigma_{k\in Z} h[k]=1 \quad (21)$$

The above equations can be established using Fourier Transform theory, either using Fourier Series or using the Discrete Space Fourier Transform. The following notation is used for the Discrete Space Fourier Transform:

Synthesis equation:

$$h[k]=(1/2\pi)\int_{2\pi} H(e^{jw})e^{jwk}dw \quad (70)$$

Analysis equation:

$$H(e^{jw})=\Sigma_{k\in Z} h[k]e^{-jwk} \quad (71)$$

the use of the argument, $e^{jw}$, rather than w, indicates that the function, H, is periodic in w, with period $2\pi$, so that:

$$H(e^{j(w+2\pi)})=H(e^{jw}) \text{ for all } w. \quad (72)$$

The sequence (or discrete signal or discrete space function), h[k] of (19), has the Discrete Space Fourier Transform given by:

$$H(e^{jw})=e^{-b|w|} \text{ for } -\pi \leq w \leq \pi. \quad (73)$$

It can be stated that the discrete space function of (19) is determined by its Discrete Space Fourier Transform which is a replicated two-sided exponential function.

Equation (20) follows by considering the self-convolution of the function of equation 19 and from the convolution property for the Discrete Space Fourier Transform. (That is, the convolution of 2 discrete time functions is the product of their Fourier Transforms.)

Equation (21) follows by considering the value of H at w=0.

The sequence, or discrete space function, $$h[k]=(\sin h(b\pi)b/\pi)(-1)^k/(b^2+k^2) \quad (74)$$

has the Discrete Space Fourier Transform given by $$H(e^{jw})=\cos h(bw)=(e^{bw}+e^{-bw})/2 \text{ for } -\pi \leq w \leq \pi \quad (75)$$

Considering the value of H at w=π gives $$\Sigma_{k\in Z}(b/\pi)(1/(b^2+k^2))=\cot h(b\pi) \quad (22)$$

Considering equations (19) and (22) with b=1, it is seen that $e^{-\pi}$ is much less than 1, being approximately 0.0432 and tan h(π)=1/cot h(π) is close to 1, being approximately 0.9963.

So, defining h[k] according to the following equation:

$$h[k]=(\tan h(\pi)/\pi)(1/(1+k^2)) \quad (23)$$

it is deduced by setting b=1 in (22) that:

$$\Sigma_{k\in Z} h[k]=1 \quad (76)$$

Further, h[k] according to (23) satisfies the following approximation:

$$h[k] \approx (1/\pi)(1/(1+k^2)) \quad (77)$$

and $$h[k]^{*n} \approx \{(1/\pi)(1+(-1)^{k-1}e^{-\pi})/(1+k^2)\}^{*n}=(n/\pi)(1+(-1)^{k-1}e^{-n\pi})/(n^2+k^2) \quad (78)$$

$$\approx (n/\pi)(1/(n^2+k^2)) \text{ for } n=1, 2, 3 \quad (79)$$

The function of equation (23) can be considered a discrete approximation to the (continuous) Cauchy distribution with 'b' parameter equal to 1; it is derived from that Cauchy distribution by sampling and by normalising so that the sum of the function values is 1.

The Cauchy Distribution Spreads in Proportion to the Degree of Self-Convolution

Considering (18), it is seen that the Cauchy distribution has the remarkable property that repeated self-convolution preserves the form of the distribution. The self convolution of degree n of the Cauchy distribution is a scaled copy of the original distribution on a scaled axis:

$$f(x)^{*n}=(1/\pi)(nb/((nb)^2+x^2))=(1/n)(1/\pi)(b/(b^2+(x/n)^2)) \quad (80)$$

So that $$f(x)^{*n}=(1/n)f(x/n) \quad (24)$$

The variance of the Cauchy distribution is not finite. An alternative measure of the width of the distribution is provided by the "equivalent width" as described in "The Fourier Transform and its Applications" by R. N. Bracewell (page 148) as follows.

The equivalent width of a function is the width of the rectangle whose height is equal to the central ordinate and whose area is the same as that of the function:

$$\frac{\int_{-\infty}^{\infty} f(x)dx}{f(0)} \quad (81)$$

From (17) and (18), or from (24) it can be seen that the central ordinate of the self-convolution of degree n of the Cauchy distribution is 1/n times the central ordinate, f(0), of the Cauchy distribution. The area under f(x) is 1; and as a consequence the area under $f(x)^{*n}$ is also 1. So the equivalent width of the Cauchy distribution increases in proportion to the degree of self-convolution.

The Flux Density of a Point Source, Conservative Vector Field through a Straight Line is Described by the Cauchy Distribution The manner in which the Cauchy distribution spreads in proportion to the degree of self-convolution can also be shown graphically.

Figure 12:
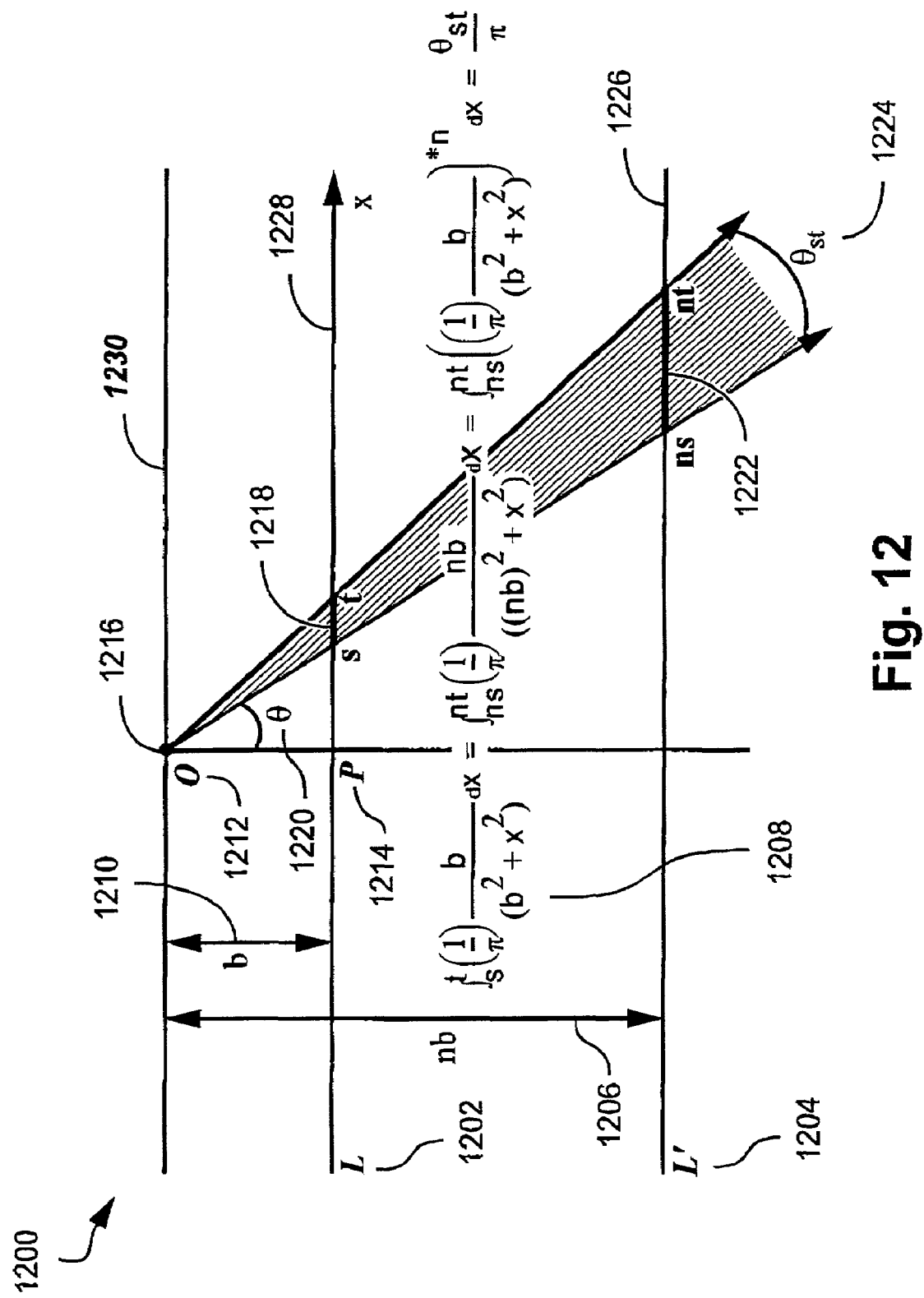
FIG. 12 provides a representation of a conservative vector field.

FIG. 12 shows a vector field, A, with vector magnitude given by 1/r where r is the distance from a source point, O (ie. 1216), and vector direction pointing away from O. This vector field is conservative in that the flux out of any simple closed curve, not enclosing the source point, is zero. The magnitude of the vector field can be considered as a signal which spreads uniformly in 2 dimensions out from O, preserving its strength that is, reducing in proportion to the length of its circular wavefront.

Considering the flux across a horizontal line, L (ie. 1202), which has P (ie. 1214), its nearest point to O (ie. 1216), at a distance b (ie. 1210) from O (ie. 1216), the flux density function, f(x), is defused as a function of the offset, x, along the line from P, such that $$\int_s^t f(x)dx \qquad (82)$$

is the flux of the vector field through a segment [s,t] of line L.

Let the angle which a point at offset x along the line L, makes with the line from O to P be θ (ie. 1220), then f(x) is given by $$f(x)=c(1/r)\cos\theta \qquad (83)$$

with c being a constant

Choosing c to be 1/π so that the total flux through the line L is 1, we have $$f(x)=(1/\pi)(1/r)(b/r)(1/\pi)b/(b^2+x^2), \qquad (84)$$

which is the Cauchy distribution.

The offset, x, and angle, θ, are related by:

$$x=b\tan\theta \qquad (25)$$

$$dx/d\theta=b(1+\tan^2\theta) \qquad (85)$$

$$d\theta/dx=b/(b^2+x^2) \qquad (26)$$

Using (25) and (26), confirms that the flux through a segment [s,t] (ie. 1218) is proportional to the angle, $\theta_{st}$ (ie. 1224), subtended at O as shown in the following:

$$\int_{b\tan\theta}^{b\tan(\theta+\theta_{st})}\left(\frac{1}{\pi}\right)\frac{b}{b^2+x^2}dx = \frac{1}{\pi}\int_\theta^{(\theta+\theta_{st})}d\theta = \frac{\theta_{st}}{\pi} \qquad (86)$$

Considering another line, L' (ie. 1204), with nearest point at a distance nb (ie. 1206) from O and which is parallel to L. Segment [ns, nt] (ie. 1222) is the projection of segment [s,t] (ie. 1218) onto the line L' (ie. 1204), and subtends the same angle $\theta_{st}$ (ie. 1224) at O (ie. 1216).

The flux through segment [ns, nt] (ie. 1222) is also equal to $\theta_{st}/\pi$ and is associated with a flux density function for line L' equal to the self-convolution of f(x) of degree n as follows:

$$\int_{ns}^{nt} f(x)^{*n}dx = \qquad (87)$$

$$\int_{ns}^{nt}\frac{1}{n}f\left(\frac{x}{n}\right)dx = \int_{ns}^{nt}\frac{1}{\pi}\frac{nb}{((nb)^2+x^2)}dx = \int_s^t \frac{1}{\pi}f(u)du = \frac{\theta_{st}}{\pi}$$

So It is seen that flux density functions given by the Cauchy distribution and its self convolutions correspond to a signal radiating from a point source which preserves its strength within any wedge formed by 2 rays emanating from the signal source point.

Desirability of the Next Scanline Error Impulse Response Function Spreading in Proportion to the Degree of Self-Convolution and Approximating a Cauchy Distribution It has been shown that the spread of the next scanline error impulse response function and its self convolutions relates to the horizontal separation between minority pixels in sparse halftone patterns.

It has been shown by experiment that when the next scanline error impulse response function samples a Cauchy distribution with the a and b parameters close to 1, sparse halftone patterns are well spread and worm-free. As well, when the next scanline error impulse response function is derived from equation 19, sparse halftone patterns are again well spread and worm-free.

It has also been shown that self convolutions of the Cauchy distribution spread in proportion to the degree of self-convolution and maintain a radially uniform distribution of signal strength—neither shifting signal strength to the centre nor shifting it towards the extremities.

A Real, Symmetric Distribution which Spreads in Proportion to the Degree of Self-Convolution Must be a Cauchy Distribution It can be shown that a real, symmetric continuous impulse response function which preserves the magnitude of the impulse, spreads in proportion to the degree of self-convolution and which acts as a smooth (continuous) low pass filter, dampening all non-zero frequencies must be a Cauchy distribution.

Consider a positive real valued impulse response function f(x).

The condition that f(x) spreads in proportion to the degree of self-convolution can be written as follows:

$$f(x)^{*n}=a\,f(x/n) \text{ for some constant } a \qquad (88)$$

Let F(w) be the Fourier Transform of f(x). The condition that f(x) preserves the magnitude of the impulse can be written as follows:

$$F(0)=\int_{-\infty}^{\infty}f(x)dx=1 \qquad (89)$$

By reference to the Fourier convolution theorem, the condition that the magnitude of the impulse is preserved by self-convolution can be written as follows:

$$\int_{-\infty}^{\infty}f(x)^{*n}dx=[F(0)]^n=1 \qquad (90)$$

Also, the integral of f(x/n) over all real values is n. So it can be deduced that $$a=1/n \qquad (91)$$

So f(x) satisfies (24) as follows:

$$f(x)^{*n}=(1/n)f(x/n) \quad (92)$$

Taking the Fourier Transform of each side of (24) gives the following:

$$(F(w))^n=F(nw) \text{ for } n=1, 2, 3 \quad (93)$$

Differentiating the above equation with respect to w gives the following:

$$n \cdot (F(w))^{n-1} \cdot F'(w) = n \cdot F'(nw) \quad (94)$$

By dividing (93) by (94), the following results:

$$F(w)/F'(w)=F(nw)/F'(nw) \text{ for } n=1, 2, 3 \quad (95)$$

By the condition that F is continuous (smoothly dampening all non-zero frequencies) it can be deduced that:

$$\text{for } w>=0, F(nw)/F'(nw)=c_1, \text{ a constant} \quad (96)$$

Solving this differential equation gives the following:

$$F(w)=c_2 e^{B \cdot w} \text{ for } w>0 \text{ for constants } c_2 \text{ and } B \quad (97)$$

Because f(x) is real-valued and symmetric, F(w) must be also; so that $c_2$ and B are both real For F(0)=1, $c_2$=1. For f(x) to act as a low pass filter, B must be negative. From the above, it can be deduced that:

$$F(w)=e^{-b|w|} \text{ for a positive constant } b. \quad (98)$$

Using the inverse Fourier Transform gives the following:

$$f(x)=(1/\pi)b/(b^2+x^2) \text{ as claimed.} \quad (99)$$

Cauchy Error Diffusion

The (continuous) Cauchy distribution spreads in proportion to the degree of self-convolution. It is believed that this spreading property is desirable for the (discrete) next scanline error impulse response function Moreover, it is envisaged that this spreading property is desirable for error diffusion irrespective of the number of scanlines with mask positions, and is desirable for other neighbourhood halftoning techniques. Similarly, it is believed that it is desirable that, in some sense, the (discrete) next scanline error impulse response function should approximate a (continuous) Cauchy distribution.

The name "Cauchy error diffusion" is defined to be error diffusion where the next scanline error impulse response function is designed so that it spreads approximately in proportion to the degree of self convolution or where the next scanline error impulse response function is designed to approximate a Cauchy distribution.

Diagram of Repeated Convolution of a Next Scanline Error Impulse Response Function Approximating a Cauchy Distribution The next scanline error impulse response function describes the contribution of pixel-only errors of pixels of a scanline to the neighbourhood errors of pixels of the next scanline just prior to processing the next scanline.

Similarly, the $n^{th}$ next scanline error impulse response function can be defined as the contribution of pixel-only errors of pixels of a scanline to the neighbourhood errors of pixels of the $n^{th}$ next scanline just prior to processing the $n^{th}$ next scanline.

Figure 13:
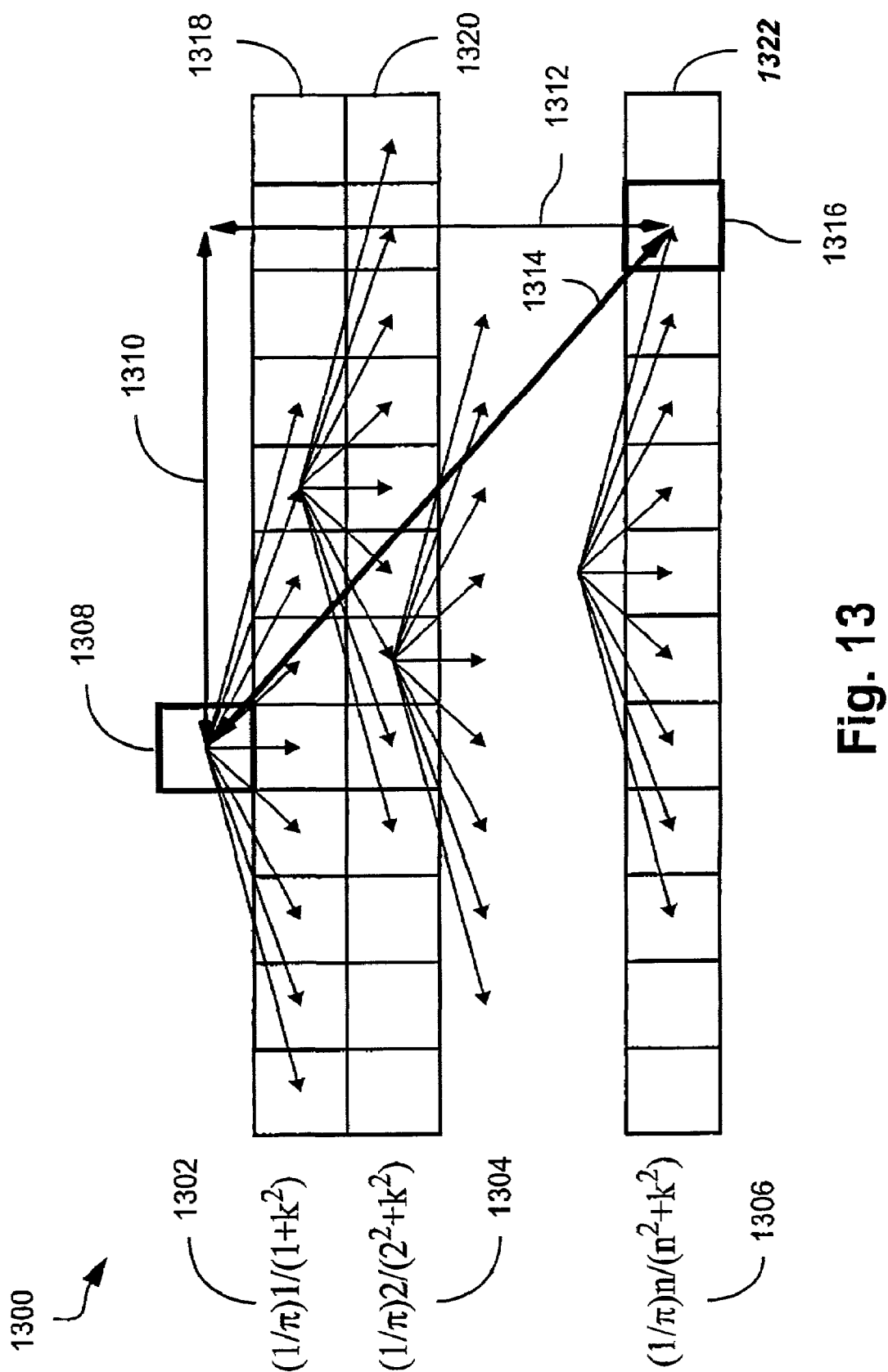
FIG. 13 shows an nth next scanline error impulse response function using an approximate Cauchy distribution.

FIG. 13 shows the $n^{th}$ next scanline error impulse response function where the next scanline error impulse response function approximates a Cauchy distribution. It shows the contribution of the pixel-only error of a reference pixel to the neighbourhood error of a pixel of interest, n scanlines below the reference pixel just prior to processing the scanline containing the pixel of interest. FIG. 13 shows a reference pixel 1308 and a pixel of interest 1316 separated from the reference pixel 1308 by a distance "k" depicted by an arrow 1310, in a horizontal direction, and by a distance "n" depicted by an arrow 1312 in a vertical direction.

It is noted that the next scanline 1318 is the scanline immediately following the scanline in which the reference pixel 1308 is located. The unction 1302 is the approximate next scanline impulse response function which determines distribution of error from the reference pixel 1308 to the next scanline 1318. The function 1304 is the approximate second next scanline impulse response function representing distribution of error from the reference pixel 1308 to scanline 1320. The function 1306 is the approximate $n^{th}$ next scanline impulse response function representing distribution of error from the reference pixel to scanline 1322. A bold arrow 1314 represents a radial separation between the reference pixel 1308 and the pixel of interest 1316, noting that the radial separation is provided by the relationship $r=(n^2+k^2)^{1/2}$, and the approximate impulse response is represented by $(1/\pi)n/r^2$.

In this diagram, and hereafter, the Cauchy distribution is referred to with a spread parameter, b, equal to 1. Spread parameters close to 1 produce well spread sparse halftone patterns; whereas spread parameters further removed from 1 generate poor quality halftone patterns.

In the diagram, the identical fan of arrows on each scanline is intended to portray that the same next scanline impulse response function applies for the processing of each pixel of each scanline.

As has been seen, for the next scanline error impulse response function, $h_{next}$, given by (23):

$$h_{next}[k]^{*n} \approx (n/\pi)1/(n^2+k^2)=(n/\pi)1/r^2 \quad (100)$$

So, the cumulative effective of distributing error according to a next scanline function approximating $(1/\pi)1/(1+k^2)$ is that the impulse response of error at the reference pixel on the pixel of interest, prior to processing the scanline of the pixel of interest, is approximately $(n/\pi)(1/(n^2+k^2)=(n/\pi)1/r^2$. Here r is the distance between the reference pixel and the pixel of interest.

That is, the pixel-only error at a reference pixel contributes to the neighbourhood errors of pixels of any succeeding scanline, just prior to processing that scanline, approximately in mutual proportions of $1/r^2$. The factor $(n/\pi)$ simply scales all the contributions of the pixels of the particular succeeding scanline.

It is interesting to note that the impulse response function, $c/r^2$, with c a constant, is the only radially symmetric function in 2 dimensions for which the impulse response on a region is independent of scale.

To see this, the impulse response on an infinitesimal region, dA, can be described as $(dA \cdot c/r^2)$. With change of scale by a factor, $\alpha$, so that horizontal and vertical separations x and y instead measure $\alpha x$ and $\alpha y$, the area of the same infinitesimal region now measures $\alpha^2 dA$, and the impulse response on the infinitesimal region is given by:

$$\alpha^2 dA \cdot c/(\alpha r)^2 = dA \cdot c/r^2 \quad (101)$$

which is unchanged.

Figure 14:
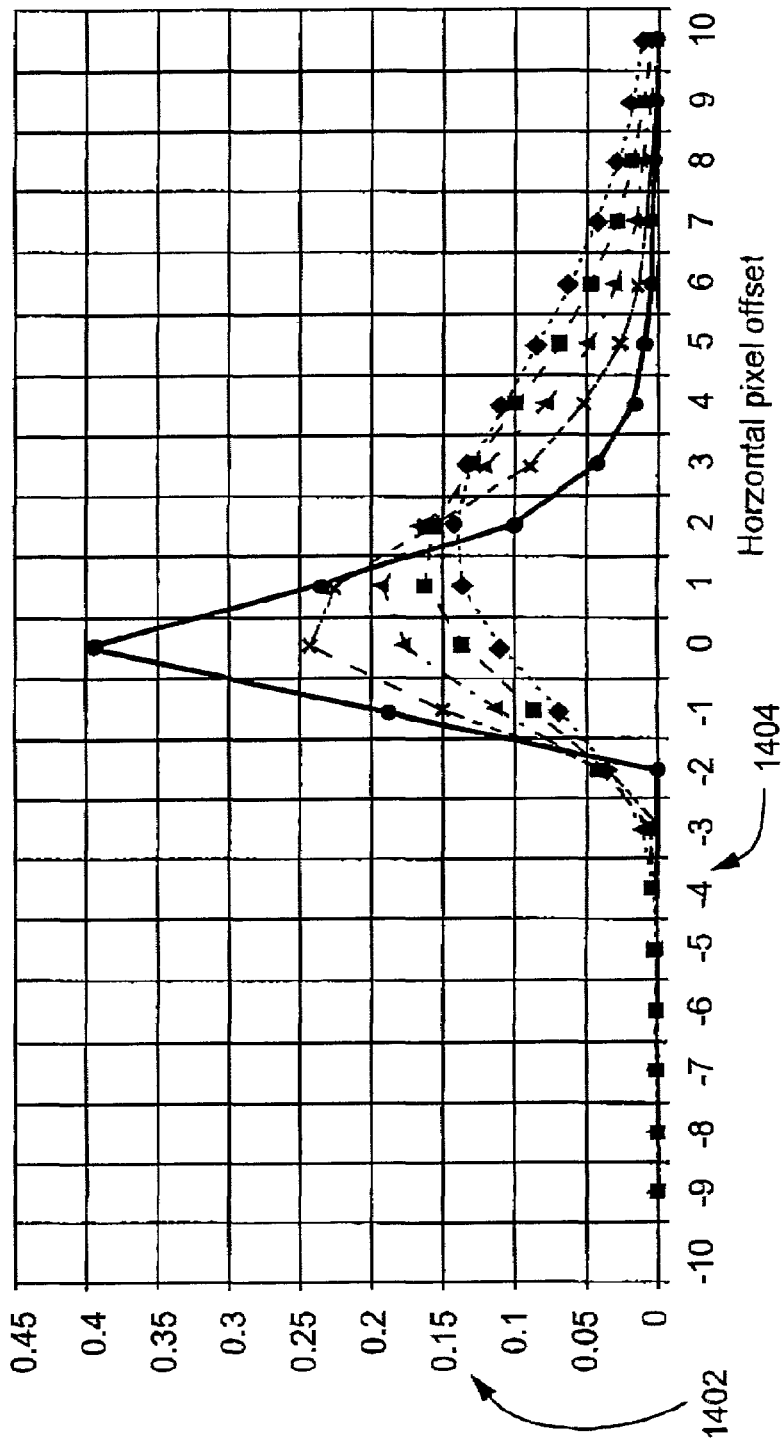
FIG. 14 shows self convolutions of a next scanline error impulse response function for Floyd Steinberg error diffusion.
Figure 16:
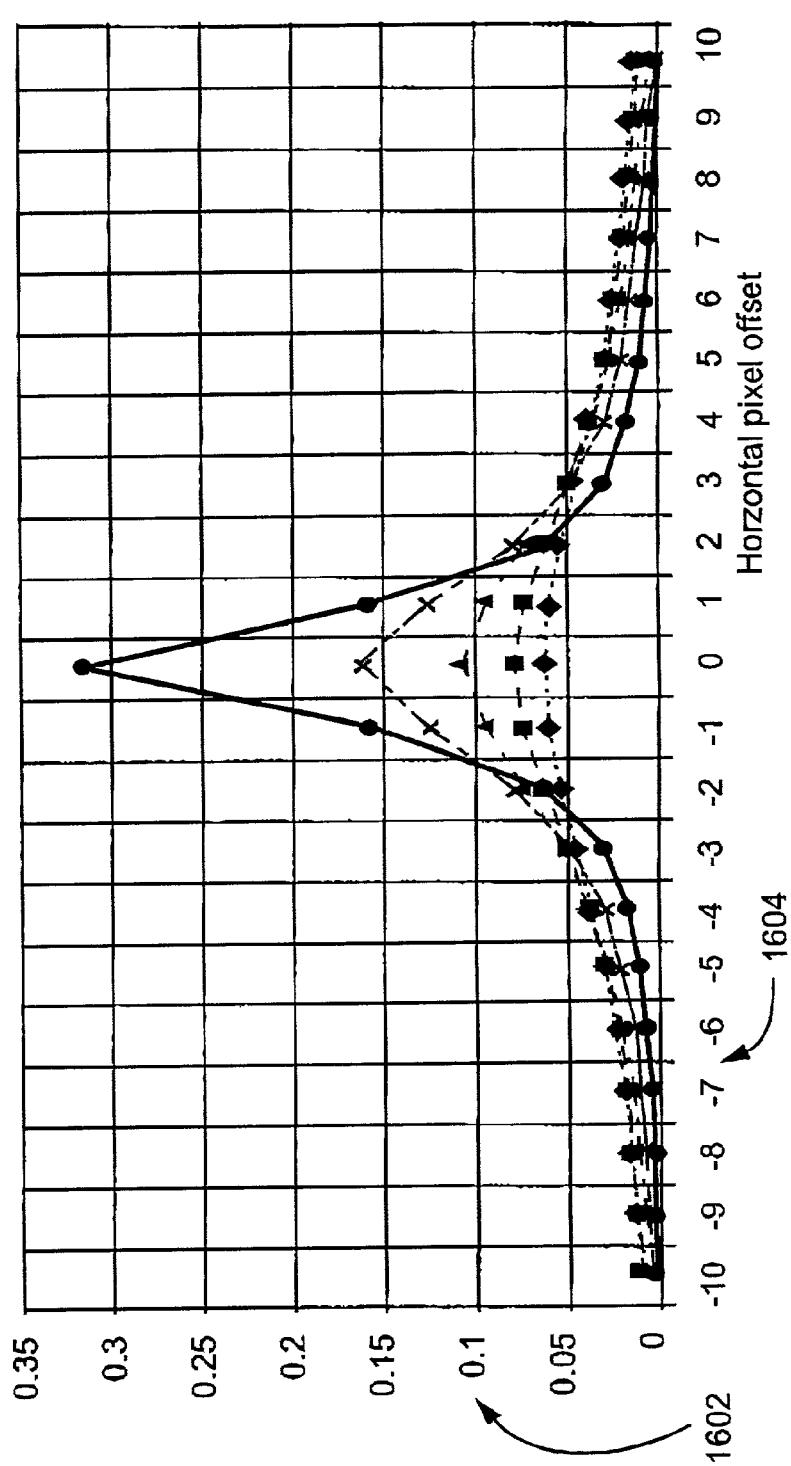
FIG. 16 shows self convolutions of a next scanline error impulse response function in accordance with a Cauchy distribution.

Graphs of Self Convolutions of the Next Scanline Error Impulse Response Function FIGS. 14, 15, 16 show graphs of self convolutions of the next scanline error impulse response function for:

1. Floyd Steinberg error diffusion;
2. the error diffusion of U.S. Pat. No. 5,353,127 (Shiau & Fan); and 3. where the function is a scaled sampling of a Cauchy distribution.

Each of these graphs are discussed in relation to the halftone patterns generated by corresponding error diffusion algorithms performing monochrome bi-level halftoning of 8 bit per pixel image data.

FIG. 14 shows a graph 1400 of self convolutions of the next scanline error impulse response function for Floyd Steinberg error diffusion. The graph in FIG. 14 is plotted in regard to an abscissa 1404 which is defined in terms of "horizontal pixel offset" from a pixel of interest, and an ordinate 1402 measured in terms of impulse response amplitude. A legend 1406 is provided in regard to "next scanline response" (ie. self-convolution of degree 1) 1408, "self convolution" (ie. self-convolution of degree 2) 1410, "self convolution order 3" 1412, "self convolution order 4" 1414, and "self convolution order 5" 1416. In FIG. 14, the self-convolutions are not left-right symmetric and spread less rapidly than in FIG. 16 where they spread in proportion to the degree of convolution. The sparse halftone patterns of Floyd Steinberg error diffusion exhibit severe worm artifacts and strong left-right asymmetry FIG. 15 shows a graph 500 of self convolutions of the next scanline error impulse response function for the patent of Shiau and Fan. The graph in FIG. 15 is plotted in regard to the abscissa 504 measured in terms of "horizontal pixel offset" from a pixel of interest, and an ordinate 502 measured in terms of impulse response amplitude. A legend 506 is provided in regard to "next scanline response" 508, "self convolution" 510, "self convolution order 3" 512, "self convolution order 4" 514, and "self convolution order 5" 516. In FIG. 15, the self-convolutions are nearly left-right symmetric, but spread less rapidly than in FIG. 16 where they spread in proportion to the degree of convolution. For the error diffusion of U.S. Pat. No. 5,353,127, worm artifacts are only apparent for very sparse halftone patterns. As the halftone patterns become very sparse, the artifacts become severe. The worm artifacts show little left-right asymmetry.

FIG. 16 shows a graph 600 of self convolutions of the next scanline error impulse response function for error diffusion as described in relation to FIG. 13. The graph in FIG. 16 is plotted in regard to the abscissa 604 measured in terms of "horizontal pixel offset" from a pixel of interest, and an ordinate 602 measured in terms of impulse response amplitude. A legend 606 is provided in regard to "next scanline response" 608, "self convolution" 610, "self convolution order 3" 612, "self convolution order 4" 614, and "self convolution order 5" 616. In FIG. 16, the self-convolutions are left-right symmetric and spread in proportion to the degree of convolution. In particular, it can be seen that the central peak value decreases as 1/n. For error diffusion as described for experiment 3 where the next scanline error impulse response function, $h_{next}$, is a sampling of the Cauchy distribution $(1/\pi)(1/(1+x^2))$, normalised so that $\Sigma_i h_{next}[i]=1$, and all scanlines are processed left to right, there are no worm artifacts. The minority pixels in all sparse halftone patterns are well spread. Also, the sparse halftone patterns show very little left-right asymmetry. The occasional slight left-right asymmetry can be removed by varying the scanline processing direction.

As previously stated, it is believed that it is desirable that the next scanline error impulse response function be left-right symmetric and that it should spread in proportion to the degree of self-convolution. These graphs provide a picture of how existing error diffusion methods fall short in this regard.

A Method for Generating Error Diffusion Masks for which the Next Scanline Error Impulse Response Function Approximates a Cauchy Distribution In implementing error diffusion, it is desirable to minimise the processing per pixel.

As stated previously, the processing model of FIG. 11, where error diffusion processing per pixel is described in terms of the current and next scanline error impulse response functions, is useful for understanding desirable characteristics of error diffusion. However, for implementing error diffusion where the next scanline error impulse response function approximates a Cauchy distribution, the processing model of FIG. 11 is not very suitable.

This is because the Cauchy distribution reduces slowly away from the peak value, so that a large number of non-zero values of the next scanline error impulse response function are required to provide a good approximation, with consequently a large amount of processing per pixel.

By contrast, the processing models of FIGS. 9 and 10 are better suited to implementing Cauchy error diffusion, because a desired next scanline error impulse response function can be well approximated using a comparatively small number of mask positions.

A method is now described for designing an error diffusion mask, for which the corresponding next scanline error impulse response function approximates a Cauchy distribution.

The difference is measured between the actual next scanline error impulse response function corresponding to an error diffusion mask and the desired target next scanline error impulse response function using an objective function, Obj( ), equal to the sum of the squares of the differences of the function values.

$$\mathrm{Obj}(\mathrm{mask}_{curr}[], \mathrm{mask}_{next}[]) = \Sigma_k (h_{next\_actual}[k] - h_{next\_target}[k])^2 \qquad (102)$$

The error diffusion mask weight values described here were generated for a target next scanline error impulse response function of the form of equation 23. (Alternatively, a target next scanline error impulse response function of the form of equation 19 is also appropriate). The actual objective function used to determine the error diffusion mask weight values is given by:

$$\mathrm{Obj}(\mathrm{mask}_{curr}[], \mathrm{mask}_{next}[]) = \Sigma_{-N<=k<=M} (h_{next\_actual}[k] - (\tan h(\pi)/\pi)/(1+k^2))^2 \qquad (103)$$

where:

N is the number of next scanline mask positions to the left of the current pixel M=30.

It is desired to find $\mathrm{mask}_{curr}[]$ and $\mathrm{mask}_{next}[]$ such that $$\left. \begin{array}{l} \Sigma_i \mathrm{mask}_{curr}[i] + \Sigma_i \mathrm{mask}_{next}[i] = 1 \\ Obj(\mathrm{mask}_{curr}[\ ], \mathrm{mask}_{next}[\ ]) \text{ is a minimum} \end{array} \right\} \qquad (104)$$

It is noted from (12), that $$\left. \begin{array}{l} h_{next} = (\delta + h_{curr}) * \mathrm{mask}_{next} \\ (\delta + h_{curr}) \text{ is a casual function} \end{array} \right\} \qquad (105)$$

where

For $h_{next}$ to be left-right symmetric as required, $\mathrm{mask}_{next}$ should be an anti-causal function. That is, mask positions can be omitted on the next scanline ahead of the current pixel. It is only necessary to design an error diffusion mask coefficients for pixel offsets:

$$\left.\begin{array}{l}\text{with } i > 0 \text{ on the current scanline } (\text{mask}_{curr}[\ ]), \text{ and} \\ \text{with } i \leq 0 \text{ on the next scanline } (\text{mask}_{next}[\ ])\end{array}\right\} \quad (106)$$

Avoiding use of mask coefficients for pixel offsets on the next scanline with i>0, avoids error distribution processing associated with those pixel offsets, making for more efficient error diffusion implementations.

An approximate solution to this design problem can be solved by optimisation methods, including the method of steepest descent and the conjugate gradient method as documented, for example, in the textbook: "Applied Numerical Methods for Engineers" by R. J. Schilling & S. L. Harris. This textbook also includes C software for performing the optimisations.

The constraint that the sum of the mask coefficients sum to 1 may be effectively removed by treating one of the desired error diffusion coefficients as a dependent variable. As a first step, to obtaining an error diffusion mask, it is necessary to decide how many (or which) mask positions to use on the current and next scanline. That is, an error diffusion mask can be designed to meet a pre-determined choice of mask positions and consequently a pre-determined limit of processing per pixel The coefficients for the error diffusion masks of FIGS. 4 and 19 were determined as described above and using the conjugate gradient method with the aid of software supplied with the above textbook.

Size of Error Diffusion Masks—Achieving Goals of Halftone Image Quality and Implementation Efficiency It has been found that increasing the number of current and next scanline error diffusion mask positions, improves the quality of sparse halftone patterns. Although judgement of the quality of halftone patterns is somewhat subjective, it has been found that, in order to completely remove worm artifacts and poor spreading of sparse halftone patterns for the bi-level halftoning of 8 bit per pixel images, it is necessary to use a mask with the width of the error diffusion mask of FIG. 4. The mask of FIG. 4 has 12 positions on the current scanline and 13 positions on the next scanline and is called a "12-13 mask".

The mask of FIG. 4 is used in the description of the error diffusion method of the first embodiment. Smaller masks, which are optimised so that the next scanline error impulse response function approximates a Cauchy distribution, may also be used—this may be desirable to provide a better trade-off between halftone image quality and implementation efficiency.

A Family of Error Diffusion Masks for which the Next Scanline Error Impulse Response Function Approximates a Cauchy Distribution The most sparse halftone patterns occur for source image regions with grey value just above the minimum grey value and just below the maximum grey value. As the grey value moves closer to the middle grey value, the halftone patterns become less sparse. For most intermediate grey levels, there is no advantage in using error diffusion masks as wide as the 12-13 mask.

It is possible to perform step 4 of the error diffusion processing per pixel, the distribution of error, according to a mask dependent on the pixel grey value, This approach is used in the error diffusion method of the second embodiment.

It has been previously observed that the quality of error diffusion halftoning can be improved by selectively using a larger error diffusion mask for low and high grey value regions. For example, in the paper "Error Diffusion Algorithm with Reduced Artifacts", from the Proceedings of IS&T's 45th Annual Conference, May 10–15, 1992, New Jersey, the author, R. Eschbach, discusses use of a combination of 2 error diffusion masks.

In his paper, Eschbach, also observes that it is necessary that the 2 masks should have similar structure so that the parts of an image using both masks do not show crossover artifacts.

The requirement that the next scanline error impulse response function should approximate a particular Cauchy distribution, provides a design goal for generating a family of compatible error diffusion masks.

The second arrangement uses such a family of masks, with a range of widths, to achieve similar halftone quality to that achieved by the first arrangement but with significantly reduced average processing per pixel.

Description of the First Arrangement

Bi-Level Monochrome Halftoning

Figure 17A:
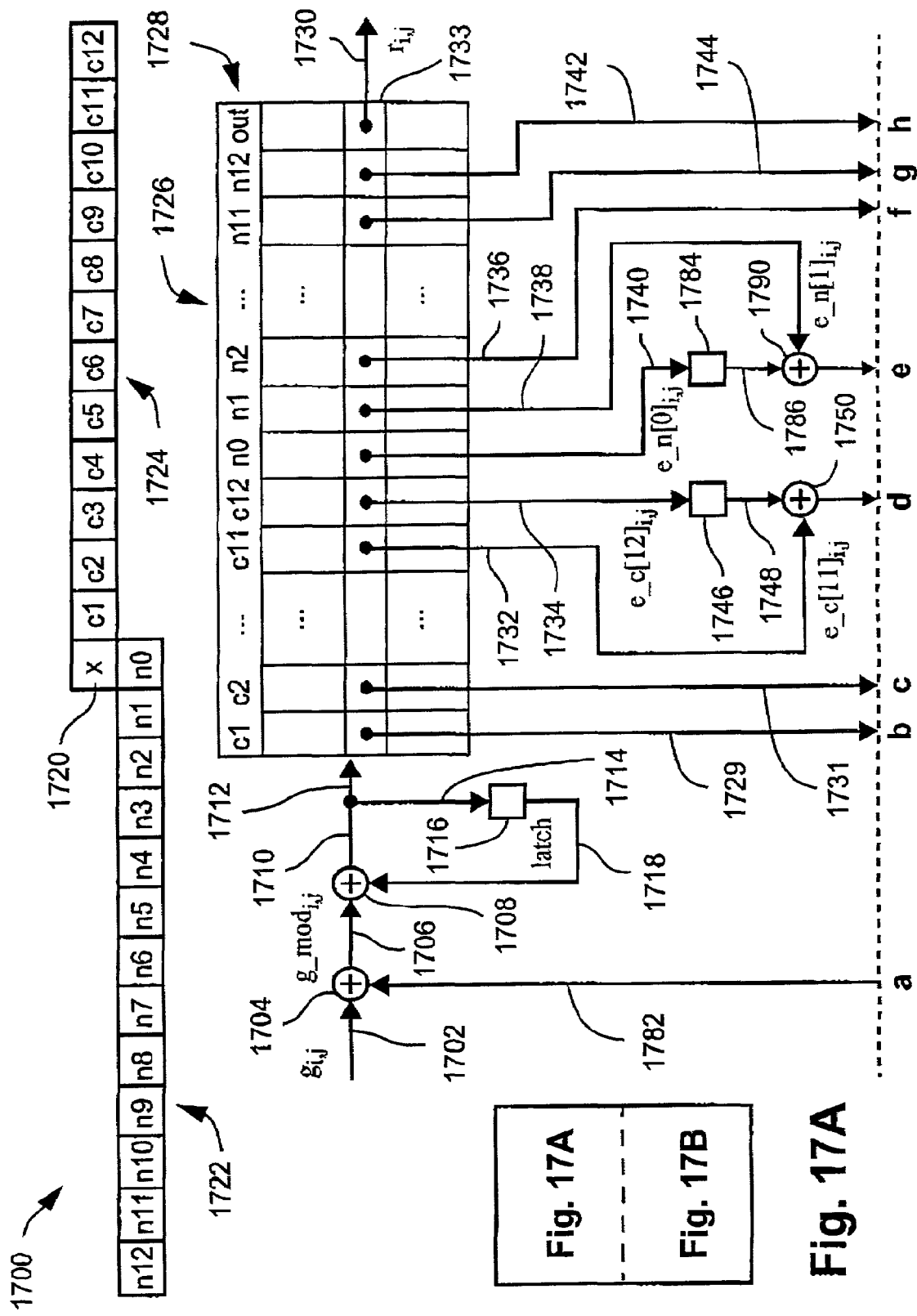
FIG. 17 is a block diagram representation of a system for performing pixel processing in accordance with a first arrangement described herein.
Figure 17B:
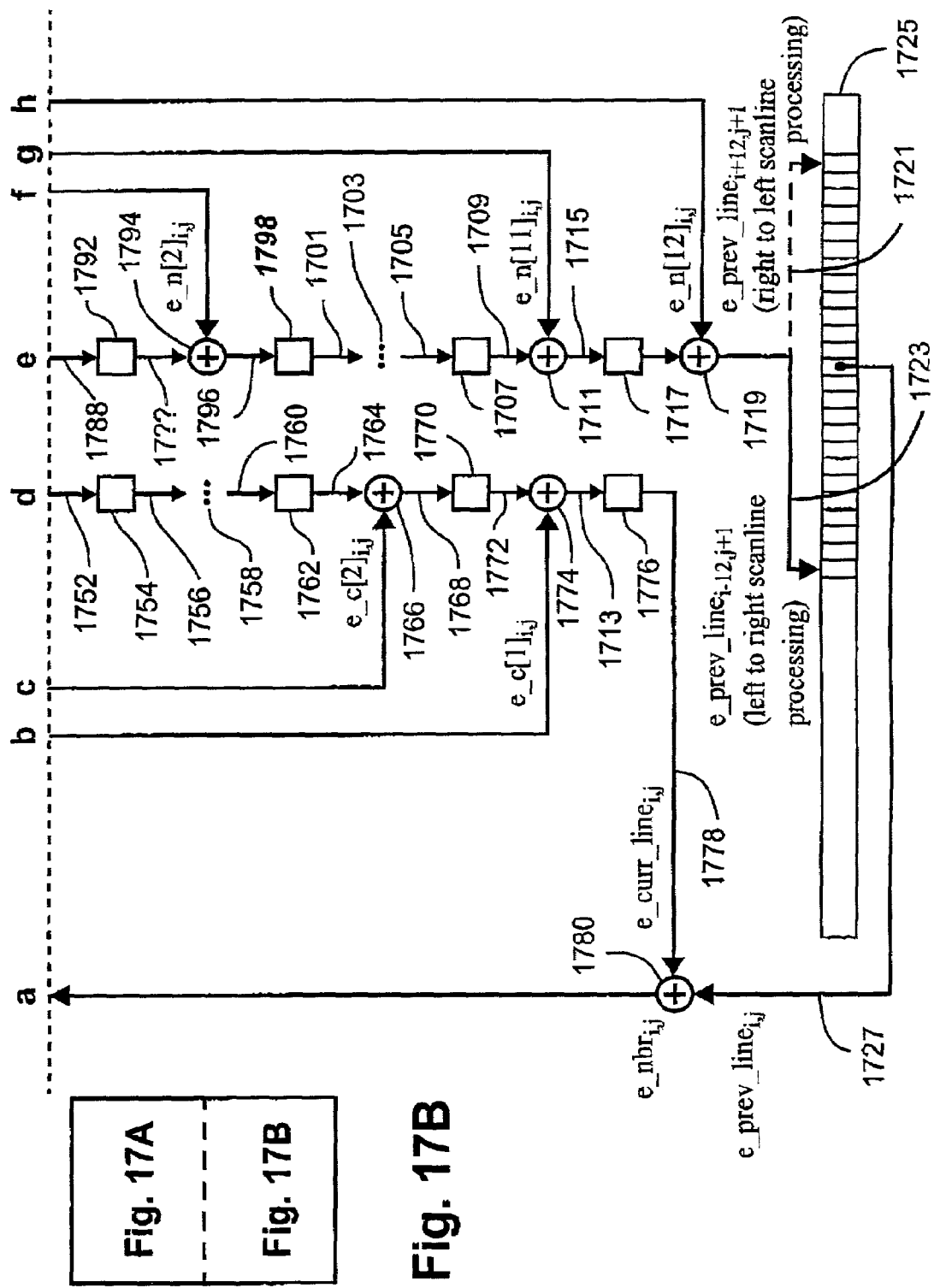

FIG. 17 is a block diagram 1700, describing the processing performed per pixel according to the first arrangement. The processing determines a halftone output value for a pixel from the pixel input value and stored error values which are sums of error distributed to the pixel from previously processed pixels. An input image value $g_{i,j}$ for a pixel of interest is provided on a line 1702 to an addition process 1704, from which is output, on a line 1706, a modified input image value for the pixel (i,j), ie. $g\_mod_{i,j}$, this being input to an addition process 1708. Thereafter, a table index value $table\_index_{i,j}$ is determined, in respect to a table 1726, as the sum of the modified input image value $g\_mod_{i,j}$, and the least significant bits of the table index value of a previously processed pixel which is provided on a line 1718. In the case of left to right scanline processing, the table index value is provided by (108) (see below), and in the case of right to left scanline processing, the table index value is provided by (109) (see below). It is noted that the table index value $table\_index_{i,j}$ is computed as the sum of the modified input image value for the pixel $g\_mod_{i,j}$ on the line 1706 and the least significant bits of the table index value of the previously processed pixel, this having been provided to a latch 1716 and then output on the line 1718. The upper bits of the table index value are used via line 1712 to index the table. The lower bits of the table index value are saved in a latch 1716 for use in determining the table index value of the next pixel.

Considering a row 1733 of the table 1726, where the row 1733 has been defined by determination of the upper bits of the table index value $table\_index_{i,j}$, then commencing at the left hand side of the table 1726, it is seen that respective values C1, C2, . . . , C11, C12 are provided on lines 1729, 1731, . . . , 1732, and 1734 respectively to addition processes 1774, 1766, . . . , 1750, and also to a latch 1746, respectively. Again considering the row 1733 of the table 1726, it is seen that values associated with the right hand side of the table 1726, and in particular with columns n0, n1, n2, . . . , n11 and n12 are provided on lines 1740, 1738, 1736, . . . , 1744 and 1742 respectively to a latch 1784, adder processes 1790, 1794, . . . , 1711, and 1719 respectively. It is noted that an error diffusion mask depiction is provided at the top of FIG.

17. The mask refers to a current pixel 720, having on its right hand side twelve successive current scanline pixel positions c1 to c12 (these being collectively designated as reference numeral 1724), and having, on a next line, a set of 13 next scanline pixel positions n0 to n12 (collectively designated as 1722).

A tandem arrangement of successive latches and adder processes 1746, 1750, 1754, . . . , 1762, 1766, 1770, 1774 and 1776 provide, on a line 1778, a total error e_curr_line$_{i,j}$, of errors distributed directly to pixel (i,j) from pixels of the current scanline, which is fed to an adder process 1780. In a similar fashion, a tandem arrangement of respective latches and adder processes 1784, 1790, 1792, 1794, 1798, . . . , 1707, 1711, 1717, 1719 provide, on lines 1723 or 1721, a total of error distributed directly from pixels of the previous scanline, ie. e_prev_line$_{i+12, j+1}$ (in the case of right to left scanline processing), or e_prev_line$_{i-12, j+1}$ (in the case of left to right scanline processing). The values e_prev_line$_{i-12, j+1}$, or e_prev_line$_{i+12, j+1}$ are directed, by the lines 1723 or 1721 respectively, to an error line store memory 1725. The memory 1725 outputs, on a line 1727, the total error e_prev_line$_{i,j}$ distributed directly to the pixel (i,j) from pixels of the previous scanline on a line 1727, this being input to the adder process 1780. The adder process 1780 outputs, on a line 1782, the neighbourhood error value e_nbr$_{i,j}$ at the pixel, this being the sum of errors distributed directly to the pixel, on a line 1782, which is input to the adder process 1704.

In this implementation, the halftone output value on the line 1730 and the errors distributed from a pixel are retrieved from a pre-calculated error distribution and result table 1726. The error values stored in the table have extra precision to store fractional error values. A suitable amount of storage per error value is 16 bits, with the most significant 8 bits representing the sign of the error together with the integer part of the error as a number in the range (−128,127], and with 8 least significant bits representing the fractional part of the error.

The same processing cycle is repetitively applied, pixel by pixel across a scanline, to process a scanline of pixels. The scanline processing is repeated for each scanline to halftone the image The scanline processing direction for each scanline may either be left to right or right to left, and the scanline processing direction may change from one scanline to another. Some desirable halftone pattern randomisation is achieved by varying the scanline processing direction.

The halftone output value on the line 1730 for a pixel at position (i, j) being column i and scanline j) is determined according to the pixel decision rule defined by the following equation.

$$\text{if } g_{i,j}+e\_nbr_{i,j}>th \text{ then } r_{i,j}=255; \text{ else } r_{i,j}=0 \quad (27)$$

where:
  $g_{i,j}$ is the input image value of the pixel;
  $e\_nbr_{i,j}$ is the neighbourhood error value at the pixel, being the sum of errors distributed to the pixel;
  th is a threshold value; and
  $r_{i,j}$ is the halftone output value of the pixel (0 or 255).

It is convenient, though not necessary for the threshold value to be 127, as this then constrains the total error distributed from a pixel to the range (−128,127] and each error value stored in the table can be scaled up by 256 and represented as a signed 'short' integer in the range (−128*256, 127*256]. With error scaled up by 256 it is also necessary to scale up input values by 256. The table index value is then constrained to the range (−128,127]×256 and can be stored in 17 bits. Choosing the upper 9 bits of the table index value to index the table produces good halftone output. It is also possible to increase the number of bits of the table index used to index the table, in order to allow avoiding the use of the lower bits of the table index value altogether; however, this also means a consequent increase in the size of the table.

Determination of a pixel's halftone output value according to the pixel decision rule, as well as the determination of the errors to distribute, is achieved by a table lookup. The table lookup is made using the most significant bits of a table index value computed as follows.

Firstly, the modified input image value for the pixel (i,j), g_mod$_{i,j}$, is computed as follows:

$$g\_mod_{i,j}=g_{i,j}+e\_nbr_{i,j} \quad (107)$$

Secondly, the table index value, table_index$_{i,j}$, is computed as the sum of the modified input image value for the pixel and the least significant bits of the table index value of the previously processed pixel, this being dependent upon the scan direction as follows:

left to right scanline processing $$\text{table\_index}_{i,j}=g\_mod_{i,j}+\text{least significant bits(table\_index}_{i-1,j}) \quad (108)$$

right to left scanline processing $$\text{table\_index}_{i,j}=g\_mod_{i,j}+\text{least significant bits(table\_index}_{i+1,j}) \quad (109)$$

The error distribution and result table stores the halftone output value and error distribution values corresponding to each possible value of the most significant bits of a table index value.

The halftone output value is determined by a thresholding equation similar to (27) as follows:

$$\text{if table\_index\_upper\_bits}>th \text{ then } out=255; \text{ else } out=0 \quad (110)$$

The error distribution amounts are initially determined as $$\left. \begin{array}{l} e\_c[i] = (\text{table\_index\_upper\_bits} - out) * mask_{curr}[i] \text{ for } 1 <= i <= 12 \\ e\_n[i] = (\text{table\_index\_upper\_bits} - out) * mask_{next}[i] \text{ for } 0 <= i <= 12 \end{array} \right\} \quad (111)$$

The rounding errors in representing these error distribution amounts as 16 bit values are then distributed amongst the error distribution amounts so that $$\Sigma_{1<=j<=12}e\_c[i]+\Sigma_{0<=i<=12}e\_n[i]=\text{table\_index\_upper\_bits}-out \quad (112)$$

The error resulting by thresholding a pixel is distributed by retrieving error distribution amounts from the error distribution and result table. These values are stored and summed with previous error distribution amounts and sums of error distribution amounts to deliver the error sum values given by formulae, as a function of scan direction as follows:

left to right scanline processing $$e\_curr\_line_{i+1,j} = e\_c[1]_{i,j} + e\_c[2]_{i-1,j} + \ldots + e\_c[12]_{i-11,j}$$
$$e\_prev\_line_{i-12,j+1} = e\_n[12]_{i,j} + e\_n[11]_{i-1,j} + \ldots + e\_n[0]_{i-12,j}$$
(113)

right to left scanline processing $$e\_curr\_line_{i-1,j} = e\_c[1]_{i,j} + e\_c[2]_{i+1,j} + \ldots + e\_c[12]_{i+11,j}$$
$$e\_prev\_line_{i+12,j+1} = e\_n[12]_{i,j} + e\_n[11]_{i+1,j} + \ldots + e\_n[0]_{i+12,j}$$
(114)

where e_curr_line$_{i,j}$ is the total error distributed directly to pixel (i,j) from pixels of the current scanline, and e_prev_line$_{i,j}$ is the total error distributed directly to pixel (i,j) from pixels of the previous scanline.

The error value, e_prev_line$_{i-12,j+1}$ (left to right processing) or e_prev_line$_{i+12,j+1}$ (right to left processing), is written to line store memory from which it will be retrieved as part of processing the next scanline.

The neighbourhood error value for the pixel (i,j), e_nbr$_{i,j}$, is derived as the sum of the error sum value, e_curr_line$_{i,j}$, generated as part of processing the previous pixel of the current scanline, and the error sum value, e_prev_line$_{i,j}$, retrieved from the line store memory.

Description of a Second Arrangement

Bi-Level Monochrome Halftoning

The second arrangement is also described for the case of halftoning a monochrome image.

This second arrangement uses a family of error diffusion masks, all specially designed so that for each mask, the next scanline error impulse response function, corresponding to the mask, approximates the same target function; that target function being a Cauchy distribution which is sampled and normalised. By these means, the generated sparse halftone patterns are free of worn artifacts but at the same time the processing involved in the first arrangement is reduced.

Figure 19A:
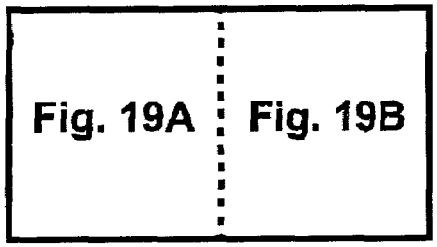
FIG. 19 shows an exemplary family of error diffusion masks for a second arrangement using a Cauchy distribution.

FIG. 19 shows an example of a suitable family 1900 of error diffusion masks for the second arrangement. The family 1900 of error diffusion masks comprises a first column 1902 defining a pixel offset in terms of the variables c1 to c12, and n0 to n12. Error diffusion masks, depicted by columns 1904 to 1926, provide numerical values associated with the aforementioned pixel offsets, the masks being designated as mask 1 to mask 12 respectively.

The pixel offsets in the left column of the table correspond to the mask positions shown in FIG. 3. Mask 1 of this family has weights for 1 pixel position on the current scanline and 2 pixel positions on the next scanline; mask 2 has weights for 2 pixel positions on the current scanline and 3 pixel positions on the next scanline; and so on. That is, as the mask number increases, the width of the mask increases. Mask 12 is the same mask as that described in FIGS. 3 and 4. For each mask of FIG. 19, the current line mask positions are those closest to the current pixel, and the next line mask positions are those closest to the current pixel which are below or behind the current pixel.

Each mask of the family was prepared as described above, so that its next scanline error impulse response function approximates a target next scanline error impulse response function given by:

$$h_{next\_target}[k] = (\tan h(\pi)/\pi)/(1+k^2))$$
(115)

The target next scanline error impulse response function is derived from the Cauchy distribution $(1/\pi)1/(1+x^2)$ by sampling and normalisation.

The halftone output value for each pixel is obtained by error diffusion, with the error diffusion mask used to determine error distribution amounts for the pixel being selected according to the pixel's grey level.

FIG. 20 shows a table 2000 with a suitable mapping between grey levels and the masks of FIG. 19. The table 2000 comprises two columns 2002 and 2004, the first being a mask index running from mask no. 1 to mask no. 12, and the second column 2004 showing correspondence between grey level values and the various mask indices. Thus, for example, mask index no. 6, designated by a reference numeral 2006, is suitable for use with grey levels 16 to 18, 237 to 239, 121, and 134.

For the masks of FIG. 19 and the grey level to mask mapping provided by the table of FIG. 20, generated halftone patterns do not show crossover artifacts. That is, the transition between use of different masks is not apparent in the halftone output. All generated sparse halftone patterns are well spread and worm-free; and the appearance of the halftone output is very similar to that of the first embodiment. At the same time, the average number of addition operations involved in the second embodiment is significantly less than that in the first embodiment.

Figure 18:
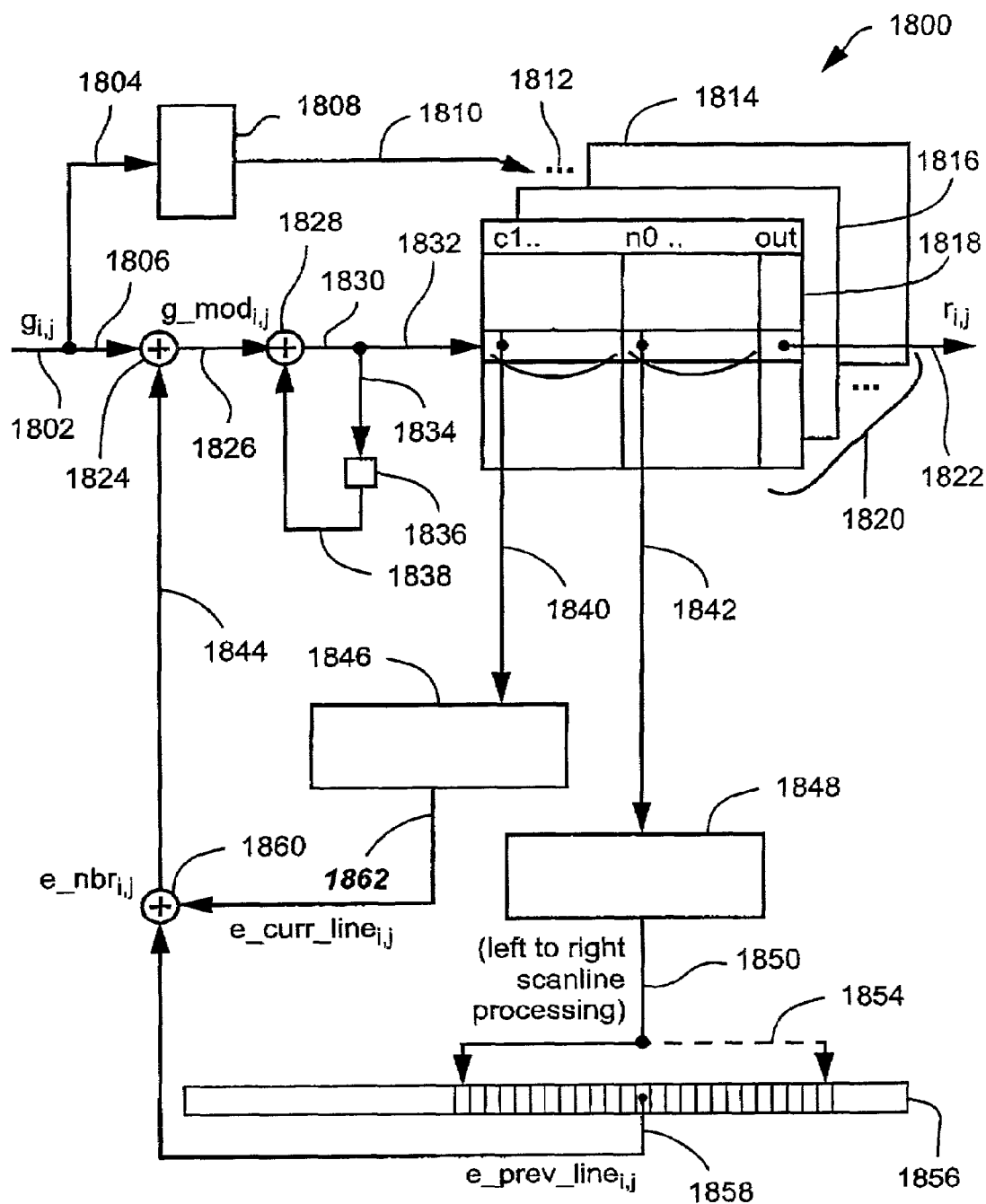
FIG. 18 shows a block diagram representation of a system for pixel processing using a second arrangement of the Cauchy distribution.

FIG. 18 shows a block diagram for the processing performed per pixel for the error diffusion algorithm of the second arrangement. An input image value g$_{i,j}$ for the pixel being considered is provided on a line 1802, this being directed as depicted by lines 1806 and 1804 respectively to an adder process 1824 and a mask index table 1808. The mask index table 1808 provides, in the first instance, a mask index value which is used, as depicted by the arrow 1810 to select a particular error distribution table eg. 1814, 1816, and 1818, from a family 1820 of error distribution tables. In addition, the mask index table 1808 provides two other numbers, these being the number of mask positions on the current scanline, and the number of mask positions on the next scanline, for the particular mask corresponding to the mask index value.

The adder process 1824 provides, on a line 1826, a modified input image value g_mod$_{i,j}$ for the pixel (i,j), directing this to an adder process 1828. The adder process 1828 provides, on a line 1830, and thereafter, a line 1832, a table lookup index table_index$_{i,j}$ which is determined, as described in relation to FIG. 17, and in accordance with (108) and (109). The table index value table_index$_{i,j}$, is computed by the adder process 1828 as a sum of the modified input image value g_mod$_{i,j}$ on the line 1826 and the least significant bits of the table index value for the previously processed pixel this being provided by a line 1834, a latch 1836, and a line 1838 which feeds into the adder process 1828. The most significant bits of the table index table_index$_{i,j}$ on the line 1832 are used to retrieve a halftone output value for the pixel r$_{i,j}$ on a line 1822, as well as error distribution values on the lines 1840 and 1842. The number of current scanline mask positions (not shown) and the current scanline error distribution amounts on the line 1840 are used to update the error sum values in a current line error buffer 1846.

The number of next scanline mask positions (not shown) and the next scanline error distribution amounts on the line 1842 are used to update the error sum values in a line store error buffer 1848. The current line error buffer 1846 provides an error sum value e_curr_line$_{i,j}$ being the total error distributed directly to pixel (i,j) from pixels of the current scanline on a line 1862 which is directed to an adder process 1860. The line store error buffer 1848 provides an error sum value e_prev_line$_{i-12,j}$ (for left to right scanline processing) on a line segment 1852, or alternatively e_prev_line$_{i+12,j}$ (for right to left scanline processing) on a dashed line 1854, for storing in an error line store memory 1856. The memory 1856 provides, on a line 1858, a value e_prev_line$_{i,j}$, ie., the total error distributed directly to the pixel (i,j) from pixels of the previous scanline, which is directed to an adder process 1860. The adder process 1860 outputs, a value for the neighbourhood error for the pixel (i,j), ie., e_nbr$_{i,j}$ on a line 1844, which is directed to the adder process 1824. The nature of the processing performed per pixel is similar to that of the first embodiment. The differences in processing between the 2 embodiments are now described.

In the second embodiment, the pixel grey level on the line 1802 is used to retrieve a mask index value and 2 other numbers from a mask index table 1808. The other 2 numbers are the number of mask positions on the current scanline and the number of mask positions on the next scanline, for the mask corresponding to the mask index value. The mask index value is used to select an error distribution table from the family of error distribution tables 1820. The most significant bits of the table index generated for the pixel and the 2 numbers representing the number of mask positions, are used to retrieve the halftone output value for the pixel and the error distribution values from the selected error distribution table.

The number of current scanline mask positions and the current scanline error distribution amounts are used to update the error sum values in a current line error buffer 1846 and to provide the error sum value, e_curr_line$_{i+1,j}$ (left to right scanline processing) or e_curr_line$_{i-1,j}$ (right to left scanline processing) for the next pixel to be processed for the scanline. The number of addition operations required for this step is the number of current scanline mask positions for the selected mask. This is typically much less than the 11 addition operations required in the first arrangement.

The number of next scanline mask positions and the next scanline error distribution amounts are used to update the error sum values in a line store error buffer 1848 and to provide the error sum value, e_prev_line$_{i-12,j}$ (left to right scanline processing) or e_prev_line$_{i+12,j}$ (right to left scanline processing) for storing in the error line store memory 1856. The number of addition operations required for this step is the number of next scanline mask positions for the selected mask. This is typically much less than the 12 addition operations required in the first arrangement.

In summary, the advantage of the second arrangement over the first, is that the average number of addition operations required is dramatically reduced. When the halftoning method is implemented in software, where each addition operation must be performed sequentially, this can significantly improve the execution speed.

The described arrangements can be implemented for error diffusion where the output halftoned image has more than 2 levels and where the source image is a colour image.

Figure 21:
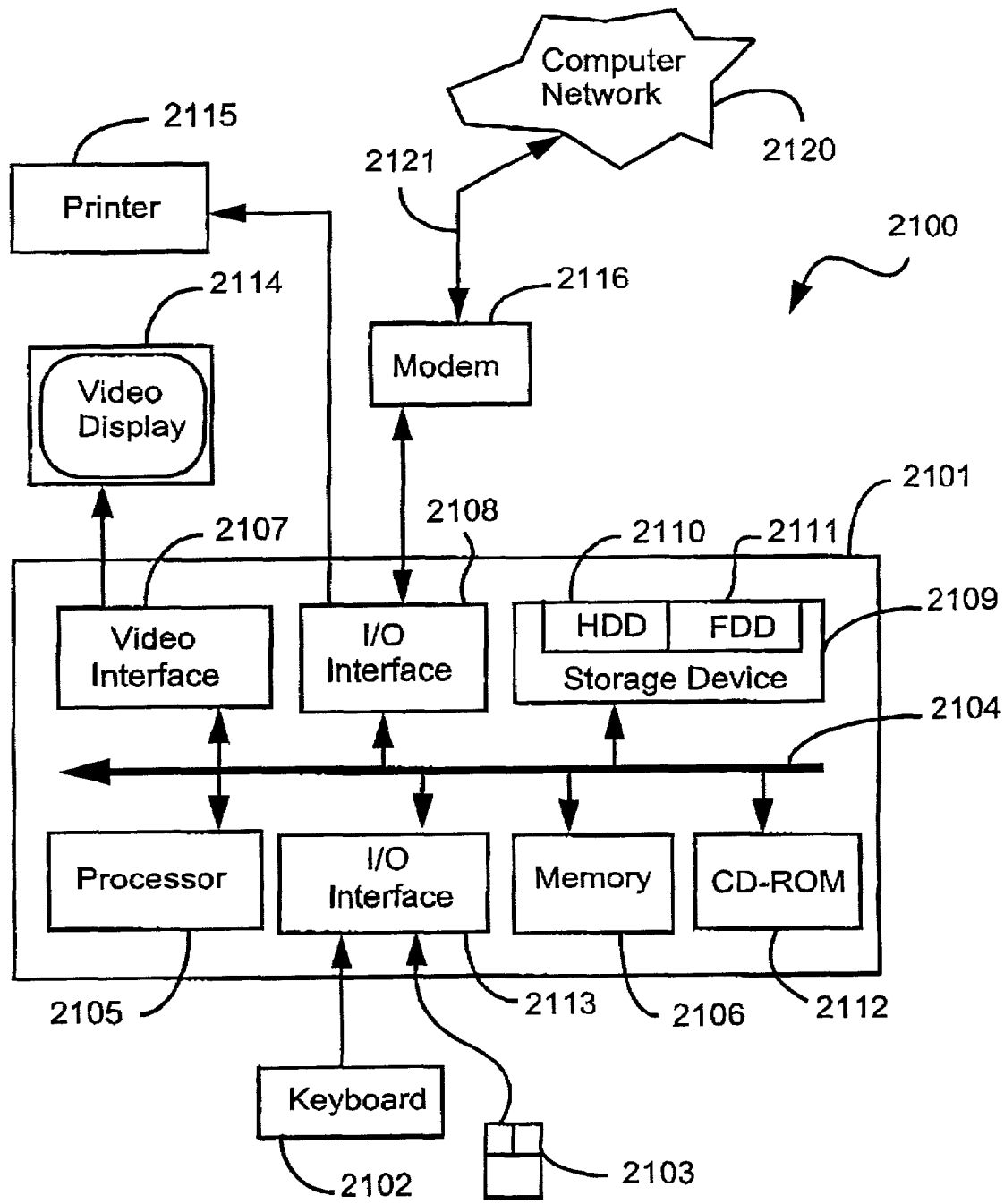
FIG. 21 is a schematic block diagram of a general purpose computer upon which arrangements described herein can be practiced.

The method of Cauchy error diffusion can be practiced using a general-purpose computer system 2100, such as that shown in FIG. 21 wherein the processes of FIGS. 9–10, 17–18 may be implemented as software, such as an application program executing within the computer system 2100. In particular, the steps of method of Cauchy error diffusion are effected by instructions in the software that are carried out by the computer. The software may be divided into two separate parts; one part for carrying out the Cauchy error diffusion methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer effects an advantageous apparatus for Cauchy error diffusion.

The computer system 2100 comprises a computer module 2101, input devices such as a keyboard 2102 and mouse 2103, output devices including a printer 2115 and a display device 2114. A Modulator-Demodulator (Modem) transceiver device 2116 is used by the computer module 2101 for communicating to and from a communications network 2120, for example connectable via a telephone line 2121 or other functional medium. The modem 2116 can be used to obtain access to the Internet, and other network systems, such as a Local Area Network (LAN) or a Wide Area Network (WAN).

The computer module 2101 typically includes at least one processor unit 2105, a memory unit 2106, for example formed from semiconductor random access memory (RAM) and read only memory (ROM), input/output (I/O) interfaces including a video interface 2107, and an I/O interface 2113 for the keyboard 2102 and mouse 2103 and optionally a joystick (not illustrated), and an interface 2108 for the modem 2116. A storage device 2109 is provided and typically includes a hard disk drive 2110 and a floppy disk drive 2111. A magnetic tape drive (not illustrated) may also be used. A CD-ROM drive 2112 is typically provided as a non-volatile source of data. The components 2105 to 2113 of the computer module 2101, typically communicate via an interconnected bus 2104 and in a manner which results in a conventional mode of operation of the computer system 2100 known to those in the relevant art. Examples of computers on which the described arrangements can be practised include IBM-PC's and compatibles, Sun Sparcstations or alike computer systems evolved therefrom.

Typically, the application program is resident on the hard disk drive 2110 and read and controlled in its execution by the processor 2105. Intermediate storage of the program and any data fetched from the network 2120 may be accomplished using the semiconductor memory 2106, possibly in concert with the hard disk drive 2110. In some instances, the application program may be supplied to the user encoded on a CD-ROM or floppy disk and read via the corresponding drive 2112 or 2111, or alternatively may be read by the user from the network 2120 via the modem device 2116. Still further, the software can also be loaded into the computer system 2100 from other computer readable medium including magnetic tape, a ROM or integrated circuit, a magneto-optical disk, a radio or infra-red transmission channel between the computer module 2101 and another device, a computer readable card such as a PCMCIA card, and the Internet and Intranets including email transmissions and information recorded on websites and the like. The foregoing is merely exemplary of relevant computer readable mediums. Other computer readable media may alternately be used.

The method of Cauchy error diffusion may also be implemented in dedicated hardware such as one or more integrated circuits performing the functions or sub functions of Cauchy error diffusion. Such dedicated hardware may include graphic processors, digital signal processors, or one or more microprocessors and associated memories.

INDUSTRIAL APPLICABILITY

It is apparent from the above that the arrangements described are applicable to the image processing industries.

The foregoing describes only some embodiments of the present invention, and modifications and/or changes can be made thereto without departing from the scope and spirit of the invention, the embodiments being illustrative and not restrictive.

Appendix A

Abstract

Although error diffusion is a very popular and effective halftoning method it generates halftone patterns with a number of shortcomings.

One of the major shortcomings is the generation of poor sparse halftone patterns where the exceptional pixel values, instead of being well separated, are concentrated in wavy lines. These patterns are known as "worm artifacts".

Various modifications to error diffusion have been devised to minimise or eliminate worm artifacts.

This paper describes a novel view of error diffusion where the error distribution from a pixel, resulting from the complete processing of a scanline, approximates a standard Cauchy distribution, having the form $(1/\pi)(1/(1+x^2))$. Error diffusion which approximates this error distribution, results in halftone patterns which are well spread at all scales; that is, sparse patterns are well spread no matter how sparse they are.

Analysis and experiments are described which support the desirability of this error distribution and provide insight into the error diffusion process. The analysis looks at the family of distributions generated by self-convolution from the initial distribution of error to the next scanline and the rate at which these distributions spread horizontally. It is shown that the family of distributions based on the standard Cauchy distribution is radially balanced.

Error diffusion algorithms which achieve close approximations to this error distribution require wide error diffusion masks. However, for a given restriction on the size of an error diffusion mask, the principle that the error should be distributed to the next scanline as a standard Cauchy distribution provides a useful aid in the design of the mask.

Error diffusion masks designed according to this principle provide a way of implementing error diffusion, which is efficient at reducing worm artifacts, or, if sufficient mask positions are used, eliminating them.

Background

A digital image is typically represented as an intensity value or set of intensity values at each of a set of spatial locations ("pixels").

Digital halftoning is the transformation from one digital image to another, where the output image pixel values are members of a very reduced set of possible values, and where the output image appears similar to the original input image. This requires a collaborative effect of pixel output values, so that the average intensity in regions of the output image approximate the average intensity of those regions in the input image Because the output image thereby renders intermediate intensities or "tones", the process is called halftoning.

Digital halftoning is used to render digital images on devices with limited set of output values per pixel. Such devices include inkjet printers (where the printer is typically places fixed size dots on a rectangular grid of positions) and some computer displays with limited memory available for storing colour values.

There are 2 main classes of practical digital halftoning algorithms: dither matrix halftoning and error diffusion halftoning. Dither matrix halftoning is a point process, where each pixel is transformed independently of the surrounding input image values. By contrast, error diffusion is a neighbourhood process; where a pixel is transformed taking into account the error at previously transformed, neighbouring pixels. Broadly, error diffusion involves more computation than dither matrix halftoning but is capable of producing more visually pleasing results.

Error Diffusion

Error diffusion was invented by Floyd and Steinberg [reference 1].

In most error diffusion algorithms one pixel is processed at a time. The processing performed per-pixel is typically as follows:

1. Add the pixel input value and error transferred to that pixel from previously processed pixels to obtain a modulated pixel input value.
2. Use the modulated pixel input value to decide a halftone output value for the pixel, typically by a thresholding operation.
3. Calculate the combined error at the pixel by taking the difference between the modulated pixel input value and the pixel halftone output value.
4. Distribute all the combined error at the pixel to a small set of as yet unprocessed, neighbouring pixels according to a set of weights known as an error diffusion mask.

Many extensions and enhancements to error diffusion have been proposed over the years. The paper "Evolution of error diffusion" by Knox [reference 2] provides an overview of enhancements to error diffusion together with developments in the understanding of error diffusion.

Typically, error diffusion, as with many image processing algorithms, is performed for one row (or "scanline") of the image at a time, from the top to the bottom of the image, and pixel by pixel along each scanline.

This paper will discuss a commonly used subset of such error diffusion algorithms where error at a pixel is distributed to pixels of the current scanline and pixels of the next scanline only. Also, only error diffusion of monochrome images, with a single intensity value per pixel, will be discussed. Finally the halftoning is assumed to be bi-level; that is, each pixel in the output image may have one of 2 possible values. Extensions of error diffusion to process colour images, with multiple levels of output intensity are well known.

Figure 22:
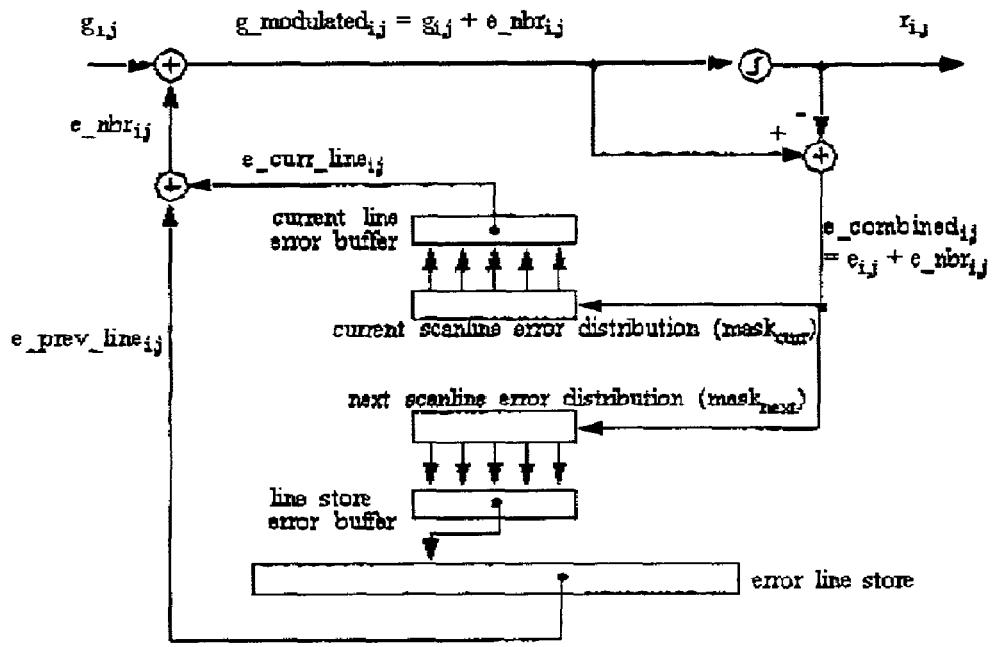
FIG. 22 shows a block diagram of the processing per-pixel for error diffusion.

FIG. 22 depicts a common method of performing the processing per-pixel for such error diffusion.

The diagram shows an input (greyscale) pixel value, $g_{i,j}$, for a current pixel at column i and scanline j of the image. A modulated greyscale pixel value, $g\_modulated_{i,j}$, is derived from the greyscale pixel value by addition of a sum of errors from neighbouring pixels, $e\_nbr_{i,j}$.

By a thresholding operation (indicated as a circled step function), the modulated greyscale value is transformed to a pixel output value (result) $r_{i,j}$. The combined error at the pixel, $e\_combined_{i,j}$ is computed as $g\_modulated_{i,j} - r_{i,j}$; it is the sum of $e\_nbr_{i,j}$ and the pixel-only error $e_{i,j} = g_{i,j} - r_{i,j}$.

This combined error is distributed in fill to neighbouring as yet unprocessed pixels on the current and next scanline according to an error diffusion mask, defined by two sets of weights, represented as discrete 1-dimensional sequences, $mask_{curr}$ and $mask_{next}$.

$mask_{curr}[k]$ is the fraction of combined error, $e\_combined_{i,j}$ distributed directly to the pixel which is horizontally offset by k pixels from the current pixel. As error can only be distributed to pixels ahead of the current pixel, $mask_{curr}[k]=0$ for $k<=0$.

$mask_{next}[k]$ is the fraction of combined error distributed directly to the pixel on the next scanline, offset horizontally by k pixels from the current pixel.

Portions of combined error, each equal to the product of the combined error with one of the weights of $mask_{curr}$ are added into a current line error buffer, each value in the buffer corresponding to a pixel on the current scanline ahead of the current pixel.

Similarly, portions of combined error, each equal to the product of the combined error with one of the weights of $mask_{next}$ are added into a linestore error buffer, each value in the buffer corresponding to a pixel on the next scanline. As part of the per-pixel processing, one value of the linestore error buffer will be complete as it will receive no further contributions, and it is transferred to the error line store, for use in processing the next scanline.

The error line store holds the error values, $e\_prev\_line_{i,j}$, each being the sum of combined errors distributed directly to a pixel of one scanline from pixels of the previous scanline. As part of the per-pixel processing, one value is read from the line store and one value is written to the line store. Consequently, the line store need only be as long as a scanline (hence its name).

The sum of portions of combined error distributed directly to a pixel from pixels of the current scanline, $e\_curr\_line_{i,j}$, is retrieved from the current line error buffer. The sum of portions of combined errors distributed directly to a pixel from neighbouring pixels, $e\_nbr_{i,j}$ and used to modulate the pixel input value is obtained as the addition of $e\_curr\_line_{i,j}$, drawn from current scanline error memory and $e\_prev\_line_{i,j}$, drawn from the error line store.

FIG. 22 is a block diagram of the processing per-pixel for error diffusion which proceeds 1 scanline at a time and which distributes error to the current and next scanlines only Where the mask is fixed for the entire scanline, the computation of the error values, $e\_curr\_line_{i,j}$ and $e\_prev\_line_{i,j}$ for a scanline, can be described by the following equations:

$$e\_curr\_line_j = (e\_line_j + e\_curr\_line_j + e\_prev\_line_j) * mask_{curr}$$

$$e\_prev\_line_{j+1} = (e\_line_j + e\_curr\_line_j + e\_prev\_line_j) * mask_{next}$$

where:

$e\_line_j$ is the sequence of error values, $e_{i,j}$, of scanline j, each of which is the pixel-only error at pixel (i,j) given by $(g_{i,j} - r_{i,j})$;

$e\_curr\_line_j$ is the sequence of error values, $e\_curr\_line_{i,j}$, of scanline j, each of which is the sum of error distributed directly to pixel (i,j) from pixels of the same scanline;

$e\_prev\_line_j$ is the sequence of error values, $e\_prev\_line_{i,j}$, of scanline j, each of which is the sum of error distributed directly to pixel (i,j) from pixels of the previous scanline;

* refers to the convolution operation between 2 sequences $$(f*g)[i] = \Sigma_k f[i-k] \cdot g[k]$$

Figure 23:
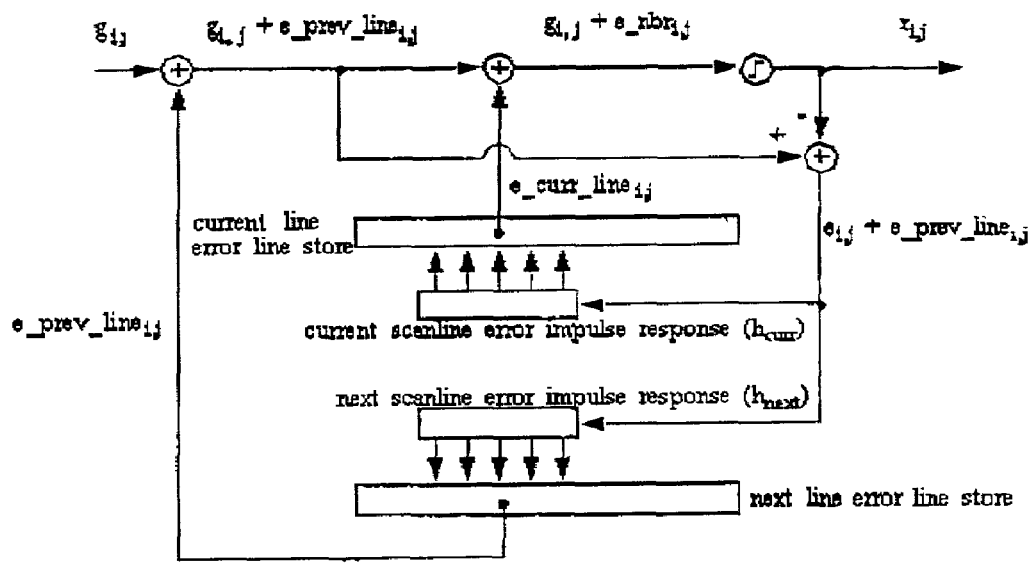
FIG. 23 shows a block diagram of the processing per-pixel for error diffusion in terms of impulse response functions.

An Alternative Model for Error Diffusion in Terms of the Current and Next Scanline Error Impulse Response Functions Error diffusion processing described by FIG. 22 can also be performed according to a different model (see FIG. 23). According to the error diffusion processing model of FIG. 23, at each pixel, a sum of the pixel-only error and the error distributed to the pixel from previous scanlines, is distributed using different error distribution functions.

To distinguish these error distribution functions from the mask distribution functions $mask_{curr}$ and $mask_{next}$ we call them "error impulse response" functions, denoting them $h_{curr}$ and $h_{next}$.

FIG. 23 is a block diagram of the processing per-pixel for error diffusion in terms of error "impulse response" functions $h_{curr}$, the "current scanline error impulse response function", is a discrete 1 dimensional signal representing the pattern of distribution of error at a reference pixel to pixels of the current scanline resulting from complete processing of the scanline.

$h_{next}$, the "next scanline error impulse response function", is a discrete 1 dimensional signal representing the pattern of distribution of error at a reference pixel to pixels of the next scanline resulting from complete processing of the scanline.

To achieve the same output as the original model of error diffusion it is required that $$e\_curr\_line_j = (e\_line_j + e\_prev\_line_j) * h_{curr}$$

$$e\_prev\_line_{j+1} = (e\_line_j + e\_prev\_line_j) * h_{next}$$

Similarly to $mask_{curr}$, $h_{curr}[k]=0$ for $k<=0$, as pixel processing along a scanline is causal.

$h_{curr}$ can be expressed as $$h_{curr} = mask_{curr} + mask_{curr}*^2 + mask_{curr}*^3 \ldots$$

where the notation $*^n$ refers to self-convolution (n−1) times, so that $$h*^1 = h; \ h*^2 = h*h; \ h*^3 = h*h*h; \text{ etc}$$

$h_{next}$ can be expressed as $$h_{next} = (\delta + h_{curr}) * mask_{next}$$

where:

$\delta$ is the delta sequence ($\delta[k]=1$ for $k=0$; and $\delta[k]=0$ elsewhere)

The error diffusion processing model of FIG. 23 is more general than that of FIG. 22—any processing which can be performed according to the model of FIG. 22 can also be performed according to the model of FIG. 23; but not vice versa. The model of FIG. 23 is not suitable for practical implementations of error diffusion—the processing of each pixel involves distribution of error to too many pixels. However, the model is useful both conceptually and for performing error diffusion experiments as will be discussed.

Error Diffusion as a 1-Dimensional Process and the "Influence Function"

Although error diffusion is clearly 2-dimensional, error diffusion which proceeds one scanline at a time from the top to the bottom of the image, can be viewed as a 1-dimensional process.

The entire current scanline is like a wavefront. Behind the wavefront, processing is complete and the halftone output is fixed; processing at the wavefront is based on a memory of all the processing which has taken place; ahead of the wavefront the halftone output is untouched. In this view, the operation of processing a scanline is considered as an atomic operation, a black box. The scanline processing operation takes as input a scanline of the input image together with a set of errors from processed scanlines. It generates as output a scanline of the halftone output image together with an updated set of errors from processed scanlines for use in processing the next scanline. For error diffusion which distributes error to the current and next scanlines only, the set of errors from processed scanlines is 1-dimensional.

Figure 24:
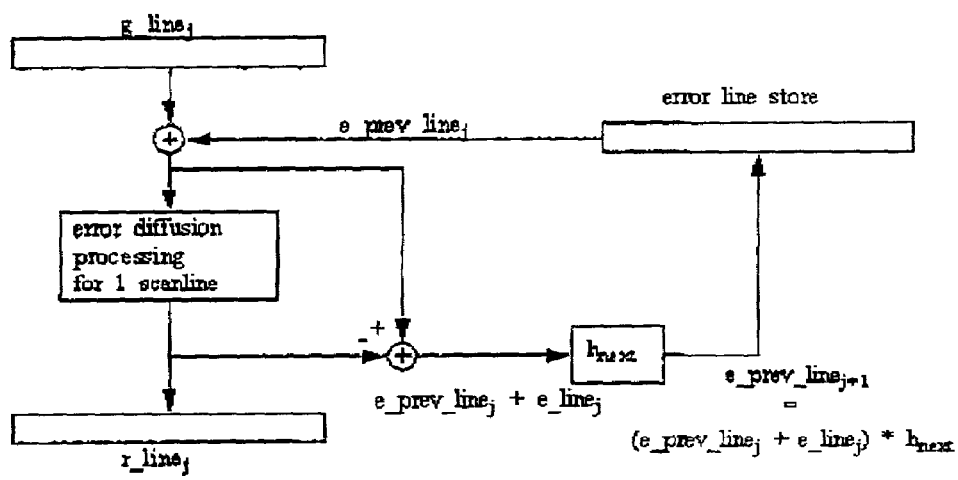
FIG. 24 shows a 1-dimensional view of error diffusion.

This 1-dimensional view of error diffusion is illustrated in FIG. 24.

FIG. 24 shows a 1-dimensional view of error diffusion where scanline error is distributed only to the next scanline In FIG. 24, $g\_line_j$ is the current (j'th) scanline of pixel input values $(g_{i,j})$, $r\_line_j$ is the corresponding scanline of pixel output values $(r_{i,j})$, The scanline of values written to the error line store can be written as $$e\_prev\_line_{i,j+1} = \Sigma_k(e\_prev\_line_{i-k,j} + e_{i-k,j}) \cdot h_{next}[k]$$

The same calculation can be written in terms of 1-dimensional signals as $$e\_prev\_line_{j+1} = (e\_prev\_line_j + e\_line_j) * h_{next}$$

Assuming the pattern of error distribution to the next scanline does not change from one scanline to another, we can write:

$$e\_prev\_line_{j+1} = \Sigma_{n<=1}(e\_line_{j+1-n} * h_{next}^{*n})$$

That is, the values in the error line store can also be viewed as sums of pixel-only error values of previous scanlines, each convolved with the appropriate member of a family of distributions derived from the next scanline distribution function by repeated self-convolution.

We can also turn this around and quantify how much the pixel-only error at a reference pixel contributes to the error line store values of subsequent scanlines. In a sense, this also quantifies the contribution of that pixel-only error to the determination of the halftone output result of pixels of subsequent scanlines. The contribution of the pixel-only error at a pixel to the next scanline is described by $h_{next}$; to the scanline after that it is described by $h_{next}^{*2}$; and to the nth next scanline it is described by $h_{next}^{*n}$.

I use the term "influence function" to describe the contribution of pixel-only error at a pixel to the error line store value of subsequent scanlines.

This picture of the influence of pixel-only error at a pixel on the determination of pixels of subsequent scanlines does not attempt to account for the following 2 effects:

1. the processing of a scanline, typically proceeding pixel by pixel from one end of the scanline to the other, being left-to-right or right-to-left accumulates errors from pixels of the current scanline together with the error distributed to those pixels;
2. the (positive or negative) error at a pixel tends to bias the determination of pixels, in its vicinity and processed later, to a value which generates an opposite signed error, thereby reducing the effect of the error at the original pixel on other pixels processed yet later again.

Effect 1, inevitably introduces some left or right delay shift of the halftone result for the scanline with respect to the scanline input. However, this effect can be minimised by choice of the error diffusion mask coefficients for the current scanline. Also, the effect can be reduced for an image by processing scanlines in different directions. It is very common for error diffusion to be performed with alternate scanlines being processed in opposite directions; this is called serpentine processing.

Floyd-Steinberg Error Diffusion

Figure 25:
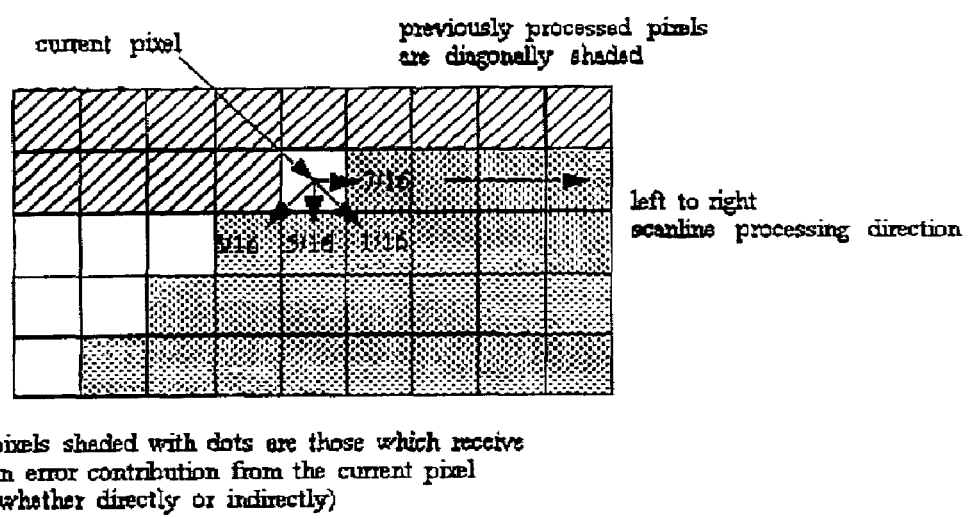
FIG. 25 shows weights used in the Floyd-Steinberg Error Diffusion Method.

The original Floyd Steinberg error diffusion algorithm processes each scanline left to right and distributes error according to the set of weights shown in FIG. 25.

FIG. 25 shows weights used in the Floyd-Steinberg error diffusion algorithm.

Figure 26:
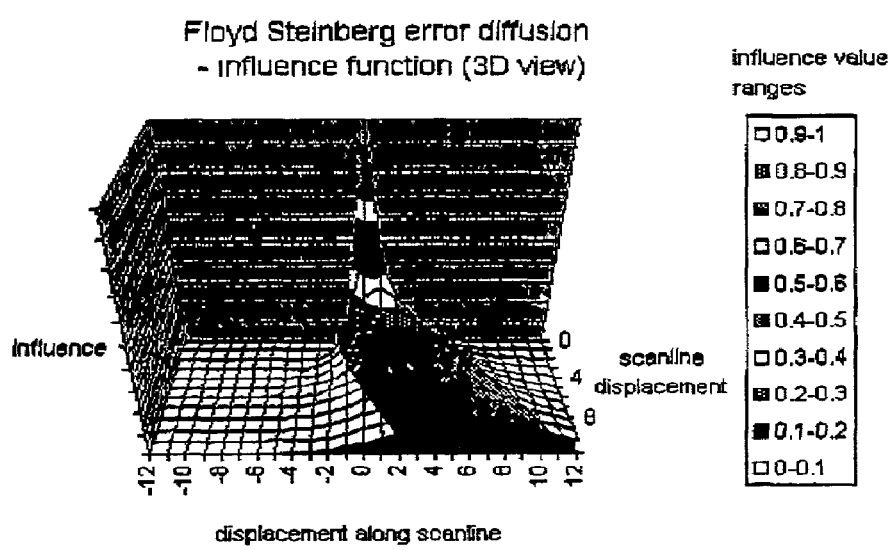
FIG. 26 shows an influence function for Floyd-Steinberg Error Diffusion.
Figure 31:
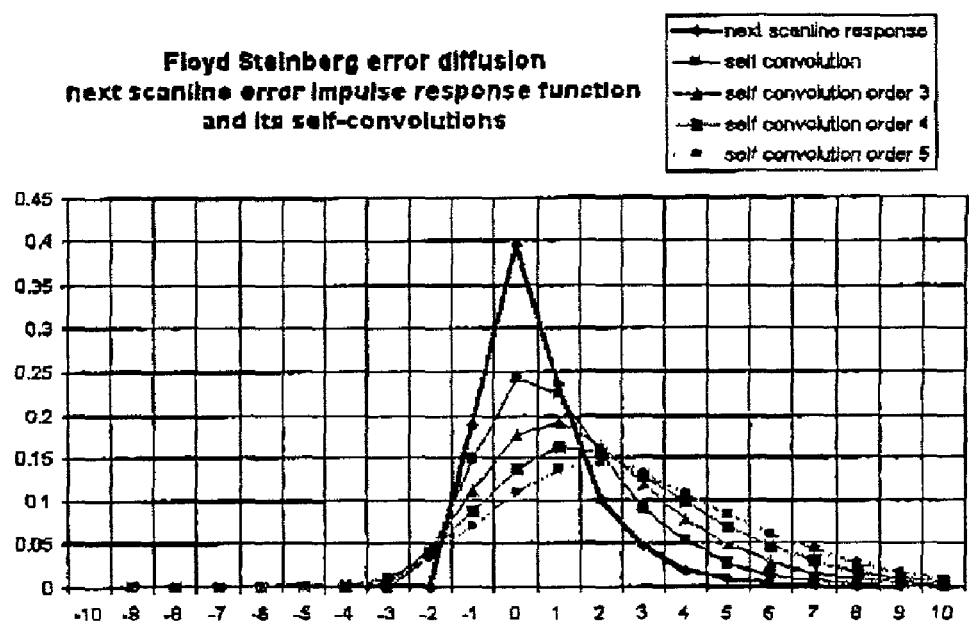
FIGS. 31 to 33 show next scanline error impulse response functions for Floyd-Steinberg, Shiau and Fan, and Cauchy methods.
Figure 32:
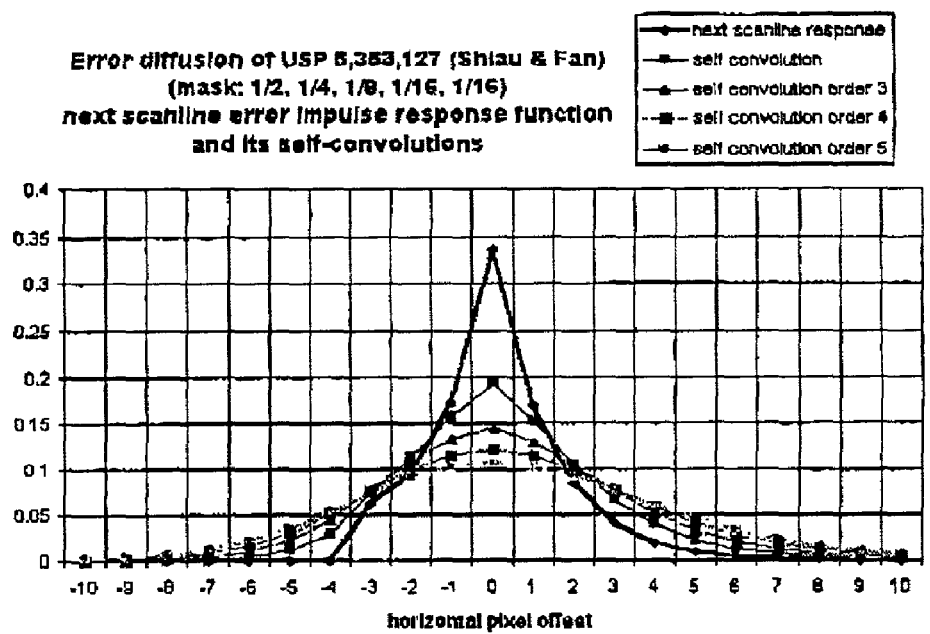
Figure 33:
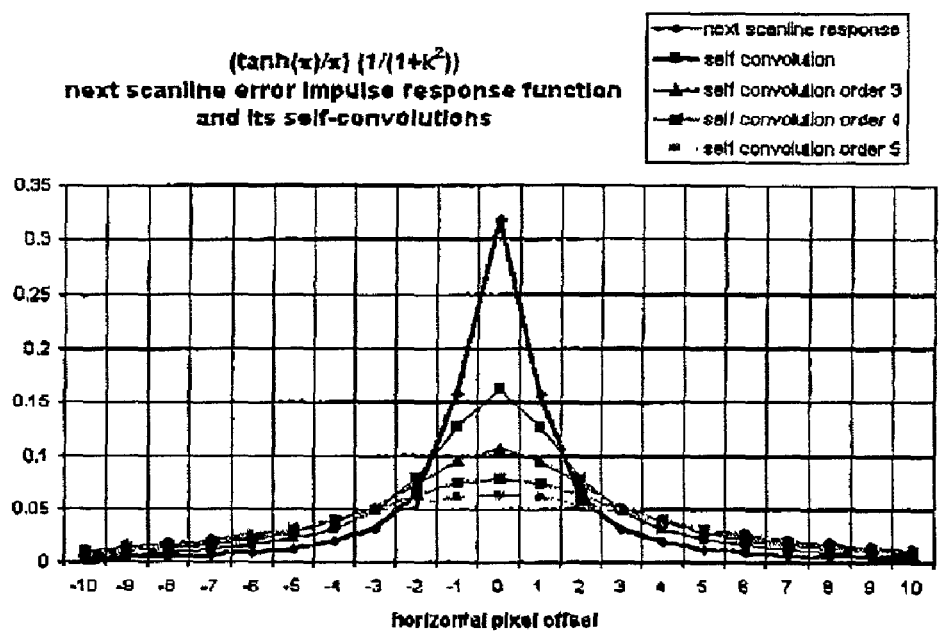

The influence function for the Floyd-Steinberg error diffusion algorithm is shown in FIG. 26 as a surface plot. It is clearly not left-light symmetric. FIGS. 31–33 presents another style of pictorial representation of the influence function. The next scanline error distribution function or "next scanline error impulse response function" is shown for the first 5 subsequent scanlines, all superimposed on the same 2D graph.

FIG. 26 shows an influence function for Floyd-Steinberg error diffusion algorithm.

FIG. 28 shows halftone output generated by 3 different error diffusion algorithms. In each case the output was generated by processing an 8-bit per pixel monochrome image of constant grey value 253 (possible grey values being 0 to 255).

The influence function of Floyd-Steinberg error diffusion shows a bias to the right. With increasing scanline separation from a reference pixel, the influence reduces least at an angle of about 20° from vertical. The Floyd-Steinberg error diffusion output in FIG. 28 shows both start-up worm artifacts where worm patterns are typically horizontal lines and more typical worm artifacts which are oriented sloping up to the right. The general slope of these non-start-up worm artifacts is approximately perpendicular to the direction of least decay in the Floyd Steinberg error diffusion influence function. ps Shiau and Fan Extended Distribution Set Error Diffusion In U.S. Pat. No. 5,353,127, "Method for quantization gray level pixel data with extended distribution set" [reference 3], and in the paper, "A set of easily implementable coefficients in error diffusion with reduced worm artifacts" [reference 4], Shiau and Fan describe error diffusion with a mask which extends further back than previous masks.

The mask is shown in FIG. 26 Error diffusion with this mask greatly reduces the presence of worm artifacts compared to Floyd-Steinberg error diffusion.

However, worm artifacts, although much less visible, do in fact remain, as can be seen in the middle halftone output of FIG. 28.

Figure 27:
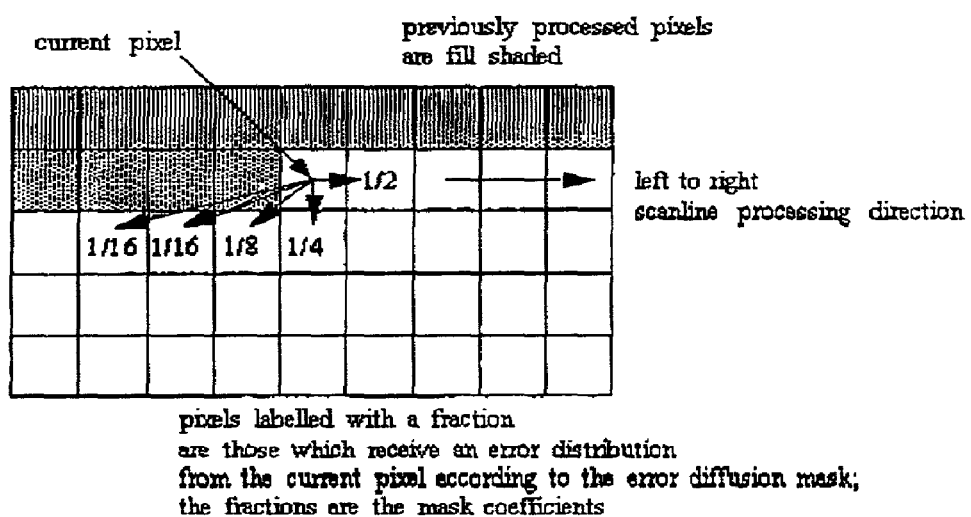
FIG. 27 shows weights used in error diffusion according to Shiau and Fan.

FIG. 27 shows weights used in error diffusion according to Shiau and Fan (U.S. Pat. No. 5,353,127)

The next scanline error impulse response function for the error diffusion of Shiau and Fan is much more left-right symmetric than Floyd-Steinberg error diffusion. The worm artifacts in the middle halftone output of FIG. 28 are nearly horizontal.

FIG. 28 shows error diffusion outputs for a region of greylevel 253, for the three error diffusion methods indicated.

Figure 29:
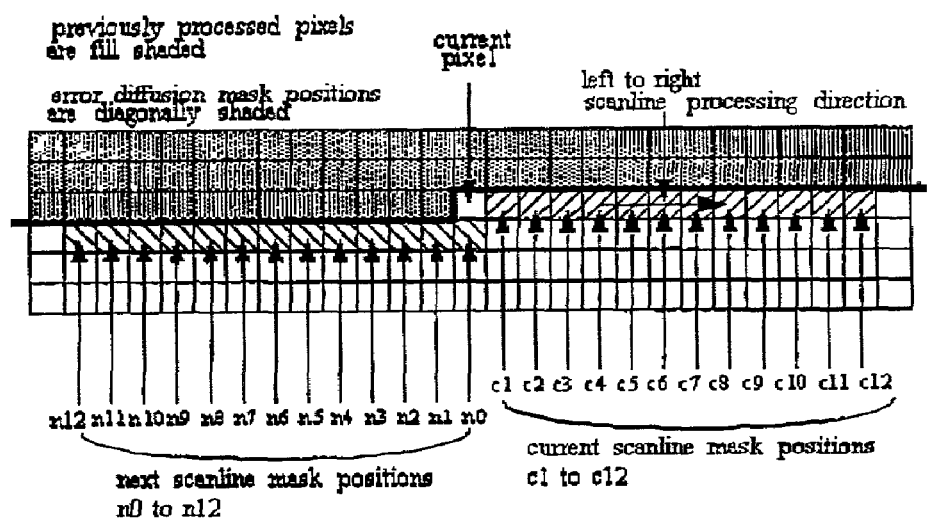
FIG. 29 shows a wide error diffusion mask, for which the next scanline error impulse response approximates a Cauchy distribution.

Error Diffusion where the Next Scanline Error Impulse Response Approximates a Cauchy Distribution FIG. 29 shows a wide error diffusion mask, for which the next scanline error impulse response approximates a Cauchy distribution FIG. 30 shows mask weights for the various mask positions in the mask of FIG. 29.

The error diffusion mask coefficients of the wide mask of FIG. 29 were obtained by an optimisation process to minimise a difference between the actual next scanline error impulse response and the sequence $(1/\pi)\tan h(\pi) \; 1/(1+k^2)$.

Determining whether worm artifacts are absent or present in a sparse halftone pattern is somewhat subjective. Nevertheless, it can be reasonably said that using the wide error diffusion mask of FIG. 29, any sparse halftone pattern generated for an 8-bit per pixel image greylevel is well spread and worm free.

The halftone output at the right of FIG. 28 was generated with this wide mask and shows no worm artifacts.

FIGS. 31–33 show next scanline error impulse response functions for Floyd Steinberg, Shiau and Fan, and Cauchy methods.

Desirable Characteristics of the Next Scanline Error Impulse Response Function

As discussed, error diffusion where error is distributed to the current and next scanlines only according to an error diffusion mask, can also be viewed in terms of the model of FIG. 23.

According to the error diffusion model of FIG. 23, the input to the processing of a scanline, is actually a scanline of values, each being the sum of an input greyscale value and an error linestore value. It is reasonable to view the role of the processing of each scanline as being to deliver the best halftone results it can, given its input. In many successful error diffusion algorithms, the line of input greyscale values is not pre-biased to the left or right. It is reasonable to consider that the delay shift effect in processing a scanline, as described above, is not particularly significant. So it reasonable to expect that just as the current scanline input need not be shifted, so the memory of previous lines error, and the next scanline error impulse response function should not be significantly biased to left or right.

So, we say, the next scanline error impulse response function, at least to a first approximation, should be left-right symmetric.

Also, it is also reasonable to expect that the contribution of error at a reference pixel, as measured by the next scanline error impulse response function, to the determination of pixel output for pixels on the next scanline, should reduce with increasing distance from the reference pixel. Summarising, we say, the next scanline error impulse response function should be left-right symmetric and generally bell-shaped.

With error diffusion, the principle that error should be distributed in full, without amplification or attenuation, is almost universally followed. Use of the principle ensures that the average intensity of regions of the output image tend to match the average intensity of regions of the input image. The requirement that error is distributed in full is expressed by the following equation concerning error diffusion mask coefficients:

$\Sigma_k \text{mask}_{curr}[k] + \Sigma_k \text{mask}_{next}[k] = 1$

This requirement places the following restriction on the next scanline error impulse response function $\Sigma_k h_{next}[k] = 1$ That is, all error must be distributed to the next scanline. Consequently all error is distributed to any subsequent scanline as measured by the nth next scanline error impulse response function.

$\Sigma_k h_{next}^{*n}[k] = 1$

The next scanline error impulse response function of the error diffusion of Shiau and Fan satisfies the desirable characteristics of being approximately left-right symmetric and generally bell-shaped.

One might suppose that the reason the error diffusion mask of Shiau and Fan generates worm artifacts (albeit much diminished compared to Floyd-Steinberg error diffusion) is due to the limited width of the mask.

Halftone output has been observed which was obtained by error diffusion using arbitrarily wide masks of the same form as the Shiau and Fan mask, as specified below.

Specification of an arbitrarily wide mask of the same form as the Shiau and Fan mask;

N is an arbitrarily large integer, $N \geq 0$ $\text{mask}_{curr}[1] = \frac{1}{2}$ $\text{mask}_{curr}[k] = 0$ for $k \neq 1$ $\text{mask}_{next}[-N] = (\frac{1}{2})^{1+N}$ $\text{mask}_{next}[-k] = (\frac{1}{2})^{2+k}$ for $N < k <= 0$ $\text{mask}_{next}[k] = 0$ for k elsewhere Note that as N increases the next scanline error impulse response function corresponding to this mask tends to the discrete, left-right symmetric, next scanline response function:

$h_{next}[k] = \frac{1}{3}(\frac{1}{2})^{|k|}$

In fact, no matter how large N is made such masks still generate worm artifacts for sparse patterns corresponding to the most extreme 8-bit greylevels An Ideal Error Distribution for Avoiding Worm Artifacts The results of further error diffusion experiments described below provide evidence that there is an ideal error distribution for the class of error diffusion algorithms which distribute error to the current and next scanlines only, according to a fixed mask.

This ideal distribution is the member of the family of Cauchy distributions known as the standard Cauchy distribution, and is given by $f(x) = (1/\pi)(1/(1+x^2))$ To avoid worm artifacts, not only should a mask be sufficiently wide, but it should also provide a next scanline error response function approximating the standard Cauchy distribution.

The Cauchy Distribution

The family of Cauchy distributions is given by $f(x) = (1/\pi)(n/(n^2 + (x-t)^2))$ where t is a location parameter and n is a scale parameter. For each distribution of the family, the area under the curve is 1. From this point on only members of the family of Cauchy distributions will be discussed which are centrally located (t=0) and which have integer values of n.

Samples of members of this family of Cauchy distribution (with n=1, 2, 3, 4, 5) are shown in FIG. 33. The Cauchy distribution itself is bell-shaped, extends without limit along each end of the x axis, and has significant weight in the tails—its absolute moment (expected absolute value) is not finite as the corresponding integral diverges.

The Cauchy distribution also possesses the remarkable property that its self-convolutions are also Cauchy distributions. Indeed, $$[(1/\pi)(1/(1+x^2))]^{*n} = (1/\pi)(n/(n^2+x^2)) \text{ [derived in Appendix B]}$$

Consequently, a next scanline error impulse response function approximating the standard Cauchy distribution, has its n'th scanline error impulse response function approximating the central Cauchy distribution with scale parameter n.

Members of the family of Cauchy distributions are copies of each other, obtained by inversely scaling in the 2 axes. In particular, the central Cauchy distribution with scale parameter n is obtained from the standard Cauchy distribution by stretching the x axis by n and by scaling the ordinate axis by multiplying by 1/n. The total area under the curve is unchanged by this double scaling.

$$(1/n)*1/(1+(x/n)^2) = n/(n^2+x^2)$$

So it is seen that, the members of the family of central Cauchy distributions with $n=1, 2, 3, \ldots$ spread horizontally in proportion to the scale parameter n.

Experiments Exploring the Role of the Shape of the Next Scanline Distribution Function in Generation of Worm Artifacts A range of experiments has been conducted, where the shape of the next scanline error impulse response function was varied and the halftone output was observed.

The error diffusion processing model of FIG. 23 was used to set guidelines and to specify the error distribution for these experiments.

As noted above, desirable characteristics for the next scanline function are that
1. $\Sigma_k h_{next}[k]=1$
2. $h_{next}$ is left-right symmetric and monotonically decreases from a central peak value at $h_{next}[0]$ A further guideline was set that the current scanline error impulse response function should have a similar shape to one side of the next scanline error impulse response function, being obtained from it by multiplying by a step function.

The actual method of performing the error diffusion processing was according to the model of FIG. 22 for experiment 1 (as the corresponding mask is straightforward to calculate in this case) and was according to the model of FIG. 23 for the remaining experiments.

When the model of FIG. 23 was used, the current and next scanline error impulse response functions were truncated by setting coefficients beyond a certain horizontal offset to zero so as to keep the required processing time manageable. The number of non-zero coefficients was still kept high to avoid misleading results.

Experiment 1.

The next scanline error impulse response function is a sampling of the 2-sided exponential distribution:

$$h_{curr}[k] = a \cdot w^k \text{ for } k>=1$$

$$h_{next}[k] = ((1-w)/(1+w)) \cdot w^{|k|}$$

where a is a positive constant and $0<w<1$

When $a=1$ and $w=\frac{1}{2}$, this form of error distribution matches that already mentioned as an extension of the error diffusion of Shiau and Fan. In that case, halftone output at extreme grey levels suffers from worm artifacts, where the horizontal separation of minority pixels is too small.

These worm artifacts can be reduced by increasing either of the parameters a or w. However, modifying these parameters so that minority pixels at the extreme grey levels are better separated, introduces other unpleasant artifacts, including artifacts where for other grey levels the vertical separation between minority pixels becomes too small.

Experiment 2

The next scanline error impulse response function is a sampling of the gaussian distribution:

$$h_{curr}[k] = a \cdot exp(-\pi(k/b)^2) \text{ for } k>=1$$

$$h_{next}[k] = c \cdot exp(-\pi(k/b)^2)$$

where a, b, c are positive constants, with c chosen so that $\Sigma_k h_{next}[k]=1$;

b is the standard deviation of the corresponding continuous distribution

When $a=\frac{1}{2}$ and $b=4$, halftone output at extreme grey levels suffer from worm artifacts. These artifacts can be reduced by increasing a or b. However, modifying these parameters so that minority pixels at these grey levels are better separate, introduces other unpleasant artifacts, including where for other grey levels the vertical separation between minority pixels becomes too small.

Experiment 3

The next scanline error impulse response function is a sampling of the Cauchy distribution:

$$h_{curr}[k] = a \cdot (1/(b^2+k^2)) \text{ for } k>=1$$

$$h_{next}[k] = c \cdot (1/(b^2+k^2))$$

where a, b, c are positive constants, with c chosen so that $\Sigma_k h_{next}[k]=1$;

b controls the degree of spread of the distribution

When $a=1$ and $b=1$, the halftone patterns for all grey levels with sparse halftone patterns are well spread, showing no worm artifacts. Also the general quality (absence of unwanted textures) of the halftone output is high across all grey levels.

For 8-bit per pixel monochrome images, the extreme sparse halftone patterns correspond to grey levels 1 and 254. By allowing fractional grey levels less than 1 the behaviour of error diffusion can be observed for halftone patterns which are much more sparse than the halftone patterns for grey level 1.

It is noteworthy that the very sparse halftone patterns for sub-unity fractional grey values are also well spread when the Cauchy distribution is used for the current and next scanline response functions. That is, error diffusion processing using the Cauchy distribution appears capable of generating well spread halftone patterns no matter how sparse the patterns.

The satisfactory output provided in this case also provides some vindication for the choice of a current scanline error impulse response function as a copy of the next scanline error impulse response function obtained by multiplication by a step function.

When b is increased well above 1 the vertical separation of minority pixels in sparse halftone patterns is too small; when b is decreased well below 1 the horizontal separation of minority pixels in sparse halftone patterns is too small.

Experiment 4

The next scanline error impulse response function is a generalisation of the Cauchy distribution:

$$h_{curr}[k]=a\cdot 1/(b^2+k^2)^p \text{ for } k>=1$$

$$h_{next}[k]=c\cdot 1/(b^2+k^2)^p$$

where a, b, c, p are positive constants, with c chosen so that $\Sigma_k h_{next}[k]=1$ With p set above 1, the observations are similar in character to those for experiments 1 and 2.

With p set below 1 (but necessarily greater than ½), the halftone patterns for very low or very high grey levels are well spread horizontally, but the horizontal separation for intermediate grey values is too small.

Conclusions and Interpretations from the Experiments

Of the various next scanline error impulse response functions considered in the above experiments, the only form of the next scanline error impulse response function which delivers sparse halftone patterns which are well spread for all grey levels is the one which approximates the standard Cauchy distribution.

A next scanline error impulse response function approximating the standard Cauchy distribution successfully shapes the error diffusion influence function to achieve a suitable balance between providing sufficient horizontal and vertical separation between minority pixels, for all grey levels.

The poorly separated sparse halftone patterns produced by other next scanline error impulse response functions can be explained in general terms by considering the shape of the corresponding influence function, as follows.

When the influence function is not horizontally spread sufficiently (too concentrated centrally), the disincentive to place minority pixels reduces too rapidly with horizontal separation, resulting in too little horizontal separation between minority pixels, causing worm artifacts. When the influence function is spread too much, the disincentive to place minority pixels does not reduce rapidly enough with horizontal separation causing minority pixels to be placed with a horizontal separation which is too wide and consequently with a vertical separation which is too small.

As the input image grey level approaches the extreme grey levels and halftone patterns become more sparse, so the shape of the influence function at more distant scanlines becomes important. When the next scanline error impulse function spreads with self-convolution at a rate less than in proportion to scanline separation (experiments 1, 2, and experiment 4 with p above 1), it is possible for the influence function to be too spread for near scanlines and not spread enough for distant scanlines. When the next scanline error impulse function spreads with self-convolution at a rate greater than in proportion to scanline separation (experiment 4 with p below 1), it is possible for the influence function to be not spread enough for near scanlines and to be too spread for distant scanlines Desirability that the Next Scanline Error Impulse Response Function should Spread in Proportion to the Degree of Self-Convolution As previously noted, the Cauchy distribution spreads with self-convolution in proportion to the degree of self-convolution. By contrast, a gaussian distribution spreads in proportion to the square root of the degree of self-convolution.

It is proposed that a necessary requirement for well spread sparse halftone patterns for error diffusion, where error is distributed to the current and next scanlines only and the pattern of distribution is fixed, is that the next scanline error impulse response function should spread in proportion to the degree of self-convolution.

In fact, the requirement that the next scanline error impulse response function should spread in proportion to the degree of self-convolution, when considered with the other desirable characteristics listed previously determines that the next scanline error impulse response function must be a Cauchy distribution.

Specifically, a positive symmetric continuous impulse response, which, preserves the magnitude of the impulse, spreads in proportion to the degree of self-convolution and which acts as a smooth (continuous) low pass filter, dampening all non-zero frequencies must be a Cauchy distribution [see Appendix B].

Figure 34:
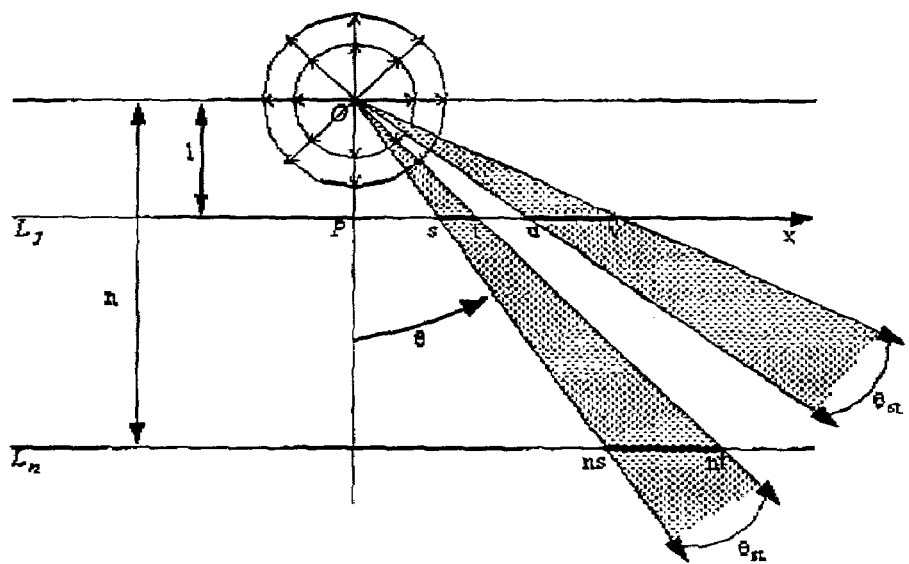
FIG. 34 shows the Cauchy distribution in terms of a vector field.

Another View of the Cauchy Distribution and the Desirability that the Next Scanline Error Impulse Response Function should be Radially Balanced Consider the 2-dimensional field of vectors oriented away from a point source and of magnitude $1/(\pi r)$, where r is the distance from the point source. This vector field is depicted in FIG. 34. A line, $L_1$, at distance 1 from the point source, O, is shown, defining an x axis. A parallel line, $L_n$, is shown at distance n from O.

FIG. 34 shows the standard Cauchy distribution and the $1/(\pi r)$ vector field.

$$flux_{L1:s \to t} = \int_s^t \left(\frac{1}{\pi}\right)\frac{1}{(1+x^2)^{1/2}}\cos\theta dx = \int_s^t \left(\frac{1}{\pi}\right)\frac{1}{(1+x^2)}dx = \theta_{st}/\pi$$

$$flux_{Ln:ns \to nt} = \int_{ns}^{nt} \left(\frac{1}{\pi}\right)\frac{1}{(n^2+x^2)^{1/2}}\cos\theta dx = \int_{ns}^{nt} \left(\frac{1}{\pi}\right)\frac{n}{(n^2+x^2)}dx = \theta_{st}/\pi$$

The flux of a 2-dimensional vector field across a line is defined as the line integral of the component of the vector field perpendicular to the line. The flux of the vector field across line segment s→t of line $L_1$ and across line segment ns→nt of line $L_n$ are given directly above (see Appendix B for evaluation of the integral)

That is, the flux density function along the line $L_1$ is the standard Cauchy distribution, and the flux density function along the line $L_n$ is the central Cauchy distribution of scale n.

The flux of the vector field across the line segment s→t of $L_1$ and the line segment ns→nt of $L_n$ are the same, being the flux within the radial segment defined by the rays 0→s and 0→t and subtending angle $\theta_{st}$. Moreover, the flux across any other segment of $L_1$, u→v which subtends the same angle, matches the flux across the segment s→t. In this sense, the standard Cauchy distribution is "radially balanced". Indeed, another definition of a Cauchy distribution is that probability distribution of horizontal distances at which a line, through a fixed point, tilted at a random angle cuts the x-axis.

So it is seen that, the family of Cauchy distributions $(1/\pi)n/(n^2+x^2)$ describes the flux density of the $1/(\pi r)$ vector field across the parallel lines $L_n$. Consequently, when error is distributed to the next scanline according to the radially balanced, standard Cauchy distribution, and to subsequent scanlines by repeated self-convolution, it is seen that the strength of the distribution within any radial segment is maintained from one scanline to the next. Neither does the strength of the distribution concentrate towards the centre; neither does it drift to the extremities.

Design of Error Diffusion Masks by Optimisation of a Cost Function

Our goal is to design error diffusion masks for which the corresponding next scanline error impulse response function approximates the standard Cauchy distribution. To achieve this it is necessary to deal with discrete sequences rather than continuous distributions.

The sequence obtained by sampling the standard Cauchy distribution and multiplying by the constant $\tan h(\pi)$, has its sum of coefficients equal to 1.

$$\Sigma_k (\tan h(\pi)/\pi) 1/(1+k^2)=1 \text{ [see Appendix B]}$$

The sequence $$h[k]=(1/\pi)(1+(-1)^{k-1}e^{-\pi})/(1+k^2)$$

satisfies $$h[k]^{*n}=(n/\pi)(1+(-1)^{k-1}e^{-n\pi})/(n^2+k^2) \text{ [see Appendix B]}$$

$$\Sigma_k h[k]=1 \text{ [see Appendix B]}$$

Now, $e^{-\pi}\approx 0.0432$ is close to zero, and $\tan h(\pi)\approx 0.9963$ is very close to 1. So, setting a target next scanline error impulse response function equal to ti $h_{next\_target}[k]=(\tan h(\pi)/\pi)1/(1+k^2)$ means that $$\Sigma_k h_{next\_target}[k]=1$$

$$h_{next\_target}[k]^{*n}\approx (1/\pi)1/(1+k^2)$$

That is, the sequence $h_{next\_target}$ is a sampling of the standard Cauchy distribution multiplied by $\tan h(\pi)$ and its self-convolutions are approximately samplings of the self-convolutions of the standard Cauchy distribution.

Having determined $h_{target}$ as a suitable next scanline error impulse response function, it is then required to determine a corresponding error diffusion mask.

We refer back to the equation $$h_{next}=(\delta+h_{curr})*\text{mask}_{next}$$

and note that $(\delta+h_{curr})$ is a causal sequence. For the next scanline error impulse response function, $h_{next}$, to be left-right symmetric, it is necessary that the sequence $\text{mask}_{next}$ be a scaled anti-causal copy of $(\delta+h_{curr})$. This means, that the error diffusion mask coefficients, $\text{mask}_{next}[k]$, should only be non-zero for $k \leq 0$.

For an error diffusion mask of a specified width, we seek mask coefficients which minimise a difference between the actual next scanline error impulse response function corresponding to those mask coefficients and the target next scanline error impulse response function. The width of the error diffusion mask is described by maximum offset non-zero mask positions for the current scanline, $N_c$, and next scanline, $N_n$, giving $\text{mask}_{curr}[k] \neq 0$ for $1 \leq k \leq N_c$ and $\text{mask}_{next}[k] \neq 0$ for $-N_n \leq k \leq 0$.

We seek $(N_c+N_n+1)$ mask coefficients subject to the requirement that $$\Sigma_k \text{mask}_{curr}[k]+\Sigma_k \text{mask}_{next}[k]=1$$

which minimise a suitable cost function such as $$\text{Cost}(\text{mask}_{curr}[], \text{mask}_{next}[])=\Sigma_{|k| \leq M}(h_{next\_actual}[k]-h_{next\_target}[k])^2$$

where

M specifies a suitable large bound for sequence offsets, and as above, $h_{next\_actual}=(\delta 30 \text{ mask}^{curr}+\text{mask}_{curr}*^2+\text{mask}_{curr}*^2+\text{mask}_{curr}*^3 \ldots )*\text{mask}_{next}$ $h_{next\_target}[k]=(\tan h(\pi)/\pi)1/(1+k^2)$ An approximate solution (mask coefficients which deliver a cost difference near the minimum) can be obtained using optimisation methods including the method of steepest descent and the conjugate gradient method [see reference 5]. The coefficients for the error diffusion mask of FIG. 29, were obtained using the conjugate gradient method and C software supplied with that textbook.

A Family of Error Diffusion Masks and More Efficient Error Diffusion Algorithms

Using the above method, error diffusion masks have been prepared for a range of widths as shown in FIG. 35. Mask 1 has 3 mask positions, one on the current scanline and 2 on the next scanline; mask 2 has 2 mask positions on the current scanline and 3 on the next scanline; and so on. The mask pixel offsets are labelled c1 to c12 and n0 to n12 and correspond to the mask positions shown in FIG. 29. Mask 12 of FIG. 35 is the same mask, pixel offsets and mask coefficients, as the mask in FIG. 29.

FIG. 35 shows error diffusion masks for a range of widths, optimised so that the next scanline error impulse response function approximates the standard Cauchy distribution Many error diffusion masks have been proposed which distribute error to several scanlines. For each extra scanline in the error diffusion mask, an extra error line store is required to implement the algorithm. While the error diffusion discussed in this paper, has the advantage that it combats worm artifacts without a cost in additional line stores, an error diffusion mask such as that of FIG. 28 is very wide, much wider than error diffusion masks used in practice. The processing performed per pixel relates directly to the number of error diffusion mask positions. The large width of the mask of FIG. 29 would prevent its use in many applications.

For bi-level halftoning, the most sparse halftone patterns occur for input image regions with grey levels close to the minimum or maximum intensity. As the grey level moves closer to the centre grey level, halftone patterns become less sparse.

It has previously been observed that the equality of error diffusion halftoning can be improved by using a larger error diffusion mask for the grey levels with more sparse halftone patterns. For example, in the paper "Error diffusion algorithm with reduced artifacts" [reference 6], Eschbach, discusses using a small or a large error diffusion mask, depending on the input pixel grey level.

Similarly, for most intermediate grey levels, it is found that there is no significant advantage in the quality of halftone output obtained by using the wide error diffusion masks of FIG. 35. For most grey levels, masks of FIG. 35 with only a small width, can be used without any noticeable artifacts.

In his paper, Eschbach also noted that the 2 masks should have similar structure to minimise crossover artifacts for image regions where both masks are used.

In a similar vein, it is possible to select the error diffusion mask, based on the input image grey level, from a family of masks of varying width, all designed according to the principle of minimising the difference between the corresponding next scanline error impulse response function and the standard Cauchy distribution. The table of FIG. 36 defines a napping between grey levels and the error diffusion masks of FIG. 35.

By performing error diffusion, where the mask is selected according to the input pixel grey level and the table of FIG. 36, very similar quality halftone output is achieved to that achieved by use of the mask of FIG. 29 for all input pixel grey levels.

In this way, a considerable saving of average processing per pixel can be achieved.

FIG. 36 shows mapping between grey levels and masks of FIG. 35

Alternatively, simply using a moderately wide mask from the table of FIG. 35, provides good reduction in worm artifacts for a modest increase in processing.

Conclusion and Final Notes

A principle has been proposed for the design of error diffusion masks which distribute error to the current and next scanlines only. The principle is that the error distribution to the next scanline resulting from the complete processing of a scanline should approximate the standard Cauchy distribution.

By careful design of the error diffusion mask according to this principle, and with no other change to the error diffusion algorithm, the halftone output is free of worm artifacts, no matter how sparse the halftone patterns.

Experimental results have been described which support the principle. Analysis has been presented as to why such a pattern of error distribution is desirable. The analysis is based on considering the family of distributions generated from the next scanline error distribution by self-convolution. The family of distributions generated from the standard Cauchy distribution is radially balanced.

The names Cauchy error diffusion or radially balanced error diffusion are suggested for error diffusion where the mask is designed according to this principle.

Actual masks of varying width designed according to the principle are reported. While wide masks are required to eliminate worm artifacts, less wide masks or selective use of masks of varying width provide implementation options with less processing.

REFERENCES

1. R. W. Floyd and L. Steinberg, "An adaptive algorithm for spatial greyscale", Proc. Soc. Inf. Displ. 17/2, pp 75–77 (1976).
2. K. T. Knox, "Evolution of error diffusion", JEI, 8(4), pp 422–429, 1999.
3. J. Shiau and Z. Fan, U.S. Pat. No. 5,353,127 "Method for quantization gray level pixel data with extended distribution set", 1994.
4. J. Shiau and Z. Fan, "A set of easily implementable coefficients in error diffusion with reduced worm artifacts", SPIE, 2658, pp 222–225, 1996.
5. R. J. Schilling and S. L. Harris, "Applied Numerical Methods for Engineers"
6. R. Eschbach, "Error Diffusion Algorithm with Reduced Artifacts", Proceedings of IS&T's 45$^{th}$ Annual Conference, May 10–15, 1992, New Jersey Appendix B $$[(1/\pi)(1/(1+x^2))]^{*n}=(1/\pi)(n/(n^2+x^2))$$

A positive symmetric continuous impulse response, which, preserves the magnitude of the impulse, spreads in proportion to the degree of self-convolution and which acts as a smooth (continuous) low pass filter, dampening all non-zero frequencies must be a Cauchy distribution.

Integral s→t of Cauchy distribution is θst/π

$$\Sigma_k(\tan h(\pi)/\pi)1/(1+k^2)=1$$

for, $$h[k]=(1/\pi)(1+(-1)^{k-1}e^{-\pi})/(1+k^2)$$

$$h[k]^{*n}=(n/\pi)(1+(-1)^{k-1}e^{-n\pi})/(n^2+k^2)$$

$$\Sigma_k h[k]=1$$

The invention claimed is:

1. A method of halftoning an image, said method comprising steps of:
    determining an output value of a current pixel on a current scanline using a sum of an input value for the current pixel and a neighbourhood error value at the current pixel;
    determining an error at the current pixel as the difference between (i) the sum of the input value for the current pixel and the neighbourhood error value at the current pixel, and (ii) the output value of the current pixel; and
    adding a proportion of the error at the current pixel to neighbourhood error values at as yet unprocessed pixels of a subsequent scanline in accordance with a next scanline error impulse response; wherein said next scanline error impulse response:
    approximates a function which spreads with self-convolution in proportion to a degree of self-convolution.

2. A method of halftoning according to claim 1, wherein:
    the next scanline error impulse response is a member of a plurality of next scanline error impulse responses, each of said plurality of next scanline error impulse responses approximating a function which spreads with self-convolution in proportion to the degree of self-convolution;
    each said member of said plurality of next scanline error impulse responses is associated with a corresponding error diffusion mask; and
    a corresponding size of each said error diffusion mask depends upon a grey value of a region to which said mask is applied.

3. A method of halftoning according to claim 1, wherein:
    the next scanline error impulse response is a sampling of a Cauchy distribution, said sampling being normalised so that a sum of next scanline error impulse response values is unity.

4. A method of halftoning according to claim 1, wherein:
    the next scanline error impulse response is left-right symmetric.

5. A method of halftoning an image, said image comprising a plurality of pixels each having an input value and an assignable output value that can take on one of at least two output values, where pixels are processed scanline by scanline, and scanlines are processed one at a time from the top of the image to the bottom of the image, and where a scanline is processed pixel by pixel either from left to right or from right to left, and where the processing for each pixel comprises the steps of:
- (a) determining the output value of a current pixel using a sum of the input value of the current pixel and a neighbourhood error value for the pixel;
- (b) determining an error at the current pixel as the difference between, firstly, the sum of the input value of the current pixel and the neighbourhood error value for the pixel, and secondly the output value of the pixel;
- (c) adding proportions of the error at the current pixel to the neighbourhood error values of yet to be processed pixels of the current and next scanline;

and where the said proportions of the error at a current pixel are designed so that the next scanline error impulse response, being that function which maps
- (A) from a horizontal pixel offset;
- (B) to the total proportion of the error at the current pixel added to the neighbourhood error of that pixel of the next scanline which is displaced by the horizontal pixel offset from the current pixel, following complete processing of the current scanline;

approximates a function which spreads with self-convolution in proportion to the degree of self-convolution.

6. A method as claimed in claim 5, where the next scanline error impulse response approximates a scaled sampling of a Cauchy distribution.

7. A method as claimed in claim 5, where the next scanline error impulse response approximates a function which has a Discrete Space Fourier Transform which is a replicated two-sided exponential function.

8. A method as claimed in any one of claims 5 to 7, where the output value of a current pixel is determined by comparison of the sum of the input value of the current pixel and the neighbourhood error value for the pixel against a threshold value.

9. A method as claimed in claim 8, where in step (c), for a current pixel at pixel position (i,j), being column i and scanline j, error at the current pixel is added to the neighbourhood error of only those pixels which are either:
- i) on the current scanline ahead of the current pixel at a pixel position (i+current_offset, j), where, for left to right processing of the current scanline, current_offset is greater than zero, and, for right to left processing of the current scanline, current_offset is less than zero, or
- (ii) on the next scanline below or behind the current pixel at a pixel position, (i−next_offset, j+1), where, for left to right processing of the current scanline, next_offset is greater than or equal to zero, and, for fight to left processing of the current scanline, next_offset is less than or equal than zero.

10. A method of halftoning an image, said image comprising a plurality of pixels each having an input value and an assignable output value that can take on one of at least two output values, where pixels are processed scanline by scanline and scanlines are processed one at a time from the top of the image to the bottom of the image, and where a scanline is processed pixel by pixel either from left to right or from right to left, and where the processing for each pixel comprises the steps of:
- (a) determining the output value of a current pixel using a sum of the input value of the current pixel and a neighbourhood error value for the pixel;
- (b) determining an error at the current pixel as the difference between, firstly, the sum of the input value of the current pixel and the neighbourhood error value for the pixel, and secondly the output value of the pixel;
- (c) selecting, using the current pixel input value, a set of proportions and a set of corresponding pixel position offsets, from a family of sets of proportions and corresponding pixel position offsets;
- (d) adding the selected proportions of the error at the current pixel to the neighbourhood error values of yet to be processed pixels at pixel positions offset from the current pixel by the selected corresponding pixel position offsets;

and where each set of the said family of sets of proportions and corresponding pixel offsets, is designed so that the next scanline error impulse response corresponding to that set, being that function which maps
- (A) from a horizontal pixel offset;
- (B) to the proportion of the error at the current pixel added to the neighbourhood error of that pixel of the next scanline displaced by the horizontal pixel offset from the current pixel, following complete halftone processing of the current scanline using only the said set of proportions and corresponding pixel offsets;

approximates a function which spreads with self-convolution in proportion to the degree of self-convolution.

11. A method as claimed in claim 10, where each next scanline error impulse response, corresponding to a set of proportions and pixel offsets, approximates a scaled sampling of a Cauchy distribution.

12. A method as claimed in claim 10, where each next scanline error impulse response, corresponding to a set of proportions and pixel offsets, approximates a function which has a Discrete Space Fourier Transform which is a replicated two-sided exponential function.

13. A method as claimed in claim 11 or 12, where the family of sets of proportions and pixel offsets together with the selection, using the current pixel input value, of a set of proportions and pixel offsets, are designed so as to minimise processing while also minimising the presence of artifacts in the halftone output artifacts including cross-over artifacts and poor spreading in sparse halftone patterns.

14. A method as claimed in claim 13, where the maximum absolute offset in each set of the family of sets of proportions and pixel offsets, varies so that the family of sets includes a set with small maximum absolute offset and a set with large maximum absolute offset and where intermediate input values primarily select sets with small maximum absolute offset, and extreme input values primarily select sets with large maximum absolute offset.

15. A method as claimed in claim 14, where the output value of a current pixel is determined by comparison of the sum of the input value of the current pixel and the neighbourhood error value for the pixel against a threshold value.

16. A method as claimed in claim 15, where in step (d), for a current pixel at pixel position (i,j), being column i and scanline j, error at the current pixel is added to the neighbourhood error of only those pixels which are either:
- (i) on the current scanline ahead of the current pixel at a pixel position (i+current_offset, j), where, for left to right processing of the current scanline, current_offset is greater than zero, and, for right to left processing of the current scanline, current_offset is less than zero, or
- (ii) on the next scanline below or behind the current pixel at a pixel position, (i−next_offset, j+1) where, for left to right processing of the current scanline, next_offset is greater than or equal to zero, and, for right to left processing of the current scanline, next_offset is less than or equal than zero.

17. A method of halftoning an image, said image comprising a plurality of pixels each having an input value and an assignable output value that can take on one of at least two output values, where pixels are processed scanline by scanline and scanlines are processed one at a time from the top of the image to the bottom of the image, and where a scanline is processed pixel by pixel either from left to right or from right to left, and where the processing for each pixel comprises the steps of:
- (a) determining the output value of a current pixel using a sum of the input value of the current pixel and a neighbourhood error value for the pixel;
- (b) determining an error at the current pixel as the difference between, firstly, the sum of the input value of the current pixel and the neighbourhood error value for the pixel, and secondly the output value of the pixel;
- (c) selecting, using the current pixel input value, a set of proportions and a set of corresponding pixel position offsets, from a family of sets of proportions and corresponding pixel position offsets, said set of proportions being in accordance with a next scanline error impulse response that approximates a function which spreads with self-convolution in proportion to a degree of self-convolution;
- (d) adding the selected proportions of the error at the current pixel to the neighbourhood error values of yet to be processed pixels at pixel positions offset from the current pixel by the selected corresponding pixel position offsets;
- and where each set of the said family of sets of proportions and corresponding pixel offsets, only includes pixel offsets corresponding to pixels on the same scanline as the current pixel or to pixels on the next scanline.

18. An apparatus for halftoning an image, said apparatus comprising:
- means for determining an output value of a current pixel on a current scanline using a sum of an input value for the current pixel and a neighbourhood error value at the current pixel;
- means for determining an error at the current pixel as the difference between (i) the sum of the input value for the current pixel and the neighbourhood error value at the current pixel, and (ii) the output value of the current pixel; and
- means for adding a proportion of the error at the current pixel to neighbourhood error values at as yet unprocessed pixels of a subsequent scanline in accordance with a next scanline error impulse response; wherein said next scanline error impulse response:
- approximates a function which spreads with self-convolution in proportion to a degree of self-convolution.

19. An apparatus for halftoning an image, said apparatus comprising:
- a memory for storing a program;
- a processor for executing the program, said program comprising:
- code for a determining step for determining an output value of a current pixel on a current scanline using a sum of an input value for the current pixel and a neighbourhood error value at the current pixel;
- code for a determining step for determining an error at the current pixel as the difference between (i) the sum of the input value for the current pixel and the neighbourhood error value at the current pixel, and (ii) the output value of the current pixel; and
- code for an adding step for adding a proportion of the error at the current pixel to neighbourhood error values at as yet unprocessed pixels of a subsequent scanline in accordance with a next scanline error impulse response; wherein said next scanline error impulse response:
- approximates a function which spreads with self-convolution in proportion to a degree of self-convolution.

20. A computer program product including a computer readable medium having recorded thereon a computer program for directing a processor to execute a method for halftoning an image, said program comprising:
- code for a determining step for determining an output value of a current pixel on a current scanline using a sum of an input value for the current pixel and a neighbourhood error value at the current pixel;
- code for a determining step for determining an error at the current pixel as the difference between (i) the sum of the input value for the current pixel and the neighbourhood error value at the current pixel, and (ii) the output value of the current pixel; and
- code for an adding step for adding a proportion of the error at the current pixel to neighbourhood error values at as yet unprocessed pixels of a subsequent scanline in accordance with a next scanline error impulse response; wherein said next scanline error impulse response:
- approximates a function which spreads with self-convolution in proportion to a degree of self-convolution.

21. A computer program embodie on a computer readable medium for directing a processor to execute a method for halftoning an image, said program comprising:
- code for a determining step for determining an output value of a current pixel on a current scanline using a sum of an input value for the current pixel and a neighbourhood error value at the current pixel;
- code for a determining step for determining an error at the current pixel as the difference between (i) the sum of the input value for the current pixel and the neighbourhood error value at the current pixel, and (ii) the output value of the current pixel; and
- code for an adding step for adding a proportion of the error at the current pixel to neighbourhood error values at as yet unprocessed pixels of a subsequent scanline in accordance with a next scanline error impulse response; wherein said next scanline error impulse response;
- approximates a function which spreads with self-convolution in proportion to a degree of self-convolution.

* * * * *

UNITED STATES PATENT AND TRADEMARK OFFICE
CERTIFICATE OF CORRECTION

PATENT NO. : 7,057,773 B2
APPLICATION NO. : 10/029267
DATED : June 6, 2006
INVENTOR(S) : Peter William Mitchell Ilbery It is certified that error appears in the above-identified patent and that said Letters Patent is hereby corrected as shown below:

Title Page, Item
(56) References Cited, OTHER PUBLICATIONS (page two), after "D. Hong et al.,":
"Dernel" should read -- Kernel--.

DRAWINGS:
Sheet 13, Figure 14, "HORZONTAL" should read -- HORIZONTAL --;
Sheet 14, Figure 15, "HORZONTAL" should read -- HORIZONTAL --; and
Sheet 15, Figure 16, "HORZONTAL" should read -- HORIZONTAL --.

COLUMN 4:
Line 47, "lines" should read -- lies --; and
Line 54, "253," should read -- 253. --.

COLUMN 5:
Line 57, "arc" should read -- are --.

COLUMN 11:
Line 45, "thereof It" should read -- thereof. It --; and
Line 54, "worn" should read -- worm --.

COLUMN 12:
Line 36, "worn-free," should read -- worm-free, --.

COLUMN 13:
Line 17, "FIG. 8" should read -- FIG. 8 shows --.

COLUMN 14:
Line 48, "fiber" should read -- further --; and
Line 65, "ie" should read -- ie. --.

COLUMN 15:
Line 21, "(ie e_curr_line$_{ij}$)" should read -- (ie. e_curr_line$_{ij}$) --.

COLUMN 17:
Line 56, "$h_{curr}=mask_{curr}+mask_{curr}^{*2}+mask_{curr}^{*3}+$" should read
-- $h_{curr}=mask_{curr}+mask_{curr}^{*2}+mask_{curr}^{*3}+\ldots$ --.

COLUMN 19:
Line 62, "(7) follows:" should read -- (7) as follows: --.

UNITED STATES PATENT AND TRADEMARK OFFICE
CERTIFICATE OF CORRECTION

PATENT NO. : 7,057,773 B2
APPLICATION NO. : 10/029267
DATED : June 6, 2006
INVENTOR(S) : Peter William Mitchell Ilbery It is certified that error appears in the above-identified patent and that said Letters Patent is hereby corrected as shown below:

COLUMN 21:
Line 46, "approximations" should read -- approximation, --.

COLUMN 22:
Line 18, "singular" should read -- similar --;
Line 20, "his" should read -- this --;
Line 30, "function Note" should read -- funtion. Note --; and
Line 66, "small These" should read -- small. These --.

COLUMN 23:
Line 42, "arc" should read -- are --; and
Line 62, "patters" should read -- patterns --.

COLUMN 24:
Lines 63-64, form (63), "$(1/\pi)(b/(b^2+x^2))*(1/\pi)(b/(b^2+x^2))=(1/\pi)(2b/(2b)^2+x^2))$" should read -- $(1/\pi)(b/(b^2+x^2))*(1/\pi)(b/(b^2+x^2))=(1/\pi)(2b/((2b)^2+x^2))$ --.

COLUMN 25:
Line 51, "the use" should read -- The use --.

COLUMN 27:
Line 24, "defused" should read -- defined --;
Line 42, "constant" should read -- constant. --;
Line 44, form (84), "$f(x)=(1/\pi)(1/r)(b/r)(1/\pi)b/(b^2+x^2),$" should read -- $f(x)=(1/\pi)(1/r)(b/r)=(1/\pi)b/(b^2+x^2)$, --.

COLUMN 28:
Line 13, "It" should read -- it --.

COLUMN 29:
Line 6, form (93), "$(F(w))^n=F(nw)$ for $n=1,2,3$" should read -- "$(F(w))^n=F(nw)$ for $n=1,2,3...$ --;
Line 13, form (95), "$F(w)/F(w)=F(nw)/F(nw)$ for $n=1,2,3$" should read -- $F(w)/F(w)=F(nw)/F(nw)$ for $n=1,2,3...$ --;
Line 22, "real for" should read -- real. For --; and
Line 34, "function" should read -- function. --.

COLUMN 30:
Line 7, "unction" should read -- function --.

UNITED STATES PATENT AND TRADEMARK OFFICE
CERTIFICATE OF CORRECTION

PATENT NO. : 7,057,773 B2
APPLICATION NO. : 10/029267
DATED : June 6, 2006
INVENTOR(S) : Peter William Mitchell Ilbery It is certified that error appears in the above-identified patent and that said Letters Patent is hereby corrected as shown below:

COLUMN 33:
Line 29, "pixel" should read -- pixel. --.

COLUMN 35:
Line 42, "image" should read -- image. --;
Line 57, "being" should read -- (being --.

COLUMN 36:

Lines 59-61, form (112), "$\sum_{1<=j<=12} e\_c[i] + \sum_{0<=i<=12} e\_n[i] =$ table_index_upper_bits-out" should read -- $\sum_{1<=i<12} e\_c[i] + \sum_{0<=i<=12} e\_n[i] =$ table_index_upper_bits-out --.

COLUMN 37:
Line 39, "worn" should read -- worm --.

COLUMN 41:
Line 62, "image Because" should read -- image. Because --; and
Line 67, delete "is".

COLUMN 42:
Line 65, "fill" should read -- full --.

COLUMN 43:
Line 42, "only" should read -- only. --

COLUMN 44:
Line 16, "tions" should read -- tions. --.

COLUMN 45:
Line 14, "next scanline" should read -- next scanline. --;
Line 19, "$(r_{ij})$," should read $(r_{ij})$. --; and
Line 32, "$e\_prev\_line_{j+1} = \Sigma_{n<=1}(e\_line_{j+1-n} * h_{next}^{*n})$" should read
-- $e\_prev\_line_{j+1} = \Sigma_{n>=1}(e\_line_{j+1-n} * h_{next}^{*n})$ --.

UNITED STATES PATENT AND TRADEMARK OFFICE
CERTIFICATE OF CORRECTION

PATENT NO. : 7,057,773 B2
APPLICATION NO. : 10/029267
DATED : June 6, 2006
INVENTOR(S) : Peter William Mitchell Ilbery It is certified that error appears in the above-identified patent and that said Letters Patent is hereby corrected as shown below:

COLUMN 46:
Line 13, "left-light" should read -- left-right --;
Line 36, delete "ps Shiau and Fan Extended Distribution Set Error";
Line 37, "Diffusion" should read -- Shiau and Fan Extended Distribution Set Error Diffusion --;
Line 44, "FIG. 26" should read -- FIG. 26. --;
Line 51, "(U.S. Pat. No. 5,353,127)" should read -- (U.S. Pat. No. 5,353,127). --; and
Line 65, "distribution" should read -- distribution. --.

COLUMN 47:
Line 33, "reasonable" should read -- is reasonable --; and
Line 59, "function" should read -- function: --.

COLUMN 48:
Line 13, "mask;" should read -- mask: --;
Line 34, "grey levels" should read -- grey levels. --; and
Line 46, "$f(x)=(1/\pi)(1/(1+x^2)$" should read -- $f(x)=(1/\pi)(1/(1+x^2))$ --.

COLUMN 50:
Lines 18 and 38, "$\Sigma_k h_{next}[k]=1;$" should read -- $\Sigma_k h_{next}[k]=1;$ and --; and
Lines 20 and 39, "distribution" should read -- distribution. --.

COLUMN 51:
Line 9, "$\Sigma_k h_{next}[k]=1$" should read -- $\Sigma_k h_{next}[k]=1.$ --; and
Line 56, "scanlines" should read -- scanlines. --

COLUMN 52:
Line 42, "integral)" should read -- integral). --; and
Line 59, "$1/\pi r$" should read -- $1/(\pi r)$ --.

COLUMN 53:
Line 28, delete "ti"; and
Line 32, "$\Sigma_k h_{next\_target[k]=}1$" should read -- $\Sigma_k h_{next\_target}[k]=1$ --.

COLUMN 54:
Lines 8-9, "$h_{next\_actual}=(\delta 30 mask^{curr}+mask_{curr}*^2+mask_{curr}*^2+mask_{curr}*^3...)*mask_{next}$" should read
-- $h_{next\_actual}=(\delta+mask_{curr}+mask_{curr}*^2+mask_{curr}*^2+mask_{curr}*^3...)*mask_{next}$ --; and
Line 33, "distribution" should read -- distribution. --.

UNITED STATES PATENT AND TRADEMARK OFFICE
CERTIFICATE OF CORRECTION

| | | |
|---|---|---|
| PATENT NO. | : 7,057,773 B2 | |
| APPLICATION NO. | : 10/029267 | |
| DATED | : June 6, 2006 | |
| INVENTOR(S) | : Peter William Mitchell Ilbery | |

It is certified that error appears in the above-identified patent and that said Letters Patent is hereby corrected as shown below:

COLUMN 55:
Line 17, "FIG. 35" should read -- FIG. 35. --.

COLUMN 57:
Line 10, "pixel;" should read -- pixel; and --;
Line 41, "i) on" should read -- (i) on --; and
Line 49, "fight" should read -- right --.

COLUMN 58:
Line 4, "offsets;" should read -- offsets; and --.

COLUMN 59:
Line 22, "self-convolution;" should read -- self-convolution; and --.

COLUMN 60:
Line 36, "embodie" should read -- embodied --; and
Line 52, "response;" should read -- response: --.

Signed and Sealed this

Sixteenth Day of January, 2007

JON W. DUDAS
*Director of the United States Patent and Trademark Office*